US012717430B2

(12) United States Patent
Han et al.

(10) Patent No.: US 12,717,430 B2
(45) Date of Patent: Aug. 25, 2026

(54) CONTROLLER

(71) Applicant: SAMSUNG ELECTRONICS CO., LTD., Suwon-si (KR)

(72) Inventors: Jangwon Han, Suwon-si (KR); Euishik Yoon, Suwon-si (KR); Jungwon Kang, Suwon-si (KR); Hyoungmoon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/962,835

(22) Filed: Nov. 27, 2024

(65) Prior Publication Data

US 2025/0088696 A1 Mar. 13, 2025

Related U.S. Application Data

(63) Continuation of application No. PCT/KR2023/006313, filed on May 10, 2023.

(30) Foreign Application Priority Data

Jun. 30, 2022 (KR) ........................ 10-2022-0080904
Aug. 17, 2022 (KR) ........................ 10-2022-0102988

(51) Int. Cl.
*G06F 3/0362* (2013.01)

(52) U.S. Cl.
CPC .................................. *G06F 3/0362* (2013.01)

(58) Field of Classification Search
CPC ................................................ H04N 21/42222
See application file for complete search history.

(56) References Cited

U.S. PATENT DOCUMENTS

| | | | |
|---|---|---|---|
| 7,091,430 | B1 | 8/2006 | Haizima et al. |
| 7,126,072 | B2 | 10/2006 | Saitoh |
| 7,375,674 | B2 | 5/2008 | Hanahara et al. |
| 7,463,312 | B2 | 12/2008 | Sata et al. |
| 8,680,418 | B2 | 3/2014 | Nakajima et al. |
| 9,024,791 | B2 | 5/2015 | Chen et al. |

(Continued)

FOREIGN PATENT DOCUMENTS

| | | |
|---|---|---|
| JP | 6-19851 A | 1/1994 |
| JP | 8-214386 A | 8/1996 |

(Continued)

OTHER PUBLICATIONS

Communication dated Jun. 12, 2025 issued by the European Patent Office in European Patent Application No. 23831719.2.

(Continued)

*Primary Examiner* — Hang Lin
(74) *Attorney, Agent, or Firm* — Sughrue Mion, PLLC

(57) ABSTRACT

A controller includes: a main body including at least one rib; a rotating wheel including: a fixed body supported by the main body, and a rotating body facing the at least one rib, coupled to the fixed body and rotatable with respect to the fixed body; and a clicker protruding toward the main body from the rotating body to allow an end portion to be provided between the at least one rib, where the rotating body includes a wheel cover including an accommodation space recessed in a direction away from the at least one rib to allow at least a portion of the clicker to be provided therein.

16 Claims, 32 Drawing Sheets

(56) References Cited

U.S. PATENT DOCUMENTS

| | | | | |
|---|---|---|---|---|
| 10,048,682 | B2 | 8/2018 | Chang et al. | |
| 10,206,029 | B2 | 2/2019 | Song et al. | |
| 10,558,239 | B2 | 2/2020 | Lee et al. | |
| 2010/0127914 | A1* | 5/2010 | Maier | G08C 23/04 345/173 |
| 2014/0168132 | A1* | 6/2014 | Graig | G06F 3/044 345/174 |
| 2015/0071465 | A1 | 3/2015 | Zalisk et al. | |
| 2018/0081452 | A1 | 3/2018 | Min et al. | |
| 2024/0107101 | A1* | 3/2024 | Kim | H04N 21/42206 |

FOREIGN PATENT DOCUMENTS

| | | | |
|---|---|---|---|
| JP | 2006-164871 | A | 6/2006 |
| JP | 2006-323692 | A | 11/2006 |
| JP | 4612361 | B2 | 1/2011 |
| JP | 5359928 | B2 | 12/2013 |
| KR | 20-0226520 | Y1 | 6/2001 |
| KR | 10-2005-0018328 | A | 2/2005 |
| KR | 10-2008-0067403 | A | 7/2008 |
| KR | 10-0874359 | B1 | 12/2008 |
| KR | 10-2011-0065487 | A | 6/2011 |
| KR | 10-2016-0123623 | A | 10/2016 |
| KR | 10-2018-0031620 | A | 3/2018 |
| KR | 10-1845975 | B1 | 5/2018 |
| KR | 10-2367932 | B1 | 3/2022 |
| KR | 10-2022-0078035 | A | 6/2022 |

OTHER PUBLICATIONS

International Search Report dated Aug. 21, 2023, issued by the International Searching Authority in International Application No. PCT/KR2023/006313.

Communication dated May 27, 2026, issued by the Korean Ministry of Intellectual Property in Korean Application No. 10-2022-0102988.

* cited by examiner

CONTROLLER

CROSS-REFERENCE TO RELATED APPLICATION(S)

This application is a continuation of International Application No. PCT/KR2023/006313, filed on May 10, 2023, in the Korean Intellectual Property Receiving Office, which is based on and claims priority to Korean Patent Applications No. 10-2022-0102988, filed on Aug. 17, 2022 and No. 10-2022-0080904, filed on Jun. 30, 2022, in the Korean Intellectual Property Office, the disclosures of which are incorporated by reference herein in their entireties.

BACKGROUND

1. Field

The present disclosure relates to a controller, and more particularly, to a controller configured to be controlled using a rotating wheel.

2. Description of Related Art

A controller is a type of device that controls an object.

The controller includes a wired controller configured to control a target object by being connected via wires, and a wireless controller configured to control a target object by being connected via radio waves without wires.

The controller includes an input unit that receives a user input and a transmitter that transmits a signal generated from the input unit to an object.

SUMMARY

One aspect of the present disclosure seeks to solve the problem of allowing a controller providing an inputter capable of allowing a user to feel that a motion in which the user moves the controller matches a motion in which an object moves.

One aspect of the present disclosure seeks to solve the problem of being stably installed on a controller while at least a portion of a rotating wheel rotates when an inputter of the controller includes the rotating wheel.

One aspect of the present disclosure seeks to solve the problem of allowing a user to feel a rotational sensation when an inputter of a controller includes a rotating wheel.

One aspect of the present disclosure seeks to solve the problem of allowing the clicker to be stably accommodated in a rotating wheel when the rotating body of a controller includes the clicker so that a user feels a rotational sensation.

One aspect of the present disclosure seeks to solve the problem of accurately detecting rotation of a rotating wheel of a controller.

One aspect of the present disclosure seeks to solve the problem of needing a separate button for convenience of a user when the controller includes a rotating wheel.

One aspect of the present disclosure seeks to solve the problem of a controller being stably supplied with power while the controller controlling an object in powering the controller.

Additional aspects of the disclosure will be set forth in part in the description which follows and, in part, will be apparent from the description, or may be learned by practice of the disclosure.

According to an aspect of the present disclosure, a controller may include: a main body including at least one rib; a rotating wheel including: a fixed body supported by the main body, and a rotating body facing the at least one rib, coupled to the fixed body and rotatable with respect to the fixed body; and a clicker protruding toward the main body from the rotating body to allow an end portion to be provided between the at least one rib, where the rotating body includes a wheel cover including an accommodation space recessed in a direction away from the at least one rib to allow at least a portion of the clicker to be provided therein.

The at least one rib may include: a first rib, a second rib adjacent to one side of the first rib, and a third rib adjacent to a second side different from the one side of the first rib, where, based on the clicker moving in a direction from the second rib toward the first rib, the clicker is movable from a stationary position between the second rib and the first rib to an elastic position in which the clicker is elastically supported and deformed by the first rib, and where the clicker is movable from the elastic position to a contact position in which the clicker is configured to contact the third rib.

The clicker may include: a head coupled to the rotating body; and a neck extending from the head toward the main body, where the neck includes an inclined portion that is inclined toward an end portion thereof and capable of reducing a resistance generated by the first rib based on the clicker being in the elastic position.

The at least one rib may protrude toward the rotating body and extend toward a rotation axis of the rotating body, and be provided along a movement position of the clicker, where the at least one rib respectively includes a rib edge configured to contact the clicker and is rounded and chamfered so as to be capable of reducing a resistance caused by the first rib based on the clicker being in the elastic position.

The clicker may include: an extension extending from the inclined portion toward the head; and a reinforcing portion connected to the extension and the head and having a cross-sectional area greater than a cross-sectional area of the extension to provide the connection between the neck and the head.

The wheel cover may face one end of the head of the clicker, where the rotating body faces a second end opposite to the one end of the head of the clicker, and includes a wheel bracket coupled to the wheel cover and configured to fix the clicker to the rotating body.

The head of the clicker may include a fixing groove that is recessed in a direction away from the wheel cover, where the wheel cover includes: a fixing protrusion protruding toward the fixing groove and configured to be accommodated and fixed in the fixing groove; and a head groove recessed in a direction away from the head and configured to accommodate and fix the head of the clicker.

The fixed body may include: a first fixed body part coupled to the main body; and a second fixed body part coupled to the first fixed body part with the wheel cover interposed therebetween, where the wheel cover further includes: a first protruding rib protruding toward the first fixed body part so as to be rotatable by being in contact with the first fixed body part; and a second protruding rib protruding in a direction opposite to the direction, in which the first protruding rib protrudes, toward the second fixed body part so as to be rotatable by being in contact with the second fixed body part.

The controller may further include: a wheel sensor configured to detect an amount of rotation of the rotating body with respect to the fixed body; a transmitter configured to transmit a signal to an object controlled by the controller;

and at least one processor electrically connected to the wheel sensor and the transmitter, where the at least one processor is configured to control the transmitter based on the amount of rotation detected by the wheel sensor.

The fixed body may further include a wheel board between the first fixed body part and the second fixed body part, where the wheel sensor is supported by the wheel board, and where the wheel cover further includes a reaction flange extending toward the rotation axis of the rotating body and facing the wheel board with the wheel sensor interposed therebetween.

The wheel sensor may include an optical sensor, where the wheel cover includes a coating layer on the reaction flange that provides a uniform surface facing the optical sensor, and where the at least one processor is configured to obtain the amount of rotation of the rotating body and control the transmitter based on light reflected by the coating layer and detected by the optical sensor.

The main body may further include: a main body housing coupled to the rotating wheel, and including a function button cover including at least two fixed edges, the function button cover being configured to be pressed; a main board facing the main body housing; and a function button damper between the function button cover and the main board, where the controller further includes a function button sensor between the function button damper and the main board configured to detect a pressing of the function button cover, and where the function button damper includes: a support portion spaced apart from the function button sensor; and a pressing portion corresponding to the function button sensor, thinner than the support portion and configured to be deformable to protrude toward the function button sensor.

The wheel cover may be configured to be rotatable with respect to the wheel board, where the controller further includes a connecting board including a flexible material connecting the main board and the wheel board.

The controller may further include a wheel button sensor configured to output a signal to the at least one processor based on the second fixed body part being pressed, where the wheel cover includes a contact surface exposed toward an outside of the second fixed body part, adjacent to an outer surface of the second fixed body part and extending radially from the second fixed body part with respect to the rotation axis of the rotating body.

The main body may include a first surface to which the rotating wheel is coupled, the first surface having a first angle with respect to a bottom surface of the main body, where the controller further includes a solar cell on the main body and having a second angle different from the first angle with respect to the bottom surface of the main body and configured to generate electric energy from external light, and where the main body further includes a capacitor electrically connected to the solar cell and configured to store electric energy generated from the solar cell.

Another aspect of the present disclosure provides a controller configured to control an object, including: a main body including at least one rib; a rotating wheel including a fixed body supported by the main body, and a rotating body disposed to face the at least one rib and coupled to the fixed body to be rotatable with respect to the fixed body; and a clicker protruding from the rotating body toward the main body to allow an end portion to be disposed between the at least one rib. The rotating body includes a wheel cover in which an accommodation space recessed in a direction away from the at least one rib is defined to allow at least a portion of the clicker to be disposed inside. The wheel cover includes a contact surface provided to be exposed toward an outside of the fixed body, disposed adjacent to an outer surface of the fixed body and extending radially with respect to the rotation axis of the rotating body.

The main body may further include a function button cover configured to be pressed; and a main board disposed to face the function button cover. The controller may further include a wheel sensor configured to detect an amount of rotation of the rotating body with respect to the main body; a function button sensor configured to detect pressure of the function button cover and electrically connected to the main board and supported by the main board; a transmitter configured to transmit a signal toward the object controlled by the controller; and a processor electrically connected to the wheel sensor, the function button sensor and the transmitter, and configured to control the transmitter based on the amount of rotation measured by the wheel sensor, and a signal related to the pressure of the function button cover detected by the function button sensor. The fixed body may further include a wheel board electrically connected to the wheel sensor and the main board, and provided to support the wheel sensor.

The clicker may include a head coupled to the rotating body; and a neck extending from the head toward the main body. The neck may include an inclined portion provided to be inclined toward an end portion thereof so as to reduce a resistance generated by the at least one rib in response to the clicker being in contact with the at least one rib.

A fixing groove that is recessed in a direction opposite to a direction facing the wheel cover may be defined in the head of the clicker. The wheel cover may include a fixing protrusion protruding toward the fixing groove to correspond to the fixing groove so as to be accommodated and fixed in the fixing groove; and a head groove recessed in a direction away from the head to correspond to the head so as to allow the head of the clicker to be accommodated and fixed.

Another aspect of the present disclosure provides a controller configured to control an object, including a main body including at least one rib; a rotating wheel including a fixed body supported by the main body, and a rotating body disposed to face the at least one rib and coupled to the fixed body to be rotatable with respect to the fixed body; a wheel sensor configured to detect an amount of rotation of the rotating body with respect to the fixed body; a transmitter configured to transmit a signal toward the object controlled by the controller; a processor electrically connected to the wheel sensor and the transmitter, and a clicker protruding from the rotating body toward the main body to allow an end portion to be disposed between the at least one rib. The processor is configured to control the transmitter based on the amount of rotation measured by the wheel sensor.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
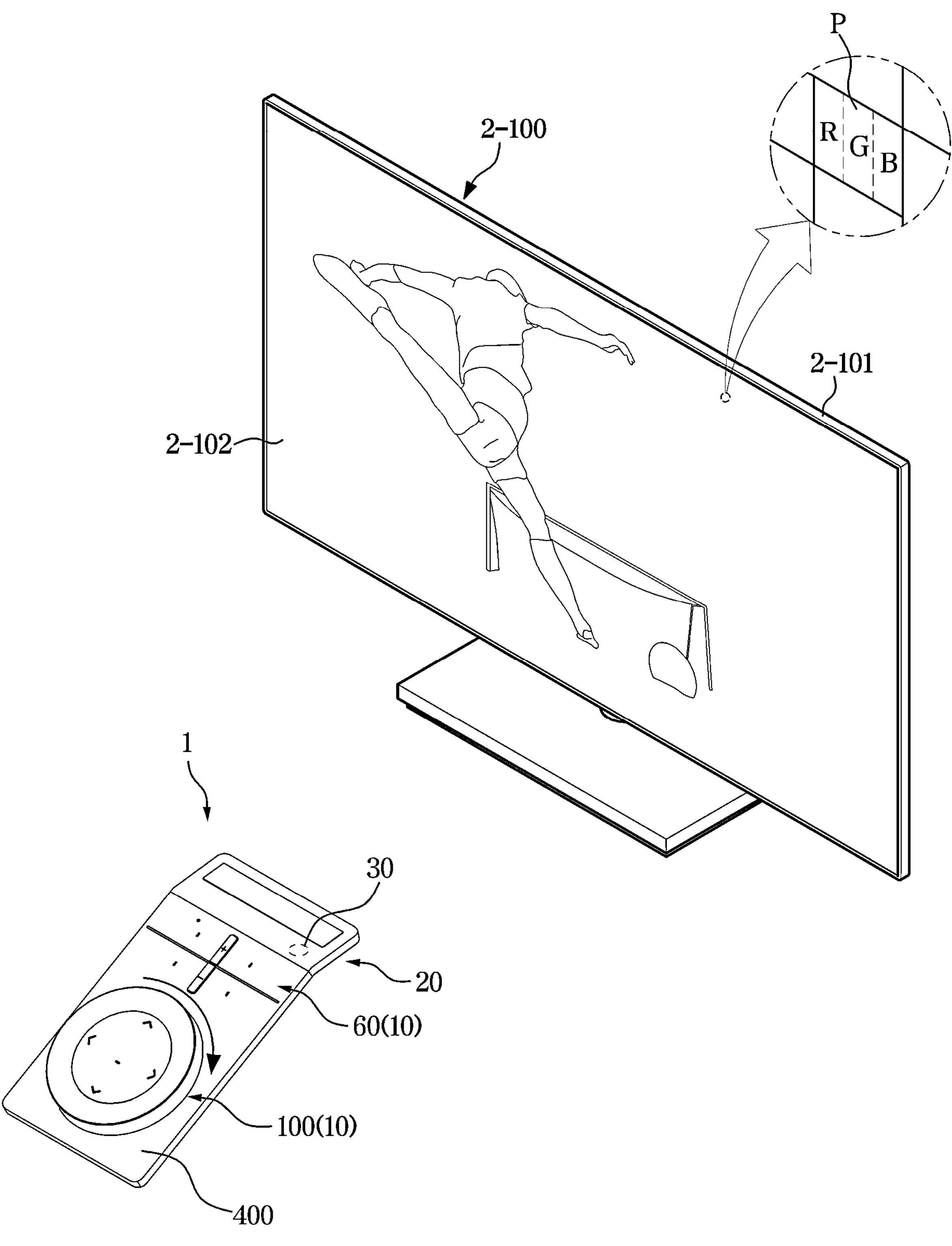
FIG. 1 is a schematic view illustrating a state in which a controller according to one embodiment of the present disclosure controls an object.

The various embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar constituent elements.

A singular expression may include a plural expression unless otherwise indicated herein or clearly contradicted by context.

The expressions "A or B," "at least one of A or/and B," or "one or more of A or/and B," A, B or C," "at least one of" A, B or/and C," or "one or more of A, B or/and C," and the like used herein may include any and all combinations of one or more of the associated listed items.

The term of "and/or" includes a plurality of combinations of relevant items or any one item among a plurality of relevant items.

Herein, the expressions "a first", "a second", "the first", "the second", etc., may simply be used to distinguish an element from other elements, but is not limited to another aspect (importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", "comprising" and the like are used to specify features, numbers, steps, operations, elements, components, or combinations thereof, but do not preclude the presence or addition of one or more of the features, numbers, steps, operations, elements, components, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the description, when an element is "on" another element, this includes not only when the element is in contact with the other element, but also when there is another element between the two elements.

In the following detailed description, the terms of "up and down direction", "lower side", "front and rear direction" and the like may be defined by the drawings, but the shape and the location of the element is not limited by the term Particularly, as shown in FIG. 1, a direction from a rotating wheel 100 of a controller 1 to a transmitter 30 is defined as forward, and rear, left and right sides, and up and down sides are defined based on the forward.

Hereinafter exemplary embodiments of the present disclosure will be described in detail with reference to the accompanying drawings.

FIG. 1 is a schematic view illustrating a state in which the controller 1 according to one embodiment of the present disclosure controls an object 2.

A relationship between the object 2 and the controller 1 will be described with reference to FIG. 1.

The controller 1 is a type of device that controls the object 2. The controller 1 is also referred to as a remote or remote control.

The controller 1 includes a wired controller 1 configured to control the object 2 by being connected via wires, and a wireless controller 1 configured to control the object 2 by being connected via radio waves without wires.

The controller 1 includes an inputter 10 configured to receive a user input and the transmitter 30 configured to transmit a signal generated from the inputter 10 to the object 2.

The transmitter 30 may include a transmission/reception integrated circuit such as a microcomputer.

The controller 1 may transmit a control signal of the object 2 to the object 2 through short-range wireless communication. For this, the controller 1 may exchange control data with the object 2. The short-range communication may be Bluetooth communication, but is not limited thereto.

The object 2 may be a display apparatus 2-100. The object 2 may be a home appliance, or a transportation device such as a car, but is not limited thereto. However, for the convenience of description, in the present disclosure, it is assumed that the object 2 is the display apparatus 2-100.

The display apparatus 2-100 is a device that is configured to process video data received from the outside and/or video data stored internally, and visually display the processed video (a series of a plurality of image frames 2-406). For example, the display apparatus 2-100 may be implemented in various forms, such as a monitor, a portable multimedia device, and a portable communication device, and the display apparatus 2-100 is not limited in its shape and its name as long as visually displaying an image.

The display apparatus 2-100 may be a large format display (LFD) installed outdoors, such as a roof of a building or a bus stop. The outdoor is not limited to the outside of a building, and thus the display apparatus 2-100 according to one embodiment may be installed in any places as long as the display apparatus is accessed by a large number of people, even indoors, such as subway stations, shopping malls, movie theaters, companies, and stores.

The display apparatus 2-100 may receive video data and audio data from various content sources. For example, the display apparatus 2-100 may receive video/audio data (television broadcast content) through a broadcast receiving antenna or a wired cable, receive video/audio data from a content playback device, or receive video/audio data from a content providing server of a content provider.

The display apparatus 2-100 may display an image corresponding to video data and output a sound corresponding to audio data. For example, the display apparatus 2-100 may restore the plurality of image frames 2-406 included in the video data and continuously display the plurality of image frames 2-406. In addition, the display apparatus 2-100 may restore an audio signal included in the audio data and continuously output a sound according to the audio signal.

As illustrated in FIG. 1, the display apparatus 2-100 may include a display main body 2-101 provided to accommodate a plurality of components for displaying an image, and a screen 2-102 disposed on one side of the display body 2-101 to display an image.

The display main body 2-101 may form an appearance of the display apparatus 2-100, and the display main body 2-101 may include a component configured to allow the display apparatus 2-100 to display the image I.

The screen 2-102 may be formed on a front surface of the main body 2-101, and an image, which is visual information, may be displayed on the screen 2-102.

The screen 2-102 may be implemented as a display panel 2-152, and the display panel 2-152 may directly emit light (self-luminous display panel 2-152) or may transmit or block light emitted by a backlight unit or the like (non-self-luminous display panel 2-152). For example, the display panel 2-152 may include a liquid crystal display (LCD) panel, a light emitting diode (LED) panel, an organic light emitting diode (OLED) panel, or a quantum dot display panel 2-152.

The screen 2-102 may include a plurality of pixels P, and an image displayed on the screen 2-102 may be formed by a combination of light emitted from the plurality of pixels P. Each of the plurality of pixels P may emit light of various brightness and colors. For example, a single image may be formed on the screen 2-102 by combining the light emitted from the plurality of pixels P as a mosaic.

In order to display an image of various brightness and various colors, each of the plurality of pixels P may include sub-pixels Psub1, Psub2, and Psub3. For example, the sub-pixels may include a red sub-pixel capable of emitting red light, a green sub-pixel capable of emitting green light, and a blue sub-pixel capable of emitting blue light, which are RGB pixel. As another example, the sub-pixels may include a red sub-pixel, a green sub-pixel, a blue sub-pixel, and a white sub-pixel capable of emitting white light, which are RGBW pixel. As another example, the sub-pixels may include a red sub-pixel, a green sub-pixel, a blue sub-pixel, and a yellow sub-pixel capable of emitting yellow light, which are RGBY pixel. However, the sub-pixel structure is not limited thereto, and may include various sub-pixel structures that are currently or will be disclosed in the future.

The display apparatus 2-100 may include an input means for obtaining a user input from a user. For example, the display body 2-101 may be provided with a power button for turning on the display apparatus 2-100 or a volume button for controlling a volume of sound output from the display apparatus 2-100.

However, a user generally views the display apparatus 2-100 from a location away from the display apparatus 2-100, and therefore, the controller 1 configured to control the display apparatus 2-100 may be provided for the user's convenience.

In addition to a power button and a volume button, the controller 1 may include a setting means for inputting settings associated with a layout of a plurality of content images and settings associated with each of the plurality of content images. For example, the controller 1 may include a plurality of input keys and at least one control knob (or dial).

The controller 1 may include a user-controllable inputter 10 to control the display. The inputter 10 is configured to receive a user input. The inputter 10 may include a rotating wheel 100 in which at least a portion thereof is rotatable. The inputter 10 may include a function button portion 60 in which at least a portion thereof is provided to be in contact with a user. The rotating wheel 100 may include a wheel button 50 provided to be in contact with a user.

The controller 1 may include a main body 400. The main body 400 may be a configuration that forms at least a portion of the overall appearance of the controller 1.

The controller 1 may include the rotating wheel 100. The rotating wheel 100 may be configured to allow at least a portion thereof to be rotatable. As the rotating wheel 100 rotates, the controller 1 may control the display apparatus 2-100.

The rotating wheel 100 may be coupled to one side of the main body 400. The rotating wheel 100 may be coupled to the main body 400 to allow at least a portion of the rotating wheel 100 to rotate relative to the main body 400.

The function button portion 60 may be arranged on one side of the wheel button 50. The function button portion 60 may be arranged in front of the wheel button 50. The function button portion 60 may be provided to be concentrated in front of the wheel button 50.

A user can use the controller 1 by placing the controller 1 on a fixed thing such as a desk. The user can use the controller 1 by placing the rotating wheel 100 close to the user's body and placing the function button 61 portion in a direction away from the user's body. That is, when the user controls the controller 1 using the hand, the wheel button 50 may be disposed in a part closer to the wrist, and the function button portion 60 may be disposed closer to the tip of the finger. Accordingly, because the wheel button 50 is disposed in a part closer to the hand, the usability of the wheel button 50 may be improved.

In addition, in the case of a user who mainly uses the wheel button 50, because the function button 61 is separated from the wrist, it is possible to prevent the user from accidentally pressing the function button 61 while operating the wheel button 50.

In the present disclosure, a button is described as an example of a configuration that confirms a user input by pressing. However, the button may also include a configuration that confirms a user input by a change in electrostatic capacity due to a touch, a change due to light detection by a touch, etc., and is not limited to the example in the present disclosure.

The controller 1 may include a charging portion 20. The charging portion 20 is a portion that supplies power to the controller 1.

The charging portion 20 may be disposed on one side of the function button portion 60. The charging portion 20 may be disposed on one side of the rotating wheel 100. The charging portion 20 may be disposed apart from the rotating wheel 100. The charging portion 20 may be disposed in front of the function button portion.

When a user rotates the rotating wheel 100 using the user's finger in a state in which the charging portion 20 is disposed at the rear of the rotating wheel 100, the user's wrist may come into contact with the charging portion 20. In order to prevent the reduction in the usability caused by the user's wrist coming into contact with the charging portion 20, the charging portion 20 may be disposed to be spaced apart from the rotating wheel 100.

The controller 1 may include the transmitter 30. The transmitter 30 may be configured to transmit information, which is input by a user into the inputter 10 of the controller 1, to the display. That is, the transmitter 30 of the controller 1 may obtain a user input from the user and transmit a signal corresponding to the obtained user input to the main body 400 of the display apparatus 2-100 via infrared rays, radio waves, or the like.

Hereinafter the configuration of the controller 1 is described in detail with reference to the relevant drawings.

Figure 2:
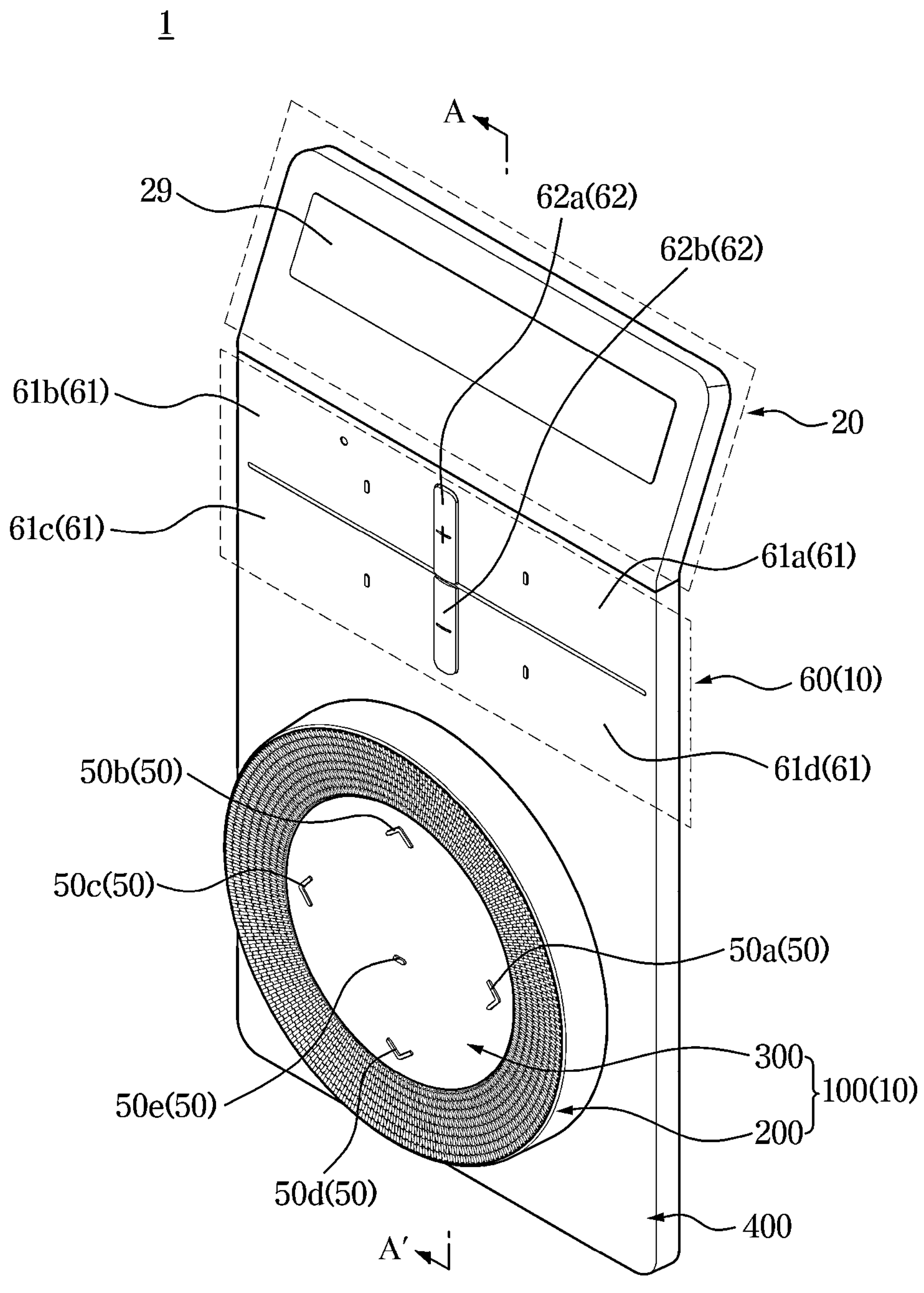
FIG. 2 is a perspective view of the controller of FIG. 1 according to an embodiment.
Figure 3:
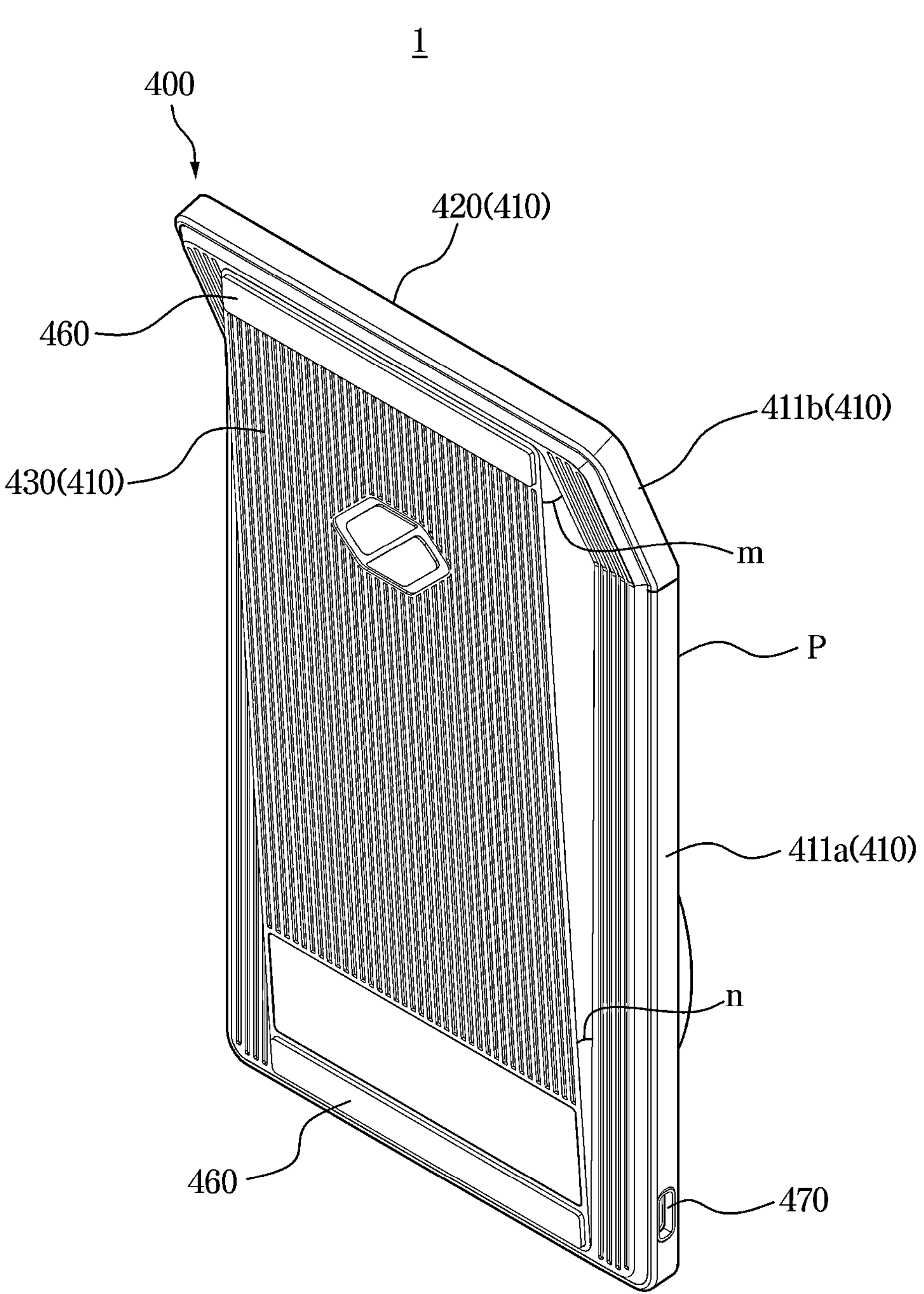
FIG. 3 is a perspective view of the controller of FIG. 2 when viewed from a different angle than FIG. 1 according to an embodiment.
Figure 4:
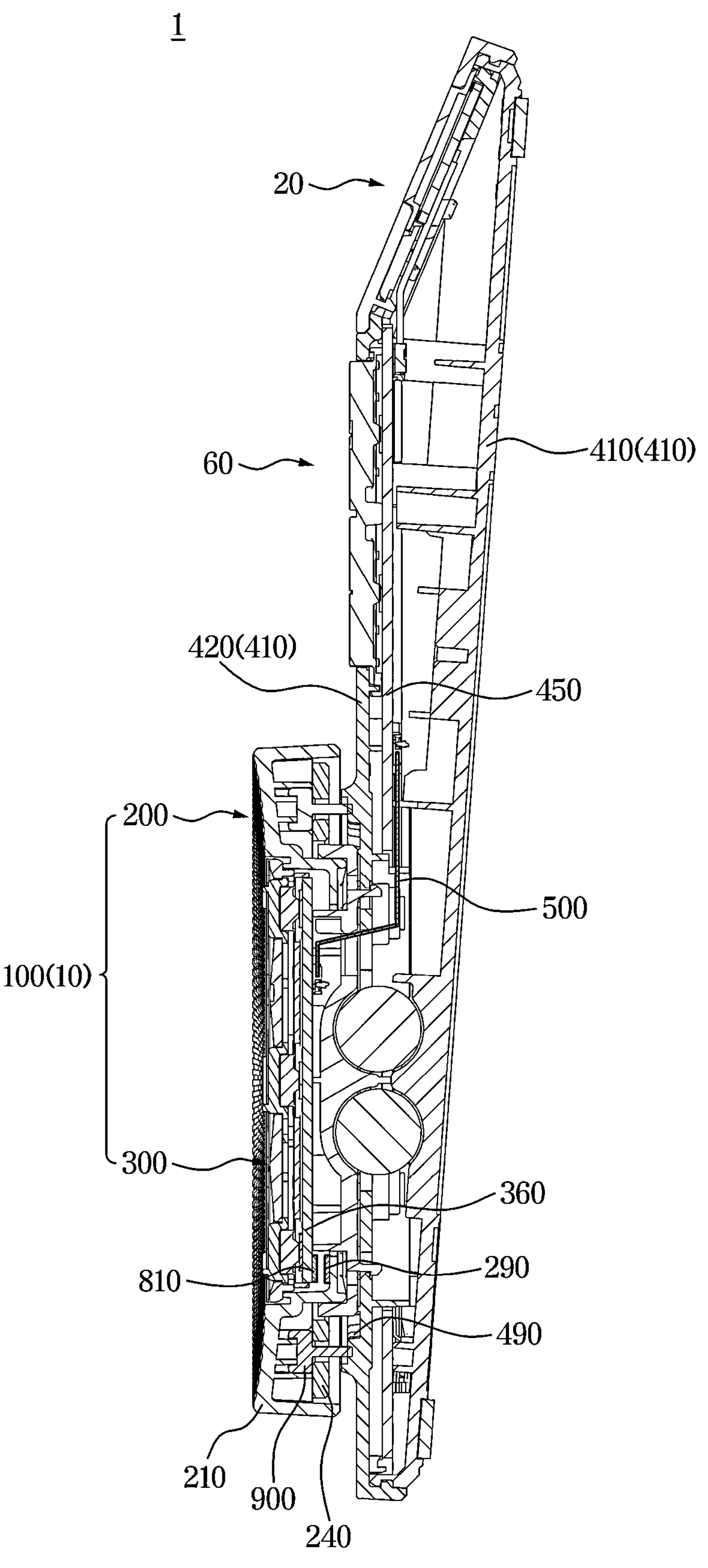
FIG. 4 is a cross-sectional view of the controller of FIG. 2 taken along line A-A' according to an embodiment.

FIG. 2 is a perspective view of the controller 1 of FIG. 1. FIG. 3 is a perspective view of the controller 1 of FIG. 2 when viewed from a different angle than FIG. 1. FIG. 4 is a cross-sectional view of the controller 1 of FIG. 2 taken along line A-A'.

The configuration of the inputter 10 of the controller 1 will be described with reference to FIGS. 2 to 4.

Referring to FIG. 2, the controller 1 may include the rotating wheel 100.

The rotating wheel 100 may be coupled to the main body 400 to allow at least a portion of the rotating wheel to rotate.

The rotating wheel 100 may be coupled on the main body 400. The rotating wheel 100 may be disposed on an upper side of the main body 400. When the controller 1 is disposed on the floor and used, the rotating wheel 100 to which a user can input a user input may be disposed on the upper side of the main body 400 that is confirmed by a user, thereby increasing the usability of the controller 1.

The rotating wheel 100 may include a fixed body 300 coupled to the main body 400. The fixed body 300 may be configured to be coupled to the main body 400 and relatively fixed with respect to the main body 400. The fixed body 300 may be supported by the main body 400.

The fixed body 300 may have a substantially cylindrical shape. At least a portion of the fixed body 300 may be formed by a plastic injection molding.

The rotating wheel 100 may include a rotating body 200 configured to be rotatable relative to the main body 400. The rotating body 200 may be configured to be rotatable relative to the fixed body 300.

The rotating body 200 may be rotatably coupled to the fixed body 300. That is, the rotating body 200 may be rotatable relatively to the main body 400 and the fixed body 300.

The rotating body 200 may have a substantially annular columnar shape with a hole defined at a center thereof. The fixed body 300 may be arranged at the center of the rotating body 200. A gap defined between the rotating body 200 and the fixed body 300 may be constant. The fixed body 300 may be arranged to be accommodated in the hole defined at the center of the rotating body 200. The hole defined at the center of the rotating body 200 may have a circular shape. The fixed body 300 may be provided to correspond to the hole defined at the center of the rotating body 200.

An upper surface of the rotating body 200 may be designed to have a stronger frictional force than the surrounding structure. The upper surface of the rotating body 200 may have a serration shape. The upper surface of the rotating body 200 may have a concave-convex shape.

At least a portion of the rotating body 200 may be formed by injection molding.

The rotating wheel 100 may include the wheel button 50. The wheel button 50 may be configured to be disposed on the rotating wheel 100 so as to be accessed by a user.

The wheel button 50 may be provided on the upper side of the rotating wheel 100. This allows a user to easily press the wheel button 50. The wheel button 50 may confirm a user input by being pressed from the upper side to the lower side.

The fixed body 300 may include the wheel button 50. The wheel button 50 may be disposed on the outside of the fixed body 300. Because the fixed body 300 is not configured to move relatively according to a user input, the durability of the wheel button 50 may be increased by being disposed on the fixed body 300.

The wheel button 50 may be configured to generate signals for the front, rear, right, and left side. Particularly, the wheel button 50 may include a central wheel button 50*e* provided on an inner side of an outer surface of the fixed body 300. The wheel button 50 may include a first wheel button 50*a* provided on the right side with respect to the central wheel button 50*e*, a second wheel button 50*b* provided on the front side with respect to the central wheel button 50*e*, a third wheel button 50*c* provided on the left side with respect to the central wheel button 50*e*, and a fourth wheel button 50*d* provided on the rear side with respect to the central wheel button 50*e*.

As will be described later, the first wheel button 50*a* to the fourth wheel button 50*d* may indicate front, rear, left, and right sides within the display apparatus 2-100. However, the present disclosure is not limited thereto, and each button may be set to correspond to a desired function according to the user's convenience.

The controller 1 may include the function button portion 60. The function button portion 60 may include a first function button 61*a* to a fourth function button 61*d* formed on the main body 400. The first function button 61*a* to the fourth function button 61*d* may receive other signals in addition to a user input received through rotation of the rotating wheel 100.

The first function button 61*a* may be disposed on the front right. The second function button 61*b* may be disposed on the front left. The third function button 61*c* may be disposed on the rear left. The fourth function button 61*d* may be disposed on the rear right.

The function button portion 60 may have a substantially rectangular shape. The first function button 61*a* to the fourth function button 61*d* may be arranged to correspond to each corner of the rectangle. The first function button 61*a* to the fourth function button 61*d* may each have a substantially rectangular shape.

As will be described later, the first function button 61*a* to the fourth function button 61*d* may generate signals related to functions such as power, menu view, and fast-backward within the display apparatus 2-100. However, the present disclosure is not limited thereto, and each button may be set to correspond to a desired function according to the user's convenience.

The controller 1 may include a function key 62 disposed between at least two function buttons 61 among the first function button 61*a* to the fourth function button 61*d*. The function key 62 may include a first function key 62*a* disposed between the first function button 61*a* and the second function button. The function key 62 may include a second function key 62*b* disposed between the third function button 61*c* and the fourth function button 61*d*.

The first function key 62*a* may be disposed in front of the second function key 62*b*.

The first function key 62*a* may extend along between the first function button 61*a* and the second function button 61*b*. The second function key 62*b* may extend along between the third function button 61*c* and the fourth function button 61*d*.

As described later, the first function key 62*a* may generate a signal regarding an increase in volume within the display apparatus 2-100. The second function key 62*b* may generate a signal regarding a decrease in volume within the display apparatus 2-100.

The controller 1 may include the charging portion 20. The charging portion 20 may include a solar cell 29 configured to generate electricity by light.

Referring to FIG. 3, the controller 1 may include a power terminal 470 disposed on one side of the controller 1. The power terminal 470 may be configured to be connected to a cable to supply power to the controller 1 via an external power source. The main body 400 may include the power terminal 470 disposed on a lateral side thereof. Accordingly, a cable capable of supplying power from the outside may be easily connected to the controller 1 without damaging the appearance.

The controller 1 may include a main body housing 410. The main body housing 410 may be configured to define the appearance of the main body 400.

The main body housing 410 may be provided to extend forward. The main body housing 410 may include a first housing inclined portion 411*a* defined to be inclined upwardly to a predetermined point along the front side. The predetermined point may be a point at which the function button portion 60 is arranged. That is, when the controller 1 is placed on a flat floor and used, a user may use the controller 1 that is inclined upwardly as the controller 1 extends forward. This may reduce the burden on the user's wrist.

The main body housing 410 may include a second housing inclined portion 411*b* that extends forward from a predetermined point and extends downwardly. The solar cell 29 may be disposed on the second housing inclined portion 411*b*. That is, when the controller 1 is placed on a flat floor and used, the solar cell 29 may be disposed toward the display apparatus 2-100, and thus electricity generation of the solar cell 29 may be accelerated.

The main body housing 410 may include a first main body housing part 420 and a second main body housing part 430 coupled to the first main body housing part 420. The first main body housing part 420 may be disposed on the upper side of the second main body housing part 430. The second main body housing part 430 may be disposed on the lower side of the first housing part.

The first main body housing part 420 may have a shape corresponding to that of the second main body housing part 430. The first main body housing part 420 and the second main body housing part 430 may be plastic injection molded products.

The second main body housing part 430 may be placed adjacent to the floor when the controller 1 is placed on the floor. At this time, in order to prevent the controller 1 from slipping on the floor, the controller 1 may include an anti-slip pad 460 disposed on the second main body housing part 430 to face the floor.

Referring to FIG. 4, the controller 1 may include the main body 400 and the rotating wheel 100.

The main body 400 may support the rotating wheel 100.

The rotating wheel 100 may include the fixed body 300 coupled to the main body 400 and the rotating body 200 rotatably coupled to the fixed body 300. The controller 1 may include the rotating wheel 100 including the rotating body 200 disposed to face at least one rib 490 and rotatably coupled to the fixed body 300.

The fixed body 300 may include a first fixed body part 310 coupled to the main body 400, and a second fixed body part 320 coupled to the first fixed body part 310 to allow the rotating body 200 to be rotatably coupled between the first fixed body part 310 and the second fixed body part 320.

Particularly, the rotating body 200 may include a wheel cover 210 disposed between the first fixed body part 310 and the second fixed body part 320. The wheel cover 210 may form an upper outer appearance of the rotating body 200.

The wheel cover 210 may be arranged to surround the fixed body 300. A distance from the main body 400 to an end portion of the wheel cover 210 may be substantially similar to a distance from the main body 400 to an end portion of the fixed body 300. As a result, the fixed body 300 and the rotating body 200 may have a sense of aesthetic.

The wheel cover 210 may be formed of a plastic material.

The controller 1 may include a wheel board 360. The wheel board 360 is configured to receive signals regarding a user input regarding the rotating wheel 100. A printed circuit may be arranged on the wheel board 360.

The fixed body 300 may include the wheel board 360 disposed between the first fixed body part 310 and the second fixed body part 320.

The wheel board 360 may have a shape corresponding to the shape of the fixed body 300.

The controller 1 may include a wheel sensor 810. The wheel sensor 810 may be configured to generate a signal regarding the rotation of the rotating wheel 100.

The wheel sensor 810 may be disposed on the wheel board 360. The wheel sensor 810 may be disposed to face the wheel cover 210. The wheel sensor 810 may interact with a portion of the wheel cover 210 facing the wheel sensor 810, thereby generating a signal regarding an amount of rotation of the wheel cover 210.

In other words, the wheel sensor 810 may be supported by the wheel board 360.

The controller 1 may include a clicker 900. The clicker 900 may be configured to generate sound or vibration in response to the rotation of the rotating body 200 so as to allow a user to feel the rotation of the rotating body 200.

In other words, the controller 1 may include the clicker 900 protruding from the rotating body 200 toward the main body 400 to allow an end portion of the clicker to be disposed between at least one rib 490.

At this time, the rotational sensation of the rotating body 200 felt by a user may be called a haptic sensation.

The rotating body 200 may include a wheel bracket 240. The wheel bracket 240 may be configured to couple the clicker 900 to the rotating body 200. The clicker 900 may be disposed between the wheel cover 210 and the wheel bracket 240. However, this is only an example of the arrangement of the clicker 900, and the clicker 900 may be arranged not only on the rotating body 200 but also on the main body 400.

The clicker 900 may be disposed on the rotating body 200. The clicker 900 may be formed to extend from the rotating body 200 toward the main body 400.

In other words, the wheel cover 210 may be disposed to face one end of a head 910 of the clicker 900. The rotating body 200 may include the wheel bracket 240 disposed to face the other end, which is located opposite to the one end of the head 910 of the clicker 900, and coupled to the wheel cover 210 so as to fix the clicker 900 to the rotating body 200. Accordingly, the clicker 900 may be stably fixed to the rotating body 200.

The main body 400 may include the at least one rib 490. The main body 400 may include the at least one rib 490 protruding toward the rotating body 200. The at least one rib 490 may be configured to interact with the clicker 900 to generate sound or vibration in response to the rotation of the rotating body 200.

The at least one rib 490 may be disposed to correspond to the clicker 900.

The main body 400 may include a main board 450. The main board 450 may be configured to receive a signal regarding a user input regarding the controller 1.

The main board 450 may be disposed between the first main body housing part 420 and the second main body housing part 430. The main board 450 may be disposed inside the main body housing 410.

The main board 450 may be connected to the wheel board 360 to receive a signal generated from the wheel board 360. The controller 1 may include a connection cable 500 to electrically connect the main board 450 and the wheel board 360. The connection cable 500 may have a flexible material. The connection cable 500 may extend from the inside of the rotating wheel 100 to the inside of the main body 400.

In other words, the wheel cover 210 may be configured to be rotatable with respect to the wheel board 360. The controller 1 may include the connection cable 500 formed of a flexible material to connect the main board 450 and the wheel board 360. That is, in order to stably connect the main board 450 and the wheel board 360, it is necessary to be careful not to twist or cut the connection cable 500.

The main board 450 may have a shape corresponding to the shape of the main body housing 410.

Figure 5:
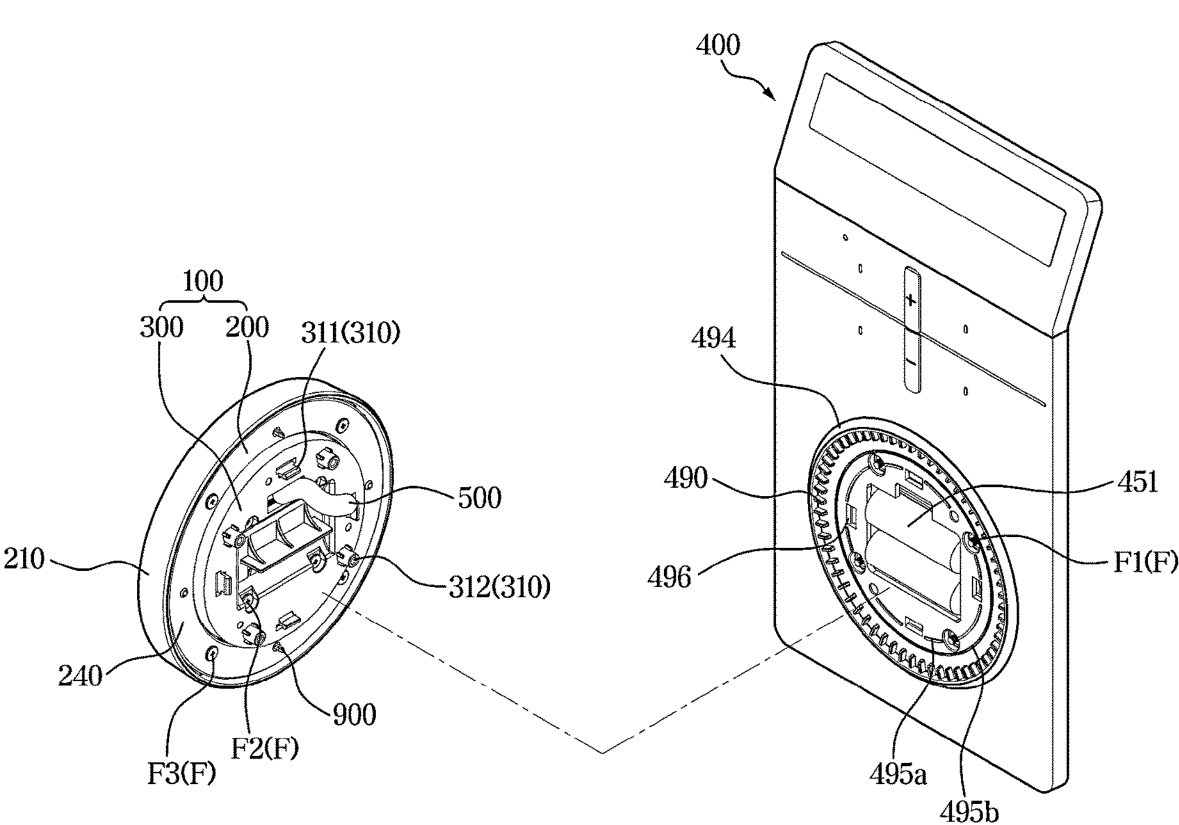
FIG. 5 is a view illustrating the controller of FIG. 2 disassembled into a rotating wheel and a main body according to an embodiment.

FIG. 5 is a view illustrating the controller 1 of FIG. 2 disassembled into the rotating wheel 100 and the main body 400.

The interaction between the rotating wheel 100 and the main body 400 will be described in detail with reference to FIG. 5.

The rotating wheel 100 may include the fixed body 300 provided to be coupled to the main body 400. The fixed body 300 may include the first fixed body part 310 coupled to the main body 400.

The first fixed body part 310 may be coupled to the main body 400 by a fastening member F. The fastening member F may be a member that fastens one configuration to another. For example, the fastening member F means all members that may be fastened, such as screws, bolts and nuts, rivets, adhesives, etc., and is not limited thereto.

The fastening member F provided to couple the first fixed body part 310 and the main body 400 may be referred to as a first fastening member F1.

The clicker 900 may be coupled to the rotating body 200, and the clicker 900 may make a user feel a haptic sensation when the clicker 900 comes into contact with the at least one rib 490 included in the main body 400.

It may be appropriate that the haptic sensation felt by a user is constant as the rotating body 200 rotates. Because the rotating body 200 generates a signal by rotating, it is not important a point from which the rotation begins. Accordingly, it may be appropriate for the haptic sensation to occur constantly as the rotating body 200 rotates, regardless of the position of the rotating body 200.

Accordingly, a gap between the clicker 900 disposed on the rotating body 200 and the at least one rib 490 or a gap the clicker 900 between a space provided between the at least one rib 490 may be arranged to be uniform in a circumferential direction based on a rotation center of the rotating body 200.

In other words, a gap between the rotating body 200 and the main body 400 may be uniform. For this, the fixed body 300 and the main body 400 may be coupled to each other at a certain height. This is because, when the fixed body 300 is coupled to the main body 400 at a certain height, the rotating body 200 and the main body 400 may have a regular gap.

In order that the fixed body 300 and the main body 400 have a regular gap, the fastening member F may be arranged rotationally symmetric with respect to the rotation center of the rotating body 200.

In order to describe that the fastening members F are arranged rotationally symmetric with respect to the rotation center of the rotating body 200, FIG. 5 illustrates that four fastening members F are respectively arranged at corners of a square with respect to the rotation center of the rotating body 200. However, this is merely an example, and as long as the fastening members F are arranged rotationally symmetric with respect to the rotation center of the rotating body 200, two, three, or more fastening members F may be provided.

In order for the rotating body 200 to rotate at the same height as the main body 400, the main body 400 may include wheel guide ribs 495*a* and 495*b* provided at positions corresponding to the rotating body 200.

The wheel guide ribs 495*a* and 495*b* may be formed to protrude from the main body housing 410 to a direction toward the rotating body 200. The wheel guide ribs may extend in the circumferential direction with respect to the rotation center of the rotating body 200.

The wheel guide ribs 495*a* and 495*b* may include a first wheel guide rib 495*a* disposed closer to the rotation center of the rotating body 200 and a second wheel guide rib 495*b* disposed further from the rotation center than the first wheel guide rib 495*a*.

The main body may include a cover rib 494 protruding toward the rotating body 200 from the outside of the at least one rib 490 based on the rotation center. The cover rib 494 may prevent the clicker 900 from being exposed to the outside of the controller 1 when the clicker 900 rotates. Accordingly, foreign substances may be prevented from interfering with the rotation of the clicker 900 when the clicker 900 rotates.

The cover rib 494 may extend in the circumferential direction based on the rotation center of the rotating body 200.

The first fixed body part 310 and the second fixed body part 320 may be coupled to each other by a second fastening member F2. The second fastening member F2 may be arranged rotationally symmetric with respect to the rotation center of the rotating body 200 so as to allow the rotating body 200 to be coupled to the fixed body 300 at a certain height.

The wheel cover 210 and the wheel bracket 240 may be coupled to each other by a third fastening member F3. The third fastening member F3 may be arranged rotationally symmetric with respect to the rotation center of the rotating body 200 so as to allow the clicker 900 to be coupled to the rotating body 200 at a certain height.

The connection cable 500 may extend toward the outside of the rotating body 200.

The controller 1 may include a capacitor 451. The capacitor 451 may store electricity generated by the solar cell 29.

The capacitor 451 may be formed at a position corresponding to the rotating wheel 100. Accordingly, the rotating wheel 100 may cover the capacitor 451. The capacitor 451 may be prevented from being exposed to the outside of the controller 1 by the rotating wheel 100.

The fixed body 300 may include a capacitor receiving portion 315 to receive the capacitor 451. The capacitor receiving portion 315 may be defined to be concave to allow the capacitor 451 to be seated therein. The capacitor receiving portion 315 may be provided to be concave toward the upper side.

Figure 6:
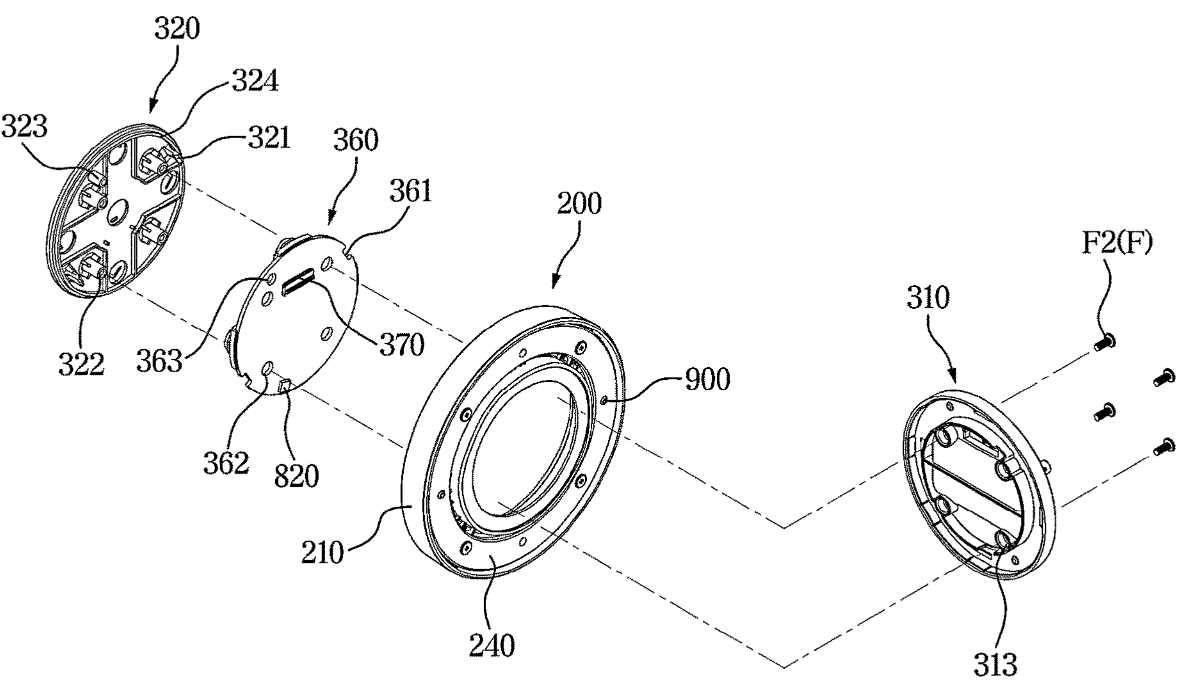
FIG. 6 is an exploded view of the rotating wheel of the controller of FIG. 5 according to an embodiment.

FIG. 6 is an exploded view of the rotating wheel 100 of the controller 1 of FIG. 5.

The configuration of the fixed body 300 and the rotating body 200 will be described with reference to FIG. 6.

The fixed body 300 may include the first fixed body part 310 and the second fixed body part 320.

The second fixed body part 320 may include a fixed body fastening boss 322 protruding toward the first fixed body part 310.

The first fixed body part 310 may include a fixed body fastening hole 313 provided to receive the fixed body fastening boss 322. The fixed body fastening boss 322 groove may be defined to be concave in a direction away from the second fixed body part 320.

The fixed body fastening boss 322 and the fixed body fastening boss 322 fastening groove may be fastened by the second fastening member F2. Accordingly, the first fixed body part 310 and the second fixed body part 320 may be coupled to each other. A plurality of fixed body fastening bosses 322 may be provided. The plurality of fixed body fastening bosses 322 may be arranged to be radially symmetrical about the rotation center of the rotating body 200.

The rotating body 200 may be disposed between the first fixed body part 310 and the second fixed body part 320. The rotating body 200 may be rotatably coupled to the fixed body 300 as the first fixed body part 310 is coupled to the second fixed body part 320.

A mounting space 226 (FIG. 7) penetrated toward the first fixed body part 310 and the second fixed body part 320 may be defined on the inside of the rotating body 200. The mounting space 226 may have a substantially cylindrical shape in which the rotation center of the rotating body 200 corresponds to a central axis.

Particularly, the wheel cover 210 may include the mounting space 226. The wheel cover 210 may include a reaction flange 220 on a side between the first fixed body part 310 and the second fixed body part 320 of the mounting space 226. The reaction flange 220 may prevent the second fixed body part 320 from moving toward the first fixed body part 310 through the mounting space 226. The reaction flange 220 may be provided to support the second fixed body part 320.

The reaction flange 220 may extend toward the rotation center of the rotating body 200. The reaction flange 220 may extend in the circumferential direction with respect to the rotation center of the rotating body 200.

The mounting space 226 may have a substantially concave shape toward the first fixed body part 310 by the reaction flange 220.

The fixed body 300 may include the wheel board 360. The wheel board 360 may be electrically connected to electrical components such as the wheel sensor 810.

The wheel board 360 may be disposed between the rotating body 200 and the second fixed body part 320. The wheel board 360 may be disposed between the wheel cover 210 and the second fixed body part 320. The wheel board 360 may be accommodated in the mounting space 226. The wheel board 360 may be accommodated in the mounting space 226 and supported by the first fixed body part 310.

The wheel board 360 may have a shape corresponding to the second fixed body part 320. The second fixed body part 320 may have a shape provided to be accommodated in the mounting space 226. Accordingly, the second fixed body part 320 and the wheel board 360 may be accommodated in the mounting space 226.

A fastening boss hole 362 penetrated by the fixed body fastening boss 322 included in the second fixed body part 320 may be defined on the wheel board 360. The fastening boss hole 362 may be arranged to correspond to the fixed body fastening boss 322. Accordingly, the fixed body fastening boss 322 may penetrate the wheel board 360 and be accommodated in the fixed body fastening hole 313.

The second fixed body part 320 may include a direction indicating boss 323 protruding toward the wheel board 360. A direction indicating boss hole 363 penetrated by the direction indicating boss 323 may be defined on the wheel board 360. By penetrating the direction indicating boss hole 363 with the direction indicating boss 323, the wheel board 360 may be coupled to the second fixed body part 320 in an accurate direction at an accurate position.

The second fixed body part 320 may include a second fixed body hook 321 protruding toward the wheel board 360. A hook fixing hole 361 that is concave toward the rotation center of the rotating body 200 to allow the second fixed body hook 321 to be fastened may be defined on the wheel board 360. As the second fixed body hook 321 is coupled to the hook fixing hole 361, the second fixed body part 320 may be coupled to the wheel board 360.

Particularly, the second fixed body hook 321 may be mounted in the first fixed body hook hole 312 (FIG. 11) formed in the first fixed body part 310. The second fixed body hook 321 may be mounted in the first fixed body hook hole 312 by passing through the hook fixing hole 361.

The second fixed body part 320 may include a board guide 324 provided to guide the wheel board 360 to be received inside.

The board guide 324 may be disposed adjacent to an edge of the second fixed body part 320. The board guide 324 may accommodate the edge of the wheel board 360 on the inside.

The board guide 324 may protrude toward the wheel board 360. The board guide 324 may extend in the circumferential direction with respect to the rotation center of the rotating body 200.

The controller 1 may include the wheel sensor 810 electrically connected to the wheel board 360. The rotating wheel 100 may include the wheel sensor 810. The wheel sensor 810 may detect an amount of rotation of the rotating body 200.

The wheel sensor 810 may be disposed on the wheel board 360. The wheel sensor 810 may be disposed between the wheel board 360 and the wheel cover 210. The wheel sensor 810 may be disposed to face the reaction flange 220.

In other words, the wheel cover 210 may include the reaction flange 220 extending toward the rotation axis of the rotating body 200 so as to face the wheel board 360 with the wheel sensor 810 interposed therebetween. Accordingly, an object recognized by the wheel sensor 810 may be provided.

The wheel sensor 810 may include a sensor configured to detect the amount of rotation of the rotating body 200 by interacting with the wheel cover 210. For example, the wheel sensor 810 may be an optical sensor. The optical sensor means a device that detects light.

For example, the optical sensor may operate based on the internal photoelectric effect. The photoelectric effect is the phenomenon in which, when light energy or photons strike a metal surface, free electrons of metal are released so as to generate electron flow or current.

In other words, the wheel sensor 810 may include an optical sensor.

The controller 1 may include a connector 370 provided to connect the wheel board 360 and the connection cable 500. The connector 370 may be disposed so as to face the main body 400.

Figure 7:
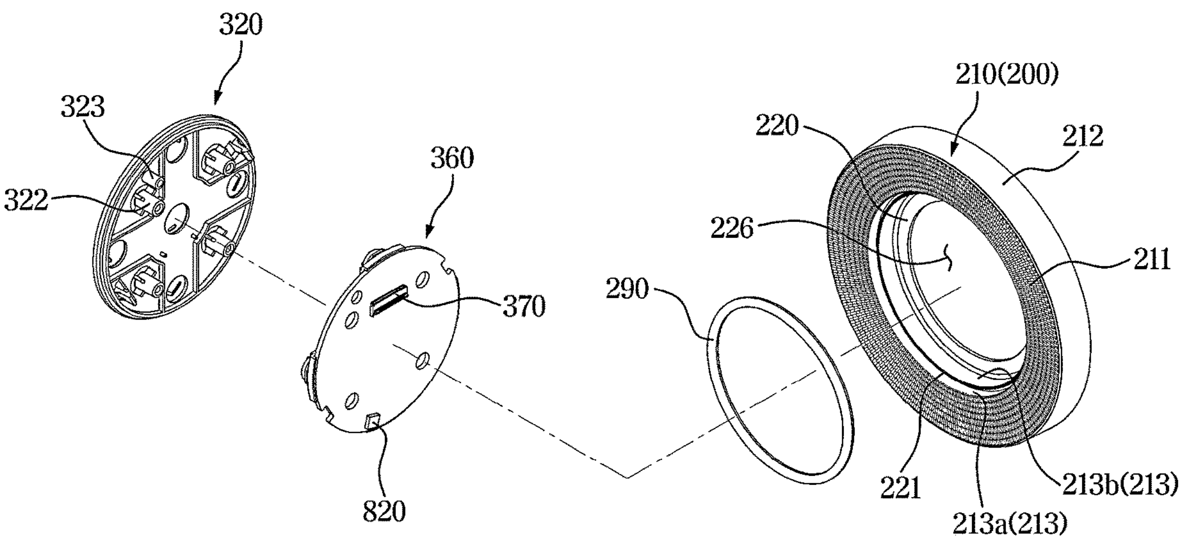
FIG. 7 is an exploded view of the rotating wheel of the controller of FIG. 6 except for a first fixed body part according to an embodiment.
Figure 8:
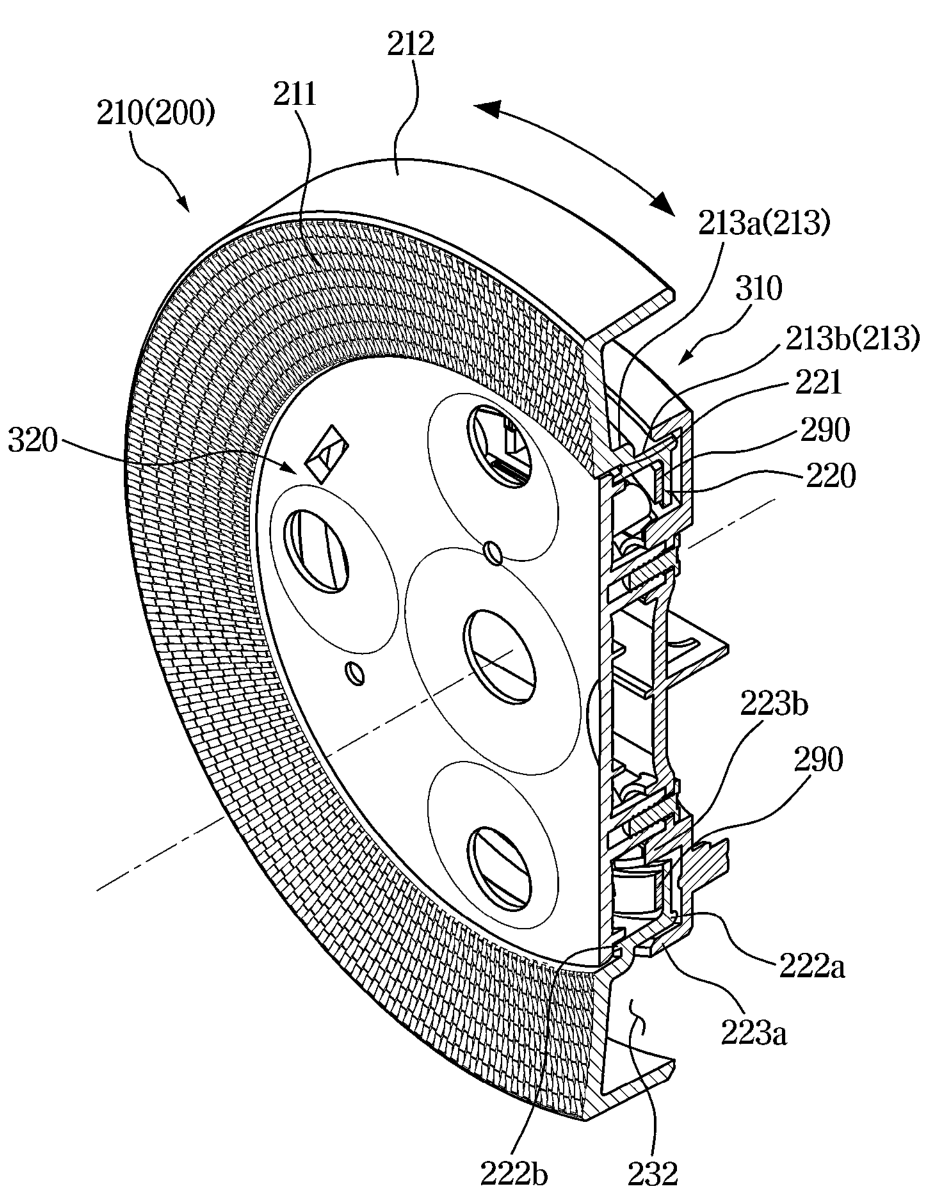
FIG. 8 is a cross-sectional perspective view illustrating a cross section of the rotating wheel with respect to a configuration related to rotation of the rotating wheel, so as to illustrate at least a portion of the rotating wheel of the controller of FIG. 5 according to an embodiment.

FIG. 7 is an exploded view of the rotating wheel 100 of the controller 1 of FIG. 6 except for the first fixed body part 310. FIG. 8 is a cross-sectional perspective view illustrating a cross section of the rotating wheel 100 with respect to a configuration related to rotation of the rotating wheel 100, so as to illustrate at least a portion of the rotating wheel 100 of the controller of FIG. 5.

The configuration of the wheel cover 210 and the wheel sensor 810 will be described with reference to FIGS. 7 and 8.

The mounting space 226 penetrated toward the first fixed body part 310 (FIG. 6) and the second fixed body part 320 may be defined at a position, which corresponds to the rotation center of the rotating body 200, in the wheel cover 210.

The wheel cover 210 may include a contact surface 211 exposed toward the outside. The contact surface 211 may be arranged to be exposed toward the upper side. The contact surface 211 may be arranged to surround the mounting space 226. The contact surface 211 may have an annular shape. A user can control the controller 1 by manipulating the contact surface 211 that is exposed to the outside.

In other words, the wheel cover 210 may include the contact surface 211 arranged adjacent to an outer surface of the second fixed body part 320 provided to be exposed to the outside of the second fixed body part 320. The contact surface 211 may extend radially from the second fixed body part 320 with respect to the rotation axis of the rotating body 200. Accordingly, a user can easily touch the contact surface 211. Accordingly, the user's operational convenience is increased.

The wheel cover 210 may include a wheel outer wall 212 extending from an outer side of the contact surface 211 toward the main body 400 (FIG. 2). The wheel outer wall 212 may be bent on the outer side of the contact surface 211. The wheel outer wall 212 may extend from an edge radially farther from the contact surface 211 with respect to the rotation center of the rotating body 200. The wheel outer wall 212 may be provided to extend circumferentially with respect to the rotation center of the rotating body 200 along the contact surface 211. The wheel outer wall 212 may be provided to prevent the clicker 900 from being exposed to the outside. The wheel outer wall 212 may be substantially perpendicular to the contact surface 211.

The wheel cover 210 may include a wheel inner wall 213 extending from the inner side of the contact surface 211 toward the main body 400. The wheel inner wall 213 may be bent on the inner side of the contact surface 211. The wheel inner wall 213 may extend from an edge radially closer to the contact surface 211 with respect to the rotation center of the rotating body 200. The wheel inner wall 213 may be provided to extend circumferentially with respect to the rotation center of the rotating body 200 along the contact surface 211. The wheel inner wall 213 may be substantially perpendicular to the contact surface 211.

The wheel inner wall 213 may include a first wheel inner wall 213*a* connected to the contact surface 211. The first wheel inner wall 213*a* may be bent at the contact surface 211 and extend toward the reaction flange 220.

The wheel cover 210 may include a step flange 221 extending from the first inner wall toward the rotation center of the rotating body 200. The step flange 221 may extend in the circumferential direction with respect to the rotation center of the rotating body 200.

The wheel cover 210 may include a second protruding rib 222*b* protruding from the step flange 221. The second protruding rib 222*b* may protrude toward the second fixed body part 320. The second protruding rib 222*b* may support the second fixed body part 320. The second protruding rib 222*b* may come into contact with the second fixed body part 320.

As the second fixed body part 320 comes into contact with the second protruding rib 222*b*, a contact area 211 may be reduced. In order that the wheel cover 210 is supported while rotating, the wheel cover 210 may need to be supported by some configuration. When the wheel cover 210 rotates while being supported, a frictional force may be applied to the wheel cover 210 due to the movement of the wheel cover 210. The frictional force applied to the wheel cover 210 may be reduced by reducing the contact area between the wheel cover 210 and the supporting configuration.

The second protruding rib **222*b* may be bent and extended upward from an end of the step flange 221**.

At this time, the step flange 221 may support the second protruding rib **222*b***.

The wheel cover 210 may include a second wheel inner wall **213*b* extending from the step flange 221 toward the reaction flange 220. The second wheel cover 210 may connect the step flange 221 and the reaction flange 220**.

The wheel cover 210 may include a first protruding rib **222*a* protruding in a direction from the reaction flange 220 toward the first fixed body part 310. The first protruding rib 222*a* may support the first fixed body part 310. The first protruding rib 222*a* may come into contact with the first fixed body part 310. A description about that the frictional force applied on the wheel cover 210 is reduced by the first protruding rib 222*a* is the same as a description of a second protruding rib 222*b***.

The first protruding rib **222*a* may extend from an edge, which is located further from the rotation center of the rotating body 200, of the reaction flange 220. An extension direction of the first protruding rib 222*a* may coincide with an extension direction of the first wheel outer wall 212**.

At this time, the reaction flange 220 may support the first protruding rib **222*a***.

In other words, the fixed body 300 may include the first fixed body part 310 configured to be coupled to the main body 400, and the second fixed body part 320 coupled to the first fixed body part 310 with the wheel cover 210 interposed therebetween, so as to prevent the wheel cover 210 from being separated from the fixed body 300. The wheel cover 210 may include the first protruding rib **222*a* protruding toward the first fixed body part 310 so as to be rotatable by being in contact with the first fixed body part 310. The wheel cover 210 may further include the second protruding rib 222*b* protruding in a direction opposite to the direction in which the first protruding rib 222*a* protrudes toward the second fixed body part 320 so as to be rotatable by being in contact with the second fixed body part 320. Accordingly, a frictional force may be reduced as the wheel cover 210 rotates while the first protruding rib 222*a* and the first fixed body part 310 or the second protruding rib 222 band the second fixed body part 320** come into contact.

The wheel sensor 810 may output a signal corresponding to the amount of rotation of the rotating body 200 by using light that is reflected after the wheel sensor 810 emits light to the reaction flange 220. In order for the wheel sensor 810 to output an accurate signal, the reaction flange 220 may include a uniform surface facing the wheel sensor 810.

The wheel cover 210 may include a plastic material. The wheel cover 210 may include a coating layer 290 disposed on the reaction flange 220 to allow the wheel sensor 810 to output an accurate signal. The coating layer 290 may be a component disposed on the reaction flange 220.

The coating layer 290 may extend along the circumferential direction with respect to the rotation center of the rotating body 200. The coating layer 290 may be arranged to face a path through which the wheel sensor 810 rotates with respect to the rotation center of the rotating body 200.

In other words, the wheel cover 210 may include the coating layer 290 provided on the reaction flange 220 to provide a uniform surface facing the optical sensor. A processor 41 may recognize the amount of rotation of the rotating body 200 and control the transmitter 30 based on a signal output by the optical sensor recognizing light reflected by the coating layer 290. Accordingly, the reflected light recognized by the optical sensor may be reflected through the uniform surface.

An accommodation space 232 may be defined between the wheel outer wall 212 and the contact surface 211. The accommodation space 232 may be a space provided to accommodate the clicker 900. The accommodation space 232 may be a space surrounded by the wheel outer wall 212, the contact surface 211, and the wheel inner wall 213.

In other words, the rotating body 200 may include the wheel cover 210, in which the accommodation space 232 that is concave in a direction away from the at least one rib 490 is defined, so as to allow at least a portion of the clicker 900 to be disposed on the inside. Accordingly, the clicker 900 may be stably fixed to the rotating wheel 100.

The first fixed body part 310 may include a first anti-separation rib **223*a* and a second anti-separation rib 223*b*. The first anti-separation rib 223*a*, which is located away from the rotation center of the rotating body 200, may be arranged to face the wheel inner wall 213 of the wheel cover 210. The second anti-separation rib 223*b* may protrude toward the wheel board 360 and support the wheel board 360**.

The reaction flange 220 may be disposed between the first anti-separation rib **223*a* and the second anti-separation rib 223*b*. The rotation of the reaction flange 220 may be guided by the first anti-separation rib 223*a* and the second anti-separation rib 223*b*. Accordingly, the rotation of the wheel cover 210** may be guided.

The rotation of the rotating body 200 will be described in more detail with reference to FIG. 8.

The wheel cover 210 may be disposed between the first fixed body part 310 and the second fixed body part 320. Because the reaction flange 220 of the wheel cover 210 is disposed between the first fixed body part 310 and the second fixed body part 320, the wheel cover 210 may not be separated in the direction of the rotation axis of the rotating body 200.

Because the first anti-separation rib **223*a* of the first fixed body part 310 is arranged on the outer side of the reaction flange 220, the wheel cover 210 may not be separated in a radial direction of the rotation center of the rotating body 200**.

Accordingly, the wheel cover 210 may not be separated from the fixed body 300.

The wheel cover 210 may be fixed only in the direction of the rotation axis of the rotating body 200, and thus the rotation of the wheel cover 210 in the radial direction of the rotation axis of the rotating body 200 may be free.

When the wheel cover 210 rotates, the second protruding rib **222*b* of the wheel cover 210 may come into contact with the second fixed body part 320, and the first protruding rib 222*a* of the wheel cover 210 may come into contact with the first fixed body part 310. Accordingly, the frictional force may be reduced when the rotating body 200** rotates.

When the rotating body 200 rotates, the wheel sensor 810 may output a signal regarding the amount of rotation of the rotating body 200 by interacting with the rotating body 200. The wheel sensor 810 may interact with the reaction flange 220 of the wheel cover 210 or interact with the coating layer 290, thereby outputting a signal regarding the amount of rotation of the rotating body 200.

The rotating wheel 100 may include the wheel button 50 (FIG. 2) for the convenience of the user. This will be described below with reference to the related drawings.

Figure 9:
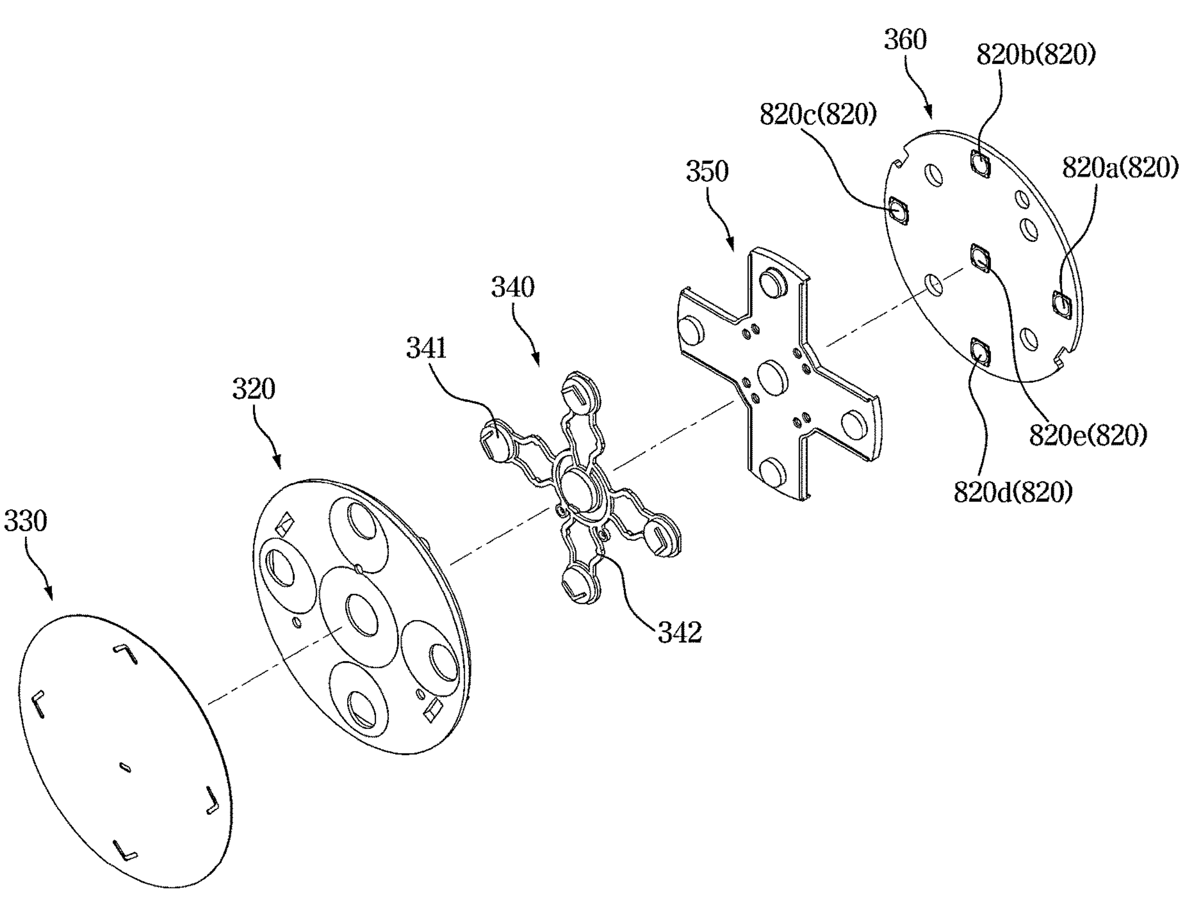
FIG. 9 is an exploded view of a configuration supported on a rotating body of the controller of FIG. 5 according to an embodiment.
Figure 10:
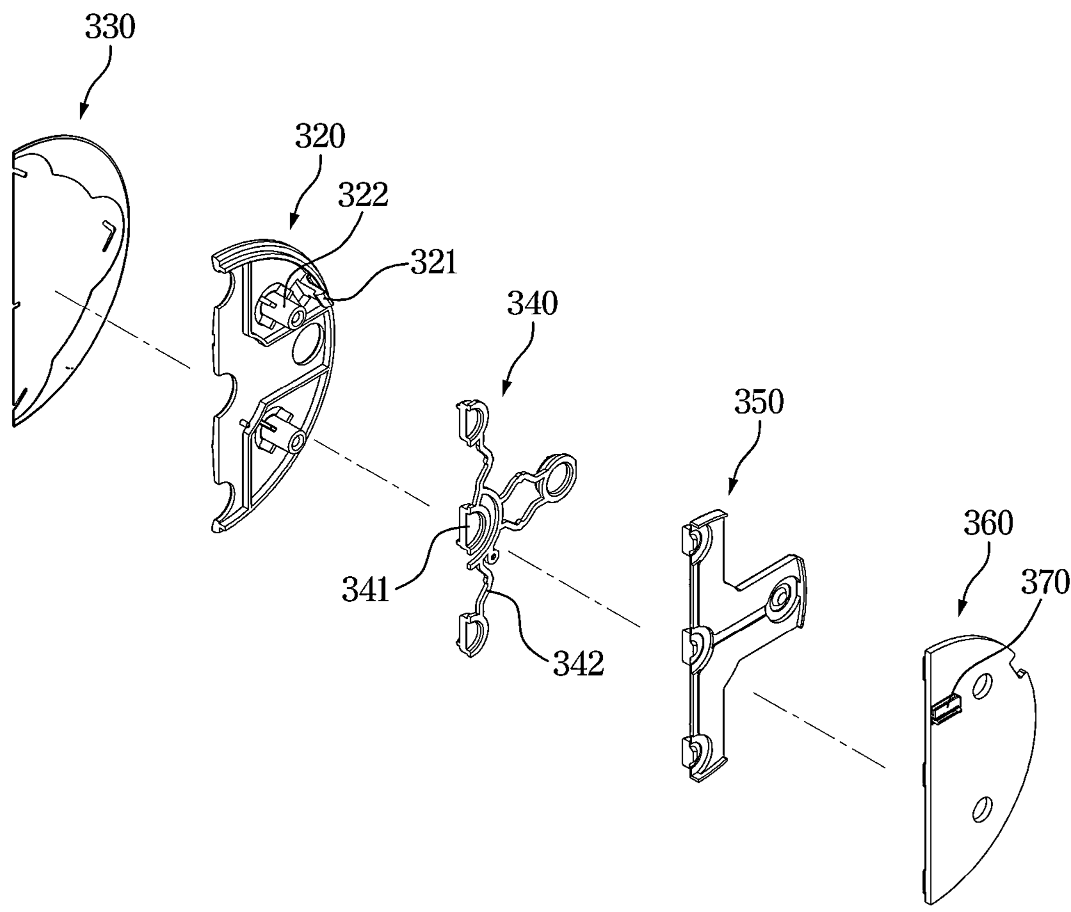
FIG. 10 is a cross-sectional perspective view of the configuration of the controller of FIG. 9 when viewed from a different angle according to an embodiment.

FIG. 9 is an exploded view of a configuration supported on the rotating body 200 of the controller 1 of FIG. 5. FIG. 10 is a cross-sectional perspective view of the configuration of the controller 1 of FIG. 9 when viewed from a different angle.

The wheel button 50 (FIG. 2) will be described with reference to FIGS. 9 and 10.

The rotating wheel 100 may include the wheel button 50. The wheel button 50 is a configuration that allows a user to control the controller 1 by contact or pressure, and is a configuration included in the rotating wheel 100.

The fixed body 300 may include the wheel button 50. The rotating body 200 may also include the wheel button 50. However, for convenience of description, it is assumed that the wheel button 50 is formed on the fixed body 300.

The wheel button 50 may include the second fixed body part 320. The wheel button 50 may include a button cap 330 provided to cover the second fixed body part 320. The wheel button 50 may include a wheel button delivery 340 arranged to penetrate the second fixed body part 320. The wheel button 50 may include a wheel button damper 350 disposed between the wheel button delivery 340 and the wheel board 360. The wheel button 50 may include a wheel button sensor 820 configured to output a signal corresponding to a user's contact or pressure.

In other words, the controller 1 may include the wheel button sensor 820 configured to output a signal to the processor 41 as the second fixed body part 320 is pressed.

The wheel button 50 may be formed on the fixed body 300 and thus the above configuration may be included in the fixed body 300.

In other words, the fixed body 300 may include the second fixed body part 320.

The fixed body 300 may include the button cap 330 attached to a surface, which is provided in an opposite direction toward the wheel board 360, of the second fixed body part 320. The button cap 330 may be provided to cover the second fixed body part 320. The button cap 330 may be a sheet having a thickness less than a thickness of the second fixed body part 320. The button cap 330 may be attached to the second fixed body part 320 by an adhesive.

The fixed body 300 may include the wheel button delivery 340 disposed between the second fixed body part 320 and the wheel board 360. The wheel button delivery 340 may include a plastic material. The wheel button delivery 340 may be formed by injection molding.

The wheel button delivery 340 may include a delivery identification portion 341 provided to be in contact with a user or pressed by a user. A plurality of delivery identification portions 341 may be provided. The plurality of delivery identification portions 341 may be respectively disposed at the center of the second fixed body part 320 and at each of the front, rear, left, and right sides with respect to the center of the second fixed body part 320. Accordingly, a user can select a menu or perform control to make a selection corresponding to the front, rear, left, and right sides, respectively.

The wheel button delivery 340 may include a delivery connection portion 342. The delivery connection portion 342 may connect the plurality of delivery identification portions 341. Accordingly, the wheel button delivery 340 may be produced by a single injection process.

The delivery identification portion 341 may protrude in a direction further from the wheel board 360 than the delivery connection portion 342.

The delivery identification portion 341 may be exposed to the outside of the fixed body 300 by penetrating the second fixed body part 320. For this, a hole may be defined in the second fixed body part 320 at a position corresponding to the delivery identification portion 341.

At least a portion of the delivery identification portion 341 may be exposed to the outside of the fixed body 300 by penetrating the button cap 330. For this, a hole may be defined in the button cap 330 at a position corresponding to the delivery identification portion 341.

A user can easily identify a position of the delivery identification portion 341 as at least a portion of the delivery identification portion 341 penetrates the button cap 330. This is because the at least a portion of the delivery identification portion 341, which is exposed to the outside, protrudes outward from the button cap 330 arranged around the delivery identification portion 341.

The second fixed body part 320 may have a shape that is recessed toward the wheel board 360 and formed around the hole through which the delivery identification portion 341 passes. This allows a user to easily identify the position of the delivery identification portion 341.

The delivery identification portion 341 may have a shape that protrudes toward the wheel board 360 at a position corresponding to the position of the wheel button sensor 820. Accordingly, even when a user contacts or presses the delivery identification portion 341, a signal regarding the contact or press may be accurately transmitted to the wheel button sensor 820.

The controller 1 may include the wheel button sensor 820. The wheel button sensor 820 may be a sensor that identifies that a user contacts or presses the rotating wheel 100. For example, the wheel button sensor 820 may be a dome sensor or a pressure sensor.

The wheel button sensor 820 may be disposed on the wheel board 360. The wheel button sensor 820 may be disposed between the wheel board 360 and the wheel button delivery 340. The wheel button sensor 820 may output a stimulus, which is transmitted when a user contacts or presses the wheel button delivery 340, as a signal.

The wheel button sensor 820 may be provided in plurality in accordance with the delivery identification portion 341. The wheel button sensor 820 may be disposed at a position corresponding to the delivery identification portion 341.

The fixed body 300 may include the wheel button damper 350 disposed between the wheel button delivery 340 and the wheel button sensor 820. The wheel button damper 350 may alleviate a stimulus transmitted to the sensor by the wheel button delivery 340. Accordingly, the wheel button damper 350 may increase the durability of the wheel button sensor 820.

The wheel button damper 350 may have a material capable of damping. For example, the wheel button damper 350 may include a rubber material.

The wheel button damper 350 may have a shape that protrudes toward the delivery identification portion 341 at a position corresponding to the delivery identification portion 341. A recess that is recessed in a direction away from the wheel button damper 350 so as to accommodate the protruding shape of the wheel button damper 350 may be defined in the delivery identification portion 341.

The wheel button damper 350 may include a shape that protrudes toward the wheel button sensor 820. Accordingly, the stimulus transmitted to the wheel button damper 350 may be focused toward the wheel button sensor 820.

A peripheral thickness, which protrudes toward the wheel button sensor 820, in the wheel button damper 350 may be less than a thickness of a periphery of the protruding shape. Accordingly, when the delivery identification portion 341 is pressed, the corresponding portion of the wheel button damper 350 may easily change. Accordingly, a user can easily press the wheel button sensor 820.

The wheel button sensor 820 may be provided in plurality. The wheel button sensor 820 may include a first wheel button sensor 820*a* corresponding to the first wheel button 50*a*. The wheel button sensor may include a second wheel button sensor 820*b* corresponding to the second wheel button 50*b*. The wheel button sensor may include a third wheel button sensor 820*c* corresponding to the third wheel button 50*c*. The wheel button sensor may include a fourth wheel button sensor 820*d* corresponding to the fourth wheel button 50*d*. The wheel button sensor may include a central wheel button sensor 820*e* corresponding to the central wheel button 50*e*.

Figure 11:
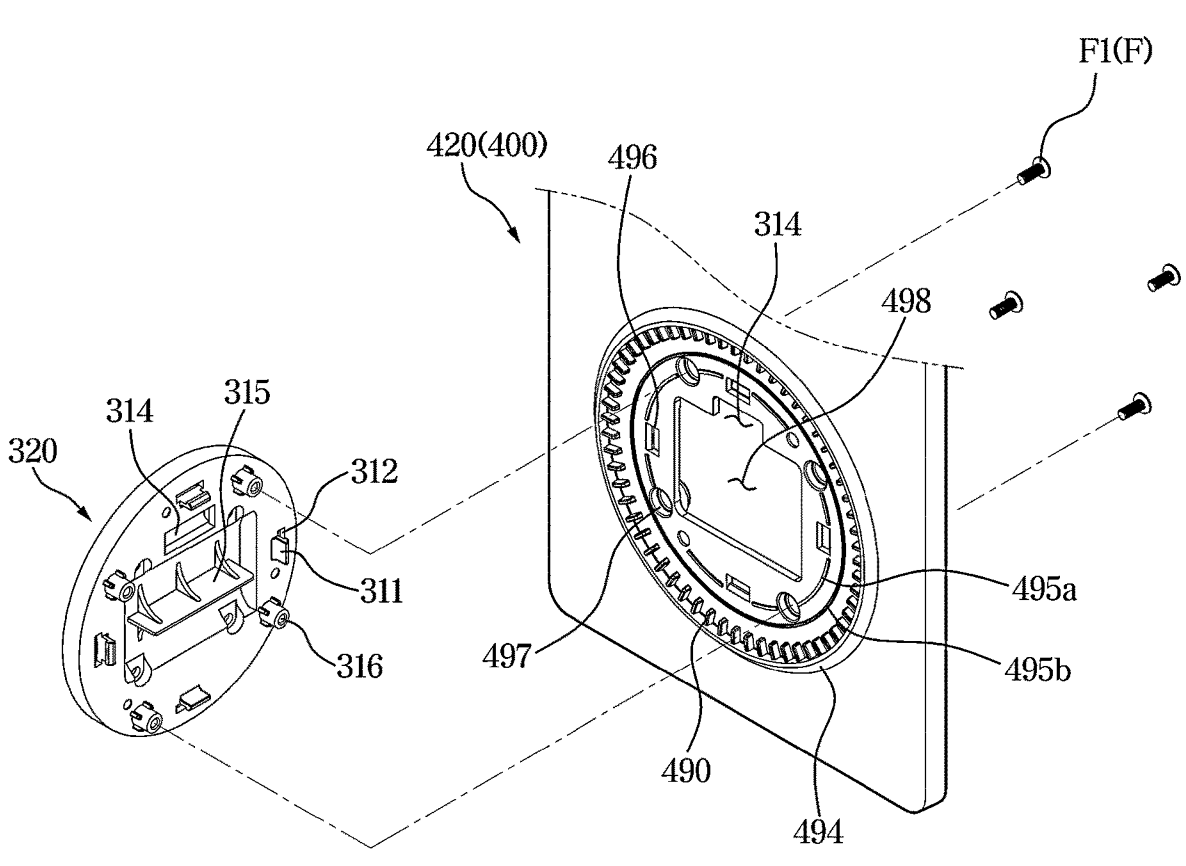
FIG. 11 is an exploded view illustrating the controller of FIG. 5 disassembled into the first fixed body part and the main body according to an embodiment.

FIG. 11 is an exploded view illustrating the controller 1 of FIG. 5 disassembled into the first fixed body part 310 and the main body 400.

The coupling of the first fixed body part 310 and the main body 400 will be described with reference to FIG. 11.

The main body 400 may include the first main body housing part 420 disposed to face the first fixed body part 310.

The first fixed body part 310 may include a first fixed body hook 311 protruding toward the first main body housing part 420. The first main body housing part 420 may include a second fixed body hook hole 496 defined at a position corresponding to the first fixed body hook 311. The first fixed body hook 311 may be mounted in the second fixed body hook hole 496.

The first fixed body part 310 may include a body fastening boss 316 protruding toward the first main body housing part 420.

A body fastening boss 316 groove 497 may be defined at a position, which corresponds to the body fastening boss 316, in the first main body housing part 420. The body fastening boss groove 497 may be recessed in a direction away from the body fastening boss 316. The body fastening boss groove 497 may be provided to receive the body fastening boss 316. A fastening member F may penetrate the body fastening boss groove 497 and the body fastening boss 316 to couple the first fixed body part 310 and the first main body housing part 420.

A connection cable hole 314 through which the connection cable 500 (FIG. 5) passes may be defined in the first fixed body part 310. The connection cable hole 314 through which the connection cable 500 passes may be defined in the first main body housing part 420.

A capacitor space 498 penetrated toward the first fixed body part 310 to accommodate the capacitor 451 (FIG. 15) may be defined in the first main body housing part 420. The first fixed body part 310 may include a capacitor accommodating portion 315 that is recessed in a direction away from the capacitor 451 so as to accommodate the capacitor 451.

The first main body housing part 420 may include the at least one rib 490. The first main body housing part 420 may include the cover rib 494 surrounding the at least one rib 490 and protruding toward the first fixed body part 310. The cover rib 494 may cover the at least one rib 490 to prevent the at least one rib 490 from being exposed to the outside.

Figure 12:
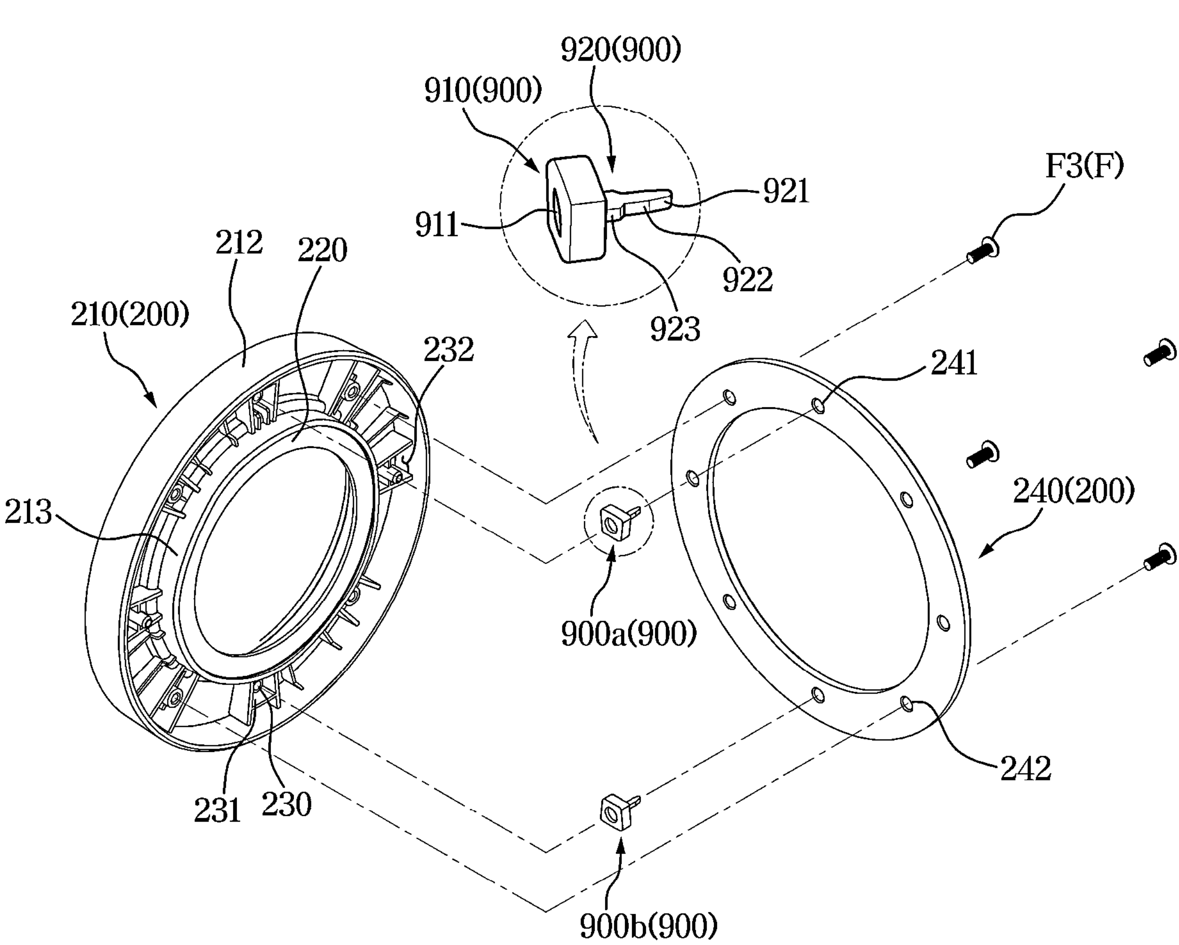
FIG. 12 is an exploded view of the rotating wheel of the controller of FIG. 5 according to an embodiment.

FIG. 12 is an exploded view of the rotating wheel 100 of the controller 1 of FIG. 5.

The rotating body 200 and the clicker 900 will be described with reference to FIG. 12.

The controller 1 may include the clicker 900 configured to allow a user to sense the rotation of the rotating wheel 100.

The clicker 900 may include an elastic material. For example, the clicker 900 may include a rubber material.

The clicker 900 may include the head 910 coupled to the wheel cover 210. The head 910 may have a polygonal shape to prevent rotation. A fixing groove that is recessed in the opposite direction of the wheel cover 210 may be defined in the head 910.

In other words, the clicker 900 may include the head 910 coupled to the rotating body 200.

The wheel cover 210 may include a fixing protrusion 230 provided to protrude toward the clicker 900 so as to be accommodated in the fixing groove 911 of the clicker 900. The fixing protrusion 230 may have a shape corresponding to the fixing groove 911 so as to be received and fixed in the fixing groove 911.

A head groove 231 that is disposed adjacent to the fixing protrusion and recessed in a direction away from the clicker 900 to accommodate the head 910 of the clicker 900 may be defined in the wheel cover 210. The fixing groove 911 may have a shape corresponding to the head 910 of the clicker 900 so as to fix the clicker 900.

In other words, the fixing groove 911 that is recessed in the opposite direction of the wheel cover 210 may be defined in the head 910 of the clicker 900. The wheel cover 210 may include the fixing protrusion 230 provided to protrude toward the fixing groove 911 corresponding to the fixing groove 911 so as to be received and fixed in the fixing groove 911. The wheel cover 210 may include the head groove 231 that is recessed in the direction away from the head 910 corresponding to the head 910 so as to be received and fixed in the head 910 of the clicker 900. Accordingly, even when the clicker 900 moves while applying impact to the at least one rib 490, damage to the clicker 900 may be prevented.

The clicker 900 may include a neck 920 extending from the head 910 in a direction away the wheel cover 210. The neck 920 may generate sound or vibration when the rotating wheel 100 rotates due to elastic deformation.

In other words, the clicker 900 may include the neck 920 extending from the head 910 toward the main body 400.

The neck 920 may include an inclined portion 921 to easily pass the at least one rib 490 (FIG. 13) while pressing the at least one rib 490. In the inclined portion 921, a surface facing the at least one rib 490 may be inclined.

In other words, the neck 920 may include the inclined portion 921 that is inclined toward an end portion to allow a resistance generated by a first rib 490*a* to decrease when the clicker 900 is in an elastic position. Accordingly, it is possible to prevent the neck 920 from breaking when the neck 920 moves while applying impact to the at least one rib 490.

The neck 920 may include a reinforcing portion 923 extending from the head 910 to prevent the neck 920 from being separated from the head 910. A thickness of the reinforcing portion 923 may be greater than a thickness of the inclined portion 921.

The neck 920 may include an extension 922 connecting the reinforcing portion 923 and the inclined portion 921.

In other words, the clicker 900 may include the extension 922 extending from the inclined portion 921 toward the head 910. The clicker 900 may include the reinforcing portion 923 connected to the extension 922 and the head 910 and having a cross-sectional area greater than that of the extension 922 to reinforce the connection between the neck 920 and the head 910. Accordingly, the neck 920 may be prevented from breaking while the clicker 900 moves while applying impact to the at least one rib 490.

The clicker 900 may be provided in plurality. The plurality of clickers 900 may be arranged to be rotationally symmetrical with respect to the rotation center of the rotating body 200. It is required for a user to feel the same sensation regardless of a portion of the rotating body 200 that is pressed to rotate the rotating body 200. At this time, when the rotating body 200 is not rotationally symmetrical with respect to the rotation center, a sensation on a side in which the clicker 900 is arranged and a sensation on a side in which the clicker 900 is not arranged may differ depending on the presence or absence of the clicker 900. The plurality of clickers 900 may be arranged to be rotationally symmetrical with respect to the rotation axis, thereby allowing a user to feel the same sensation regarding rotation. For example, the plurality of clickers 900 may include a first clicker 900*a* and a second clicker 900*b* disposed in an opposite direction of the first clicker 900*a* with respect to the rotation center of the rotating body 200.

The rotating body 200 may include the wheel bracket 240 to allow the neck 920 to be disposed between the rotating body 200 and the wheel cover 210.

The wheel bracket 240 may have an annular shape. The wheel bracket 240 may have an annular flat plate shape.

The wheel bracket 240 may have a material with a higher density than the wheel cover 210 to allow a user to feel a sense of weight when rotating the rotating body 200. For example, the wheel bracket 240 may include a metal material.

The wheel bracket 240 may be coupled to the wheel cover 210 by the third fastening member F3. The third fastening member F3 may be arranged rotationally symmetric with respect to the rotation center of the rotating body 200 to allow the rotating body 200 to have a sense of weight that is rotationally symmetric.

A fastening hole 242 through which the third fastening member F3 penetrates may be defined in the wheel bracket 240. A clicker penetration hole 241 through which the neck 920 of the clicker 900 penetrates may be defined in the wheel bracket 240. The fastening hole 242 and the clicker penetration hole 241 may be provided in plurality. For example, four fastening holes 242 and four clicker penetration holes 241 may be arranged alternately.

The clicker 900 may be fixed to the rotating body 200 when the wheel bracket 240 is mounted on the wheel cover 210.

Figure 13:
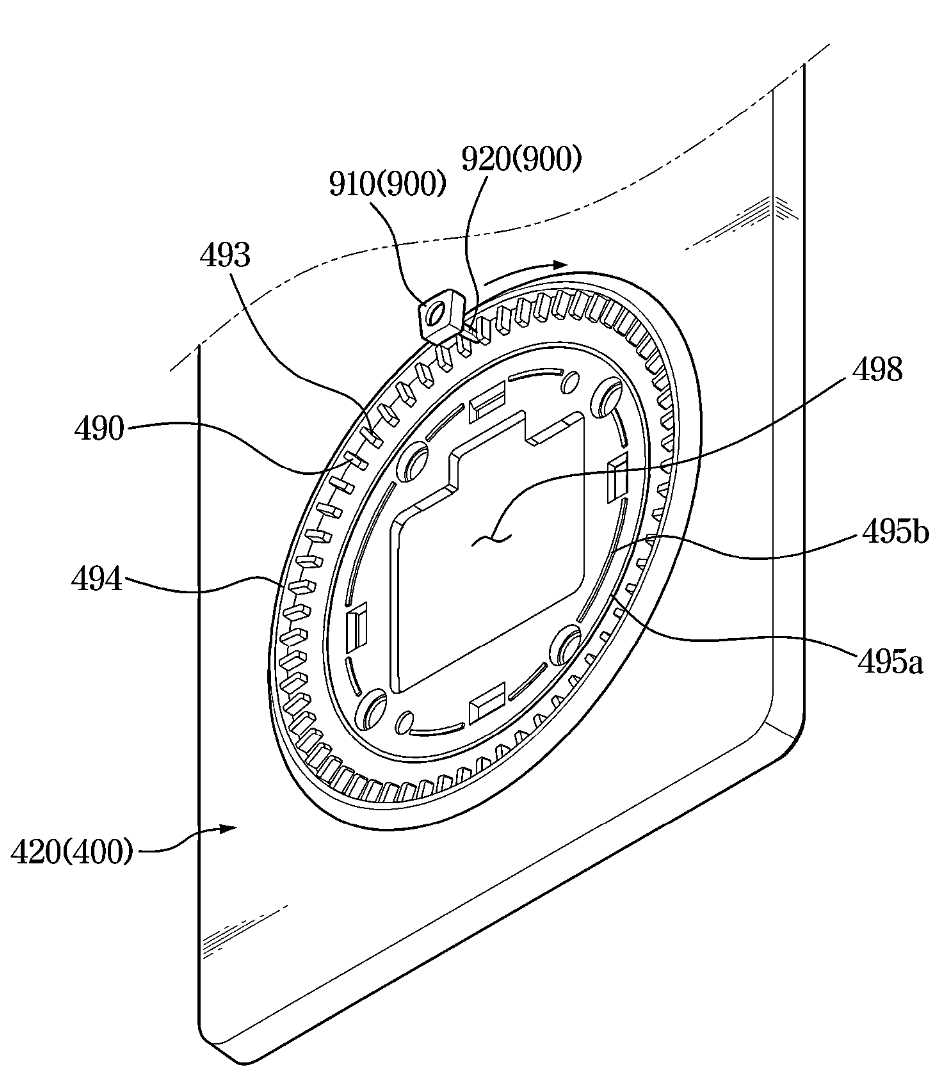
FIG. 13 is a perspective of a clicker and the main body of the controller of FIG. 5 according to an embodiment.
Figure 14:
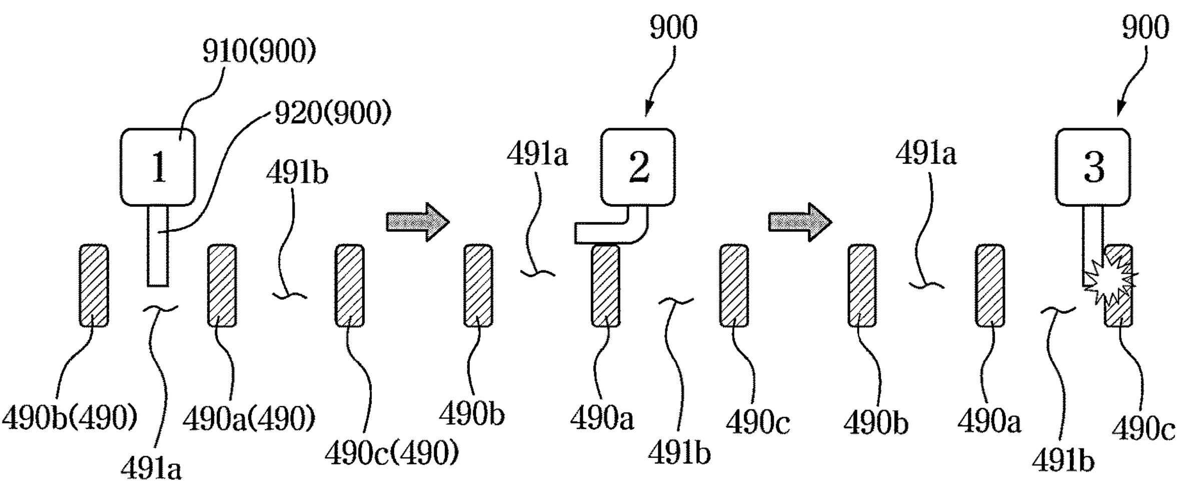
FIG. 14 is a schematic view illustrating a state in which the clicker of the controller of FIG. 13 interacts with at least one rib according to an embodiment.

FIG. 13 is a perspective of the clicker 900 and the main body 400 of the controller 1 of FIG. 5. FIG. 14 is a schematic view illustrating a state in which the clicker 900 of the controller 1 of FIG. 13 interacts with the at least one rib 490.

The interaction between the clicker 900 and the at least one rib 490 will be described with reference to FIGS. 13 and 14.

When the rotating body 200 rotates, the clicker 900 may rotate together with the rotating body 200. When the rotating body 200 rotates, the neck 920 of the clicker 900 may rotate together with the rotating body 200.

At this time, the neck 920 may move while pressing the at least one rib 490.

The neck 920 includes a circular movement path along the rotating body 200.

The at least one rib 490 may be provided in plurality. The plurality of ribs 490 may be arranged along the movement path of the neck 920 so as to be in contact with the neck 920 as the neck 920 moves. The plurality of ribs 490 may be arranged in a circular shape. The plurality of ribs 490 may be arranged in a circular shape at equal intervals.

The inclined portion 921 of the neck 920 may be in contact with a rib edge 493 of the at least one rib 490. The rib edge 493 may have a rounded chamfered shape to prevent the neck 920 from breaking.

In other words, each of the at least one rib 490 may protrude toward the rotating body 200 and extend toward the rotation axis of the rotating body 200. Each of the at least one rib 490 may be arranged along the moving position of the clicker 900. Each of the at least one rib 490 may include the rib edge 493 provided to be in contact with the clicker 900. The rib edge 493 may be rounded and chamfered so as to reduce the resistance caused by the first rib 490*a* when the clicker 900 is in the elastic position. Accordingly, it is easy for the clicker 900 to move while applying impact to the rib.

The interaction of the clicker 900 and the at least one rib 490 will be described in more detail with reference to FIG. 14. For example, the at least one rib 490 may include the first rib 490*a*, a second rib 490*b* arranged adjacent to the first rib 490*a* on one side, and a third rib 490*c* arranged on the other side opposite to the first rib 490*a*.

A space between the first rib 490*a* and the second rib 490*b* may be referred to as a first rib space 491*a*. A space between the first rib 490*a* and the third rib 490*c* may be referred to as a second rib space 491*b*.

It is assumed that at least a portion of the clicker 900 is disposed within the first rib space 491*a*. Further, it is assumed that the clicker 900 moves in a direction from the second rib 490*b* toward the third rib 490*c* as the rotating body 200 rotates.

The neck 920 may be disposed in a stationary position located between the first rib 490*a* and the second rib 490*b*. At least a portion of the neck 920 disposed in the first rib space 491*a* may move toward the first rib 490*a*.

The neck 920 may be at a first contact position in which at least a portion of the neck 920 is in contact with the first rib 490*a*. That is, the neck 920 may move from the stationary position to the first contact position while the neck 920 is in the first rib space 491*a*.

At least a portion of the neck 920 may be deformed and moved while moving from the first rib space 491*a* to the second rib space 491*b*. The neck 920 may be in the elastic position in which the neck 920 is deformed by being in contacting with the first rib 490*a*. While the neck 920 is in the elastic position, the neck 920 may be deformed by being elastically supported by the first rib 490*a*.

An end of the neck 920 may be disposed to face the second rib 490*b* while the neck 920 is in the elastic position.

While the neck 920 is in the elastic position, the end of the inclined portion 921 may move in a direction opposite to the direction in which the neck 920 moves.

The neck 920 may receive an elastic force in the opposite direction to the direction in which the neck 920 moves while the neck 920 is in the elastic position.

When at least a portion of the neck 920 moves into the second rib space 491*b*, the end of the neck 920 may return to its original position.

The neck 920 may be in a second contact position in which at least a portion of the neck 920 is in contact with the third rib 490*c*. That is, the neck 920 may move from the elastic position to the second contact position while moving into the second rib space 491*b*.

While the neck 920 moves from the elastic position to the second contact position, the deformation caused by at least a portion of the neck 920 coming into contact with the first rib 490*a* may return to its original state. As a result, at least a portion of the neck 920 may impact the third rib 490*c*. Accordingly, sound or vibration may be generated according to the movement of the neck 920. A user can sense the rotation of the rotating wheel 100 by recognizing the sound or vibration generated by the neck 920.

However, the neck 920 may generate a stimulus that may be sensed by a user by contact, in addition to impacting the third rib 490*c*.

In other words, the at least one rib 490 may include the first rib 490*a*, the second rib 490*b* arranged adjacent to one side of the first rib 490*a*, and the third rib 490*c* arranged adjacent to the other side, which is different from the one side of the first rib 490*a*, of the first rib 490*a*. When the clicker 900 moves in a direction from the second rib 490*b* toward the first rib 490*a*, the clicker 900 may be movable from the stationary position located between the second rib 490*b* and the first rib 490*a* to the elastic position in which the clicker 900 is elastically supported and deformed by the first rib 490*a*. The clicker 900 may be movable from the elastic position to the contact position in which the clicker 900 is arranged to come into contact with the third rib 490*c*. Accordingly, the clicker 900 may generate sound or vibration to allow a user to be aware of the rotation of the rotating wheel 100.

Figure 15:
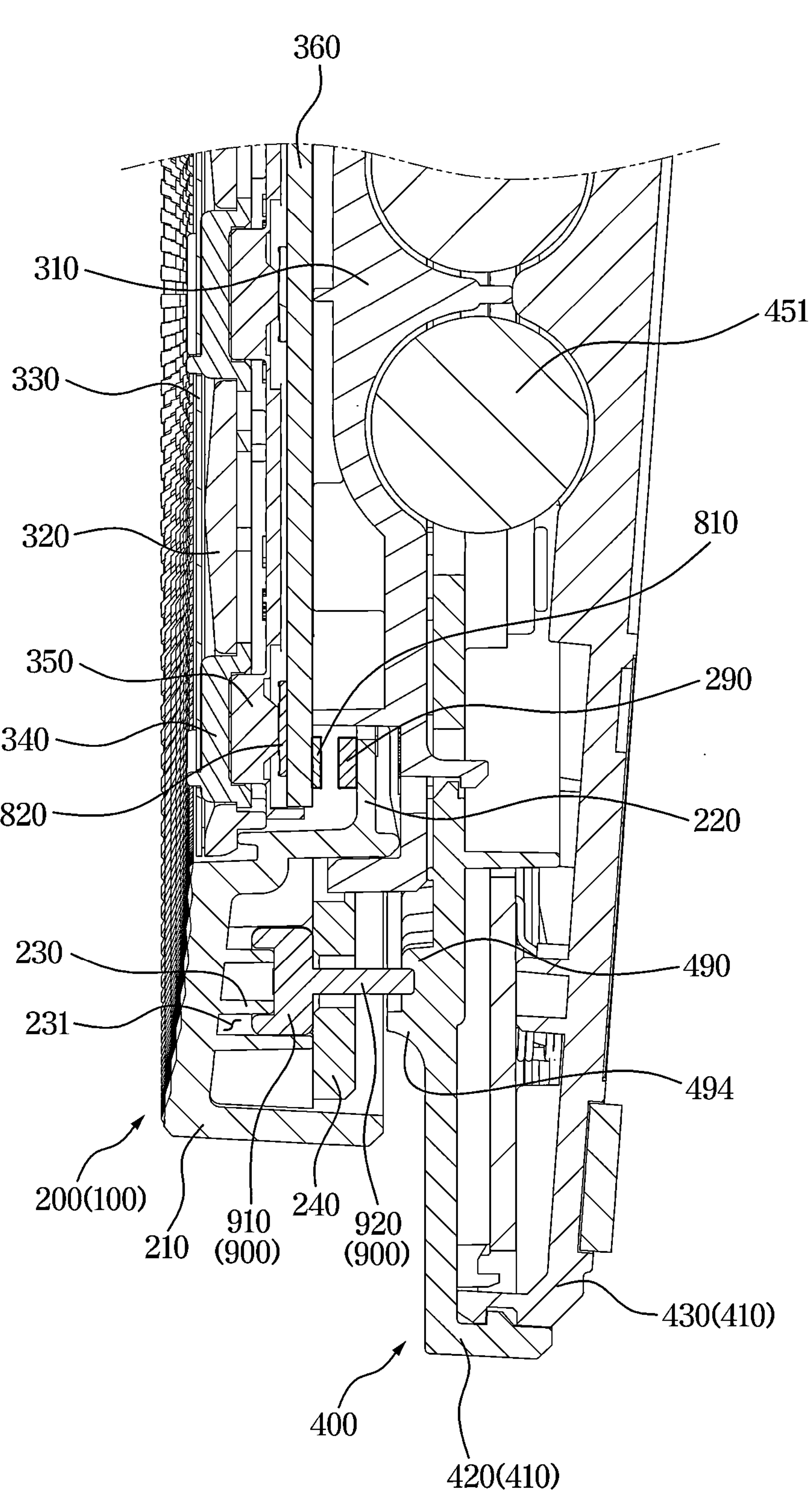
FIG. 15 is an enlarged cross-sectional view of the rotating wheel and surrounding components of the rotating wheel of the controller of FIG. 4 according to an embodiment.

FIG. 15 is an enlarged cross-sectional view of the rotating wheel 100 and surrounding components of the rotating wheel 100 of the controller 1 of FIG. 4

The configuration of the rotating wheel 100 and the main body 400 coupled thereto will be described with reference to FIG. 15.

The rotating wheel 100 may include the fixed body 300 and the rotating body 200 coupled to the main body 400. The fixed body 300 may include the first fixed body part 310 arranged on one side of the rotating body 200 and the second fixed body part 320 arranged on the other side opposite to the one side of the rotating body 200.

The fixed body 300 may include the wheel button delivery 340, the wheel button damper 350, the wheel button sensor 820, and the wheel board 360, which are disposed between the first fixed body part 310 and the second fixed body part 320.

The fixed body 300 may include the wheel sensor 810 electrically connected to the wheel board 360. The wheel sensor 810 may generate a signal corresponding to the amount of rotation when the rotating wheel 100 rotates.

The rotating body 200 may include the coating layer 290 disposed to face the sensor so as to be recognized by the wheel sensor 810.

The rotating body 200 may include the wheel cover 210 on which the coating layer 290 is arranged.

The controller 1 may include the clicker 900 configured to generate sound or vibration according to the rotation of the rotating body 200. The clicker 900 may extend toward the main body 400 from the side of the wheel cover 210 facing the main body 400. The wheel cover 210 may be arranged on one side of the clicker 900.

The rotating body 200 may include the wheel bracket 240 disposed on one side opposite to the side on which the wheel cover 210 of the clicker 900 is disposed. The wheel bracket 240 may be coupled to the wheel cover 210 to rotate the clicker 900 together with the rotation of the rotating body 200.

The clicker 900 may be disposed radially outside the fixed body 300.

The main body 400 may include the plurality of ribs 490 protruding toward the rotating body 200. The clicker 900 may be disposed between the plurality of ribs 490. As the clicker 900 rotates, the clicker 900 may come into contact with the plurality of ribs 490 and generate sound or vibration.

The rotating body 200 may rotate with respect to the main body 400. As the rotating body 200 rotates, the wheel sensor 810 may output a signal corresponding to the amount of rotation of the rotating body 200, and the clicker 900 may generate sound or vibration by interacting with the plurality of ribs 490.

Figure 16:
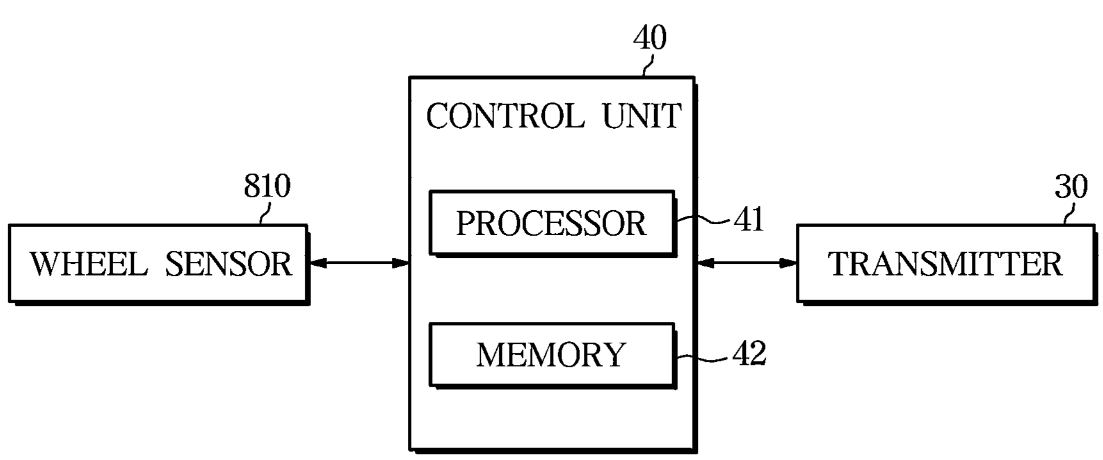
FIG. 16 is a control block diagram illustrating interaction between a rotating wheel sensor and a processor of the controller of FIG. 15 according to an embodiment.

FIG. 16 is a control block diagram illustrating interaction between the rotating wheel 100 sensor and the processor 41 of the controller 1 of FIG. 15.

A method of controlling the object 2 as the rotating wheel 100 rotates will be described with reference to FIG. 16.

The controller 1 may include the wheel sensor 810 configured to output a signal corresponding to the amount of rotation of the rotating body 200.

The controller 1 may include the control unit 40 configured to receive a signal transmitted by the wheel sensor 810.

The control unit 40 may include the processor 41 configured to identify the amount of rotation of the rotating body 200 based on the signal transmitted by the wheel sensor 810. The processor 41 may be electrically connected to the wheel sensor 810.

The control unit 40 may include a memory configured to temporarily or permanently store information about the amount of rotation identified by the processor 41.

The memory may include a volatile memory such as Static Random Access Memory (S-RAM) and Dynamic Random Access Memory (D-RAM), and a non-volatile memory such as Read Only Memory (ROM), and Erasable Programmable Read Only Memory (EPROM). The memory may be provided integrally with the processor 41 or may be provided as a separate semiconductor device separated from the processor 41.

The processor 41 may further include a processing core (e.g., an arithmetic circuit, a memory circuit, and a control circuit) that processes signals and outputs control signals based on a program or data stored in the memory.

Alternatively, the processor 41 may include a memory that stores or memorizes a program (a plurality of instructions) or data for processing signals and providing control signals. The memory may include a volatile memory and a non-volatile memory.

The control unit 40 may control the transmitter 30 based on information about the identified amount of rotation of the rotating body 200. The transmitter 30 may output a signal toward the object 2 to control the object 2.

In other words, the controller 1 may include the wheel sensor 810 configured to detect the amount of rotation of the rotating body 200 relative to the fixed body 300. The controller 1 may include the transmitter 30 configured to transmit a signal toward the object 2 controlled by the controller 1. The controller 1 may include the processor 41 electrically connected to the wheel sensor 810 and the transmitter 30. The processor 41 may be configured to control the transmitter 30 based on the amount of rotation measured by the wheel sensor 810. Accordingly, a signal regarding the amount of rotation of the rotating body 200 may be transmitted to the object 2 controlled by the controller 1.

Hereinbefore the configuration of the rotating wheel 100 is described. Hereinafter the configuration of the function button 61 (FIG. 2) and the charging portion 20 (FIG. 2) will be described.

Figure 17:
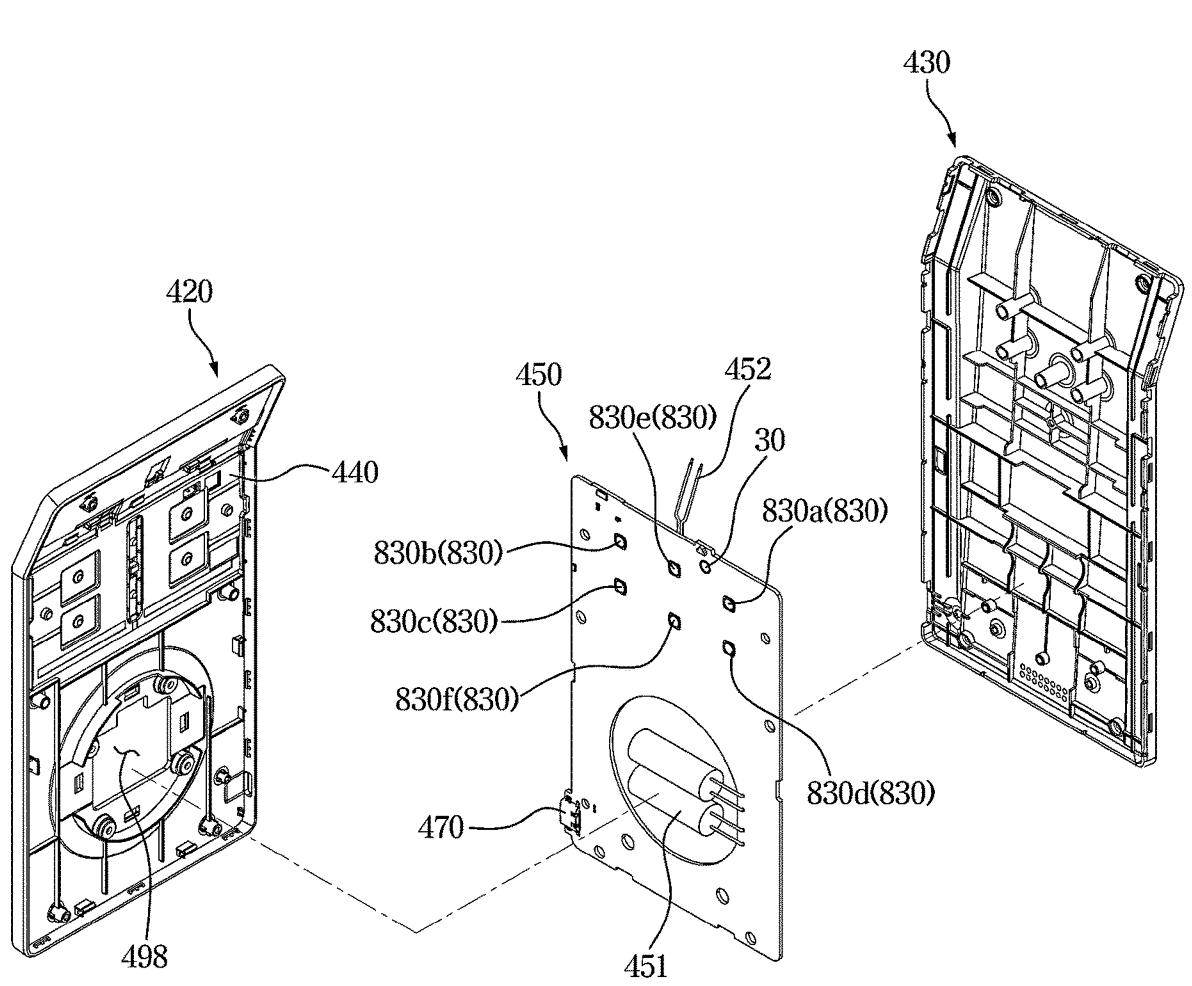
FIG. 17 is an exploded view of the main body of the controller of FIG. 5 according to an embodiment.

FIG. 17 is an exploded view of the main body 400 of the controller 1 of FIG. 5.

The configuration within the main body 400 will be described with reference to FIG. 17.

The main body 400 may include the first main body housing part 420 forming an exterior and facing the rotating wheel 100 (FIG. 15), and the second main body housing part 430 coupled to the first main body housing part 420 to define a space between the second main body housing part 430 and the first main body housing part 420.

The main body 400 may include a main board 450 disposed between the first main body housing part 420 and the second main body housing part 430.

The main board 450 may be electrically connected to the wheel board 360 (FIG. 15). The main board 450 and the wheel board 360 may be connected through the connection cable 500 (FIG. 5).

The controller 1 may include a function button sensor 830 disposed on the main board 450.

The main body 400 may include a function button damper 440 disposed between the function button sensor 830 and the first main body housing part 420.

The transmitter 30 may be electrically connected to the main board 450. The transmitter 30 may be disposed in front of the main board 450. The transmitter 30 may be configured to transmit a signal for controlling the object 2. For example, the transmitter 30 may transmit a signal to the object 2 by emitting an infrared signal (IR).

Hereinafter the configuration of the charging portion 20 (FIG. 2) will be described.

Figure 18:
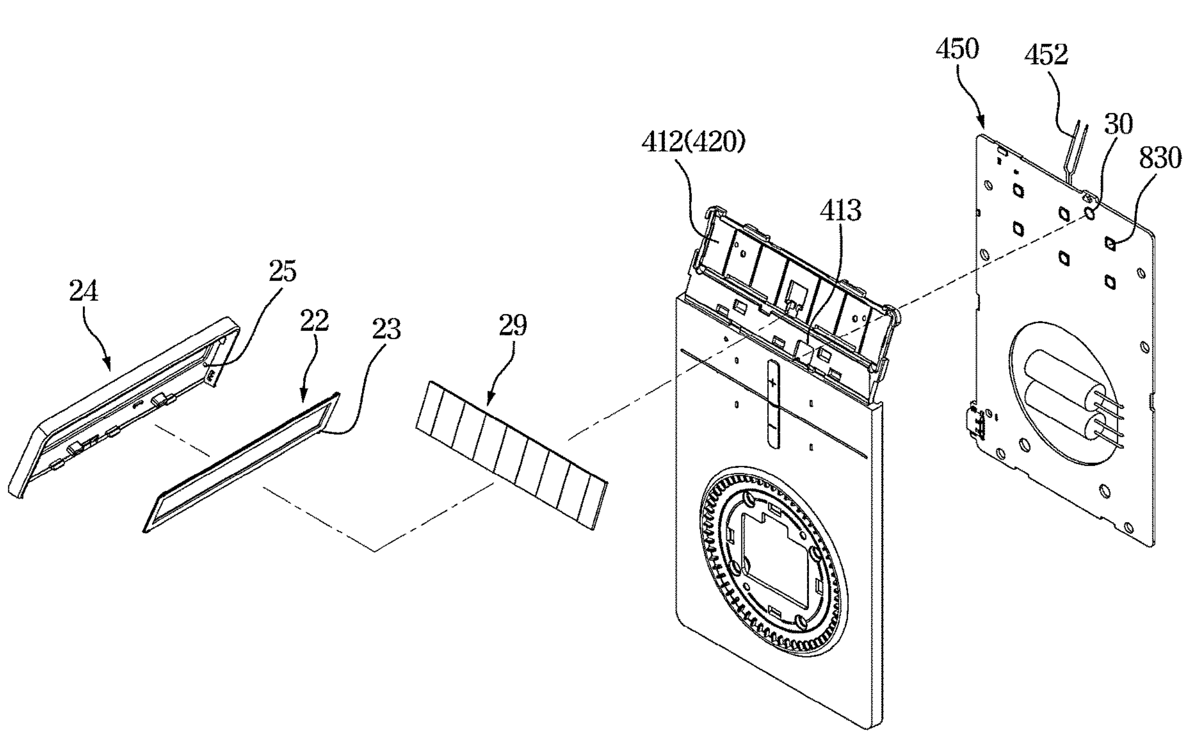
FIG. 18 is an exploded view of a portion related to a solar cell in the main body of the controller of FIG. 5 according to an embodiment.

FIG. 18 is an exploded view of a portion related to the solar cell 29 in the main body 400 of the controller 1 of FIG. 5.

The configuration of the charging portion 20 will be described with reference to FIG. 18.

The controller 1 may include the solar cell 29 configured to generate electrical energy by light. For example, the solar cell 29 may generate a voltage difference between an n-type electrode and a p-type electrode by absorbing external light, so as to generate electrical energy. That is, the solar cell 29 may be a semiconductor device that converts optical energy into electrical energy, and composed of a junction of a p-type semiconductor and an n-type semiconductor. Further, a basic structure of the solar cell 29 may be the same as that of a diode.

The main body 400 may include a solar cell accommodating portion 412 provided to accommodate the solar cell 29. The first main body housing part 420 may include the solar cell accommodating portion 412 to accommodate the solar cell 29.

The solar cell accommodating portion 412 may be disposed on the front side of the main body 400. As described above, this is to prevent the user's wrist, etc. using the controller 1 from being caught.

However, the solar cell accommodating portion 412 may be disposed on the lower side of the main body 400. However, in this case, it is useful when a user uses the controller 1 by holding the controller 1. When the controller 1 is placed on the floor and used, the lower side of the controller 1 faces the floor, and thus it is difficult for the controller 1 to use the light.

The solar cell accommodating portion 412 may extend forward. The solar cell accommodating portion 412 may be inclined downward while extending forward. This is because it is possible to use a large amount of light, as described above.

In other words, the main body 400 may include a first surface P (FIG. 3) to which the rotating wheel 100 is coupled. The first surface P may be provided to have a first angle n (FIG. 3) with respect to the bottom surface of the main body 400. The controller 1 may include the solar cell 29 disposed on the main body 400 to have a second angle m (FIG. 3), which is different from the first angle n, with respect to the bottom surface of the main body 400. The solar cell 29 may generate electric energy from external light. The main body 400 may include the capacitor 451 electrically connected to the solar cell 29 to store the electric energy generated by the solar cell 29. Accordingly, a usable time of the controller 1 may be increased.

The main body 400 may include a solar cell window 22 to cover the solar cell 29. The solar cell window 22 may protect the solar cell 29 from the outside. The solar cell window 22 may have a material that allows light to pass through.

The main body 400 may include a solar cell cover 24 to couple the solar cell window 22 to the solar cell accommodating portion. The solar cell cover 24 may include a window guide protrusion 25 formed on a side facing the solar cell window 22 to protrude through the solar cell window 22. A window guide hole 23 may be defined in the solar cell window 22 to allow the window guide protrusion 25 to pass therethrough. The window guide protrusion 25 may guide the coupling to allow the solar cell window 22 to be coupled to the solar cell cover 24 at an accurate position.

The solar cell cover 24 may include a material that allows a signal of the transmitter 30 to pass therethrough.

The first main body housing part 420 may include a material through which the signal of the transmitter 30 is difficult to transmit. A transmitter hole 413 may be defined on the first main body housing part 420 to allow the signal of the transmitter 30 to transmit.

The main body 400 may include a solar cell wire 452 configured to electrically connect the solar cell 29 and the main board 450.

The main body 400 may include the capacitor 451 electrically connected to the main board 450. When the solar cell 29 generates electric energy, the electric energy may be stored in the capacitor 451 through the solar cell wire 452.

Hereinafter the configuration related to the function button 61 (FIG. 2) will be described.

Figure 19:
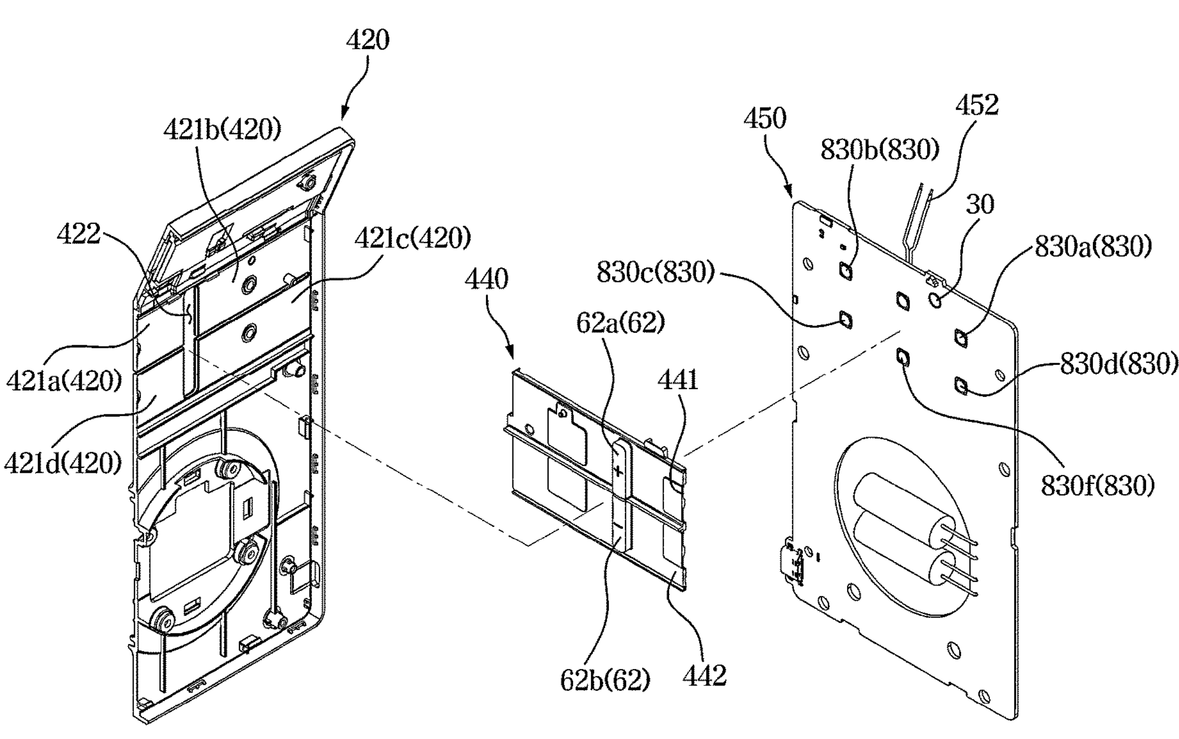
FIG. 19 is an exploded view of a portion related to a function button in the main body of the controller of FIG. 5 according to an embodiment.

FIG. 19 is an exploded view of a portion related to the function button 61 in the main body 400 of the controller 1 of FIG. 5

The function button (FIG. 2) will be described with reference to FIG. 19.

The first main body housing part 420 may include a function button cover 421. The function button cover 421 may have a rectangular shape.

The function button cover 421 may be provided in plurality. The plurality of function button covers 421 may be arranged so as to be arranged at each corner of a virtual rectangle. As for each function button cover 421, two edges that meet the virtual rectangle may be coupled to the first main body housing 410. Each function button cover 421 may include only two edges that are free ends. Each function button cover 421 may be arranged so as to be spaced apart from each other. The function key 62 may be arranged between each of the function button covers 421.

In other words, the main body 400 may include the main body housing 410 coupled to the rotating wheel 100. The main body housing 410 may include the function button cover 421 including at least two edges that are fixed ends and configured to be pressed. The main body 400 may include the main board 450 arranged to face the main body housing 410. The main body 400 may further include the function button damper 440 arranged between the function button cover 421 and the main board 450. The controller 1 may further include the function button sensor 830 arranged between the function button damper 440 and the main board 450 to detect that the function button cover 421 is pressed.

The function button cover 421 may include a first function button cover 421*a* provided to correspond to the first function button 61*a*. The function button cover 421 may include a second function button cover 421*b* provided to correspond to the second function button 61*b*. The function button cover 421 may include a third function button cover 421*c* provided to correspond to the third function button 61*c*. The function button cover 421 may include a fourth function button cover 421*d* provided to correspond to the fourth function button 61*d*.

The function button cover 421 may include a shape that protrudes toward the function button sensor 830 to allow pressure to be concentrated when a user presses the function button cover 421.

The function button damper 440 may be included between the function button cover 421 and the main board 450.

The function button damper 440 may include a material having a damping force. For example, the function button damper 440 may include a rubber material. The function button damper 440 may mitigate impact applied to the function button damper 440 and transmit the reduced impact to the function button sensor 830 so as to protect the function button sensor 830.

The function button damper 440 may include the function key 62 that protrudes upwardly to be disposed between the function button covers 421. The function key 62 may be arranged to be accommodated in a function key accommodating hole 422 that extends in a front and rear direction between the function button dampers 440. The function key 62 may have a shape that extends in the front and rear direction to correspond to the function key accommodating hole 422.

A space extending in the left and right direction may be formed between the function button covers 421. The function button damper 440 may have a shape that protrudes upward so as to be inserted into the space extending in the left and right direction of the function button cover 421. Accordingly, the function button damper 440 may be coupled to an accurate position of the function button cover.

Two function keys 62 may be provided in the front and rear direction.

The function button damper 440 may have a shape that protrudes toward the main board on the side facing the main board. Accordingly, the pressure applied toward the function button damper 440 may be concentrated on the protruding shape. The shape of the function button damper 440 protruding toward the main board may be arranged to correspond to the function button sensor 830.

A thickness of a peripheral portion, which has a shape protruding toward the main board and is disposed to correspond to the function button sensor 830, in the function button damper 440 may be less than a thickness of a periphery of the portion. Accordingly, a portion of the function button sensor which is adjacent to the function button sensor 830 may be deformed more easily.

In other words, the function button damper 440 may include a support portion 442 disposed to be spaced apart from the function button sensor 830. The function button damper 440 may include a pressing portion 441 disposed to correspond to the function button sensor 830 and formed to be thinner than the support portion 442 so as to be deformable to protrude toward the function button sensor 830. Accordingly, the durability of the function button sensor 830 may be increased, and it may be easy to press the function button sensor 830.

The function button sensor 830 may be a sensor configured to generate a signal by pressure. For example, the function button sensor 830 may be a dome sensor or a pressure sensor.

The function button sensor 830 may be disposed on the main board 450 at a position corresponding to the function button cover.

That is, the function button sensor 830 may include a first function button sensor 830*a* corresponding to the first function button 61*a*. The function button sensor 830 may include a second function button sensor 830*b* corresponding to the second function button 61*b*. The function button sensor 830 may include a third function button sensor 830*c* corresponding to the third function button 61*c*. The function button sensor 830 may include a fourth function button sensor 830*d* corresponding to the fourth function button 61*d*. The function button sensor 830 may include a first function key sensor 830*e* corresponding to the first function key 62*a*. The function button sensor 830 may include a second function key sensor 830*f* corresponding to the second function key 62*b*.

Figure 20:
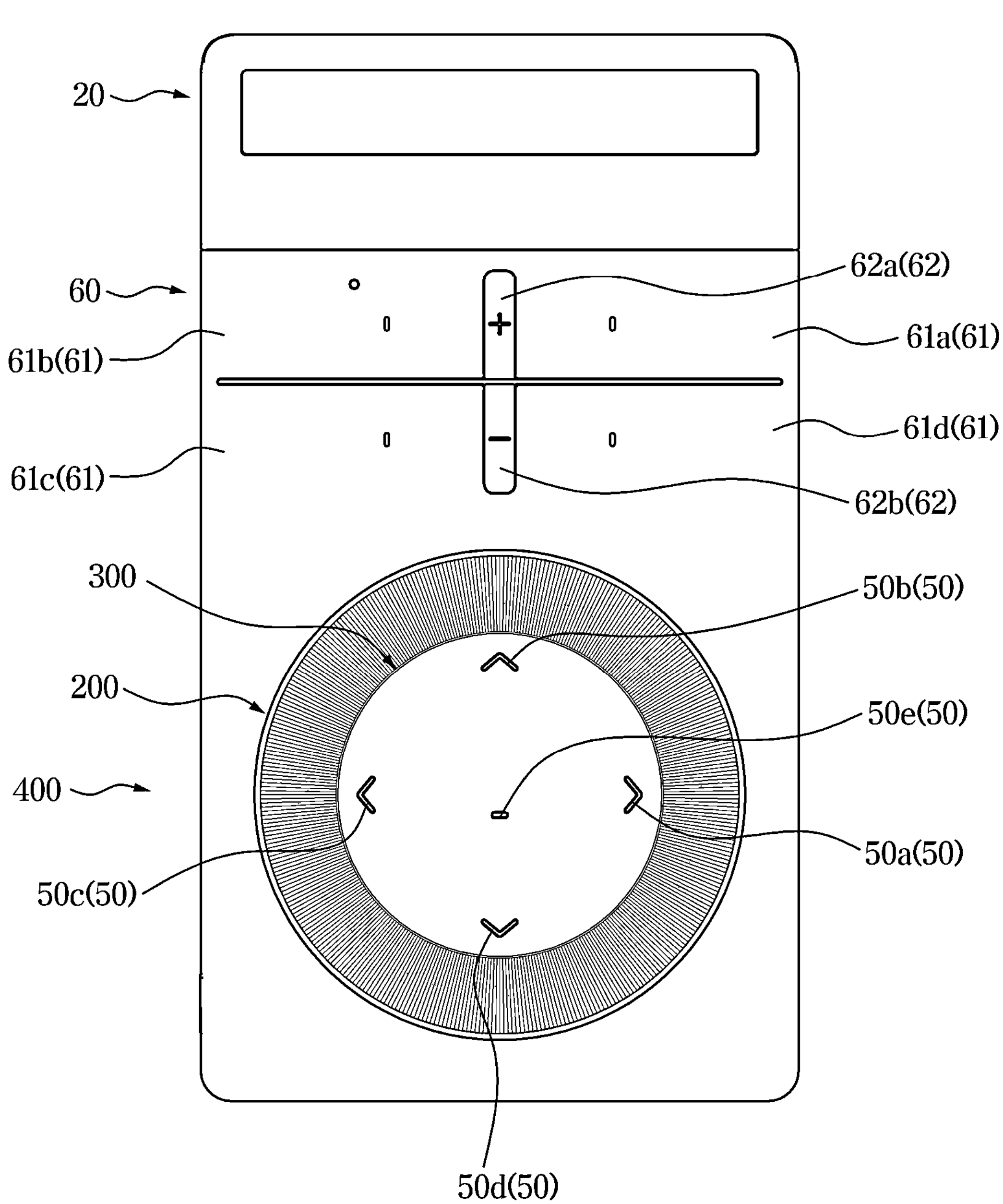
FIG. 20 is a plan view of a portion in which an inputter of the controller of FIG. 2 is formed according to an embodiment.
Figure 21:
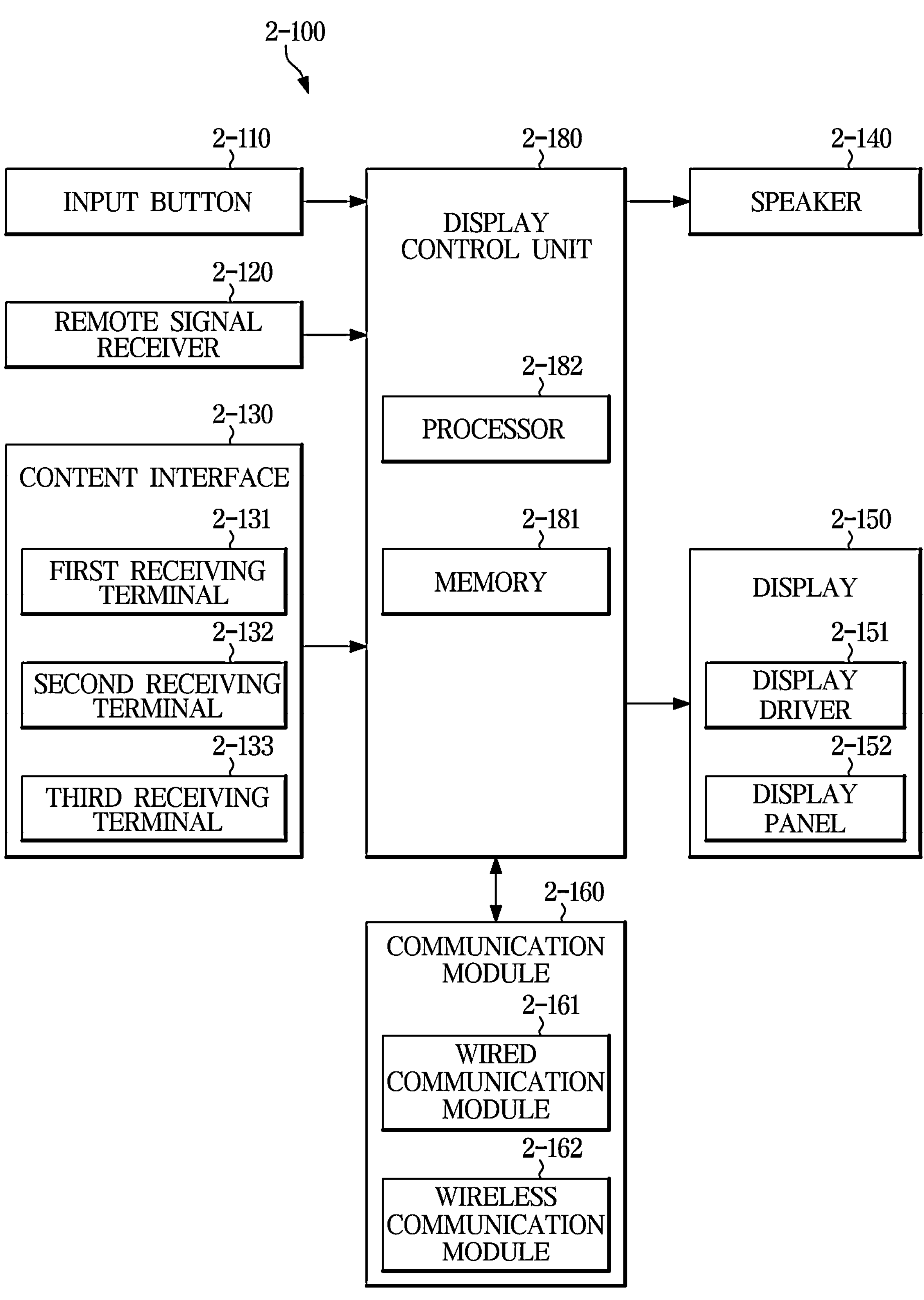
FIG. 21 is a control block diagram of an example of an object controlled by the controller of FIG. 20 according to an embodiment.
Figure 22:
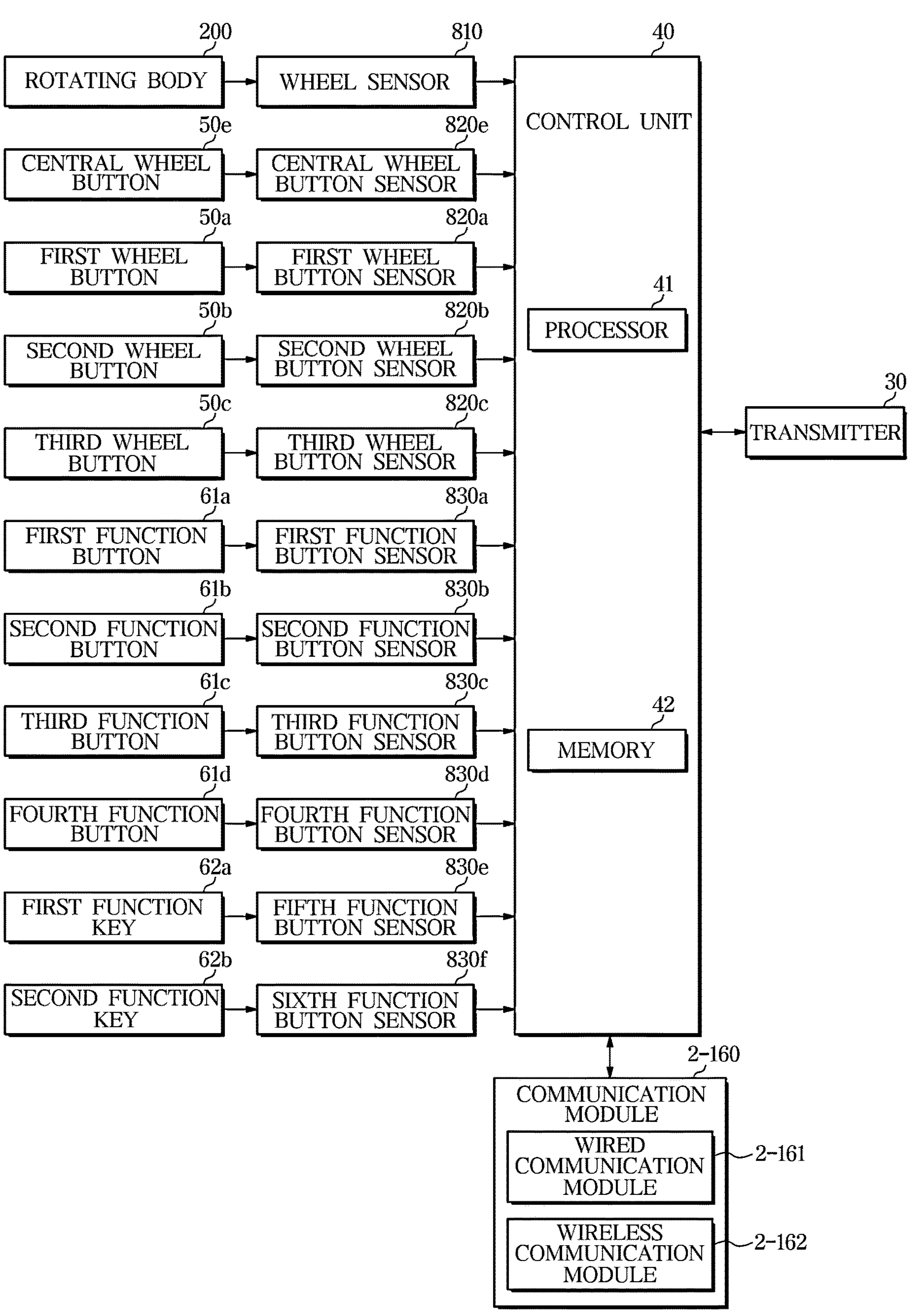
FIG. 22 is a control block diagram illustrating interaction between the inputter and the processor of the controller of FIG. 20 according to an embodiment.

FIG. 20 is a plan view of a portion in which the inputter 10 of the controller 1 of FIG. 2 is formed. FIG. 21 is a control block diagram of an example of the object 2 controlled by the controller 1 of FIG. 20. FIG. 22 is a control block diagram illustrating interaction between the inputter 10 and the processor 41 of the controller 1 of FIG. 20.

The inputter 10 (FIG. 2) of the controller 1 will be described with reference to FIGS. 20 to 22.

Particularly, referring to FIG. 20, the controller 1 may include the wheel button 50. The controller 1 may include the function button 61. The controller 1 may include the rotating body 200. The controller 1 may include the main body 400 including the function button 61. The controller 1 may include the rotating wheel 100 including the wheel button 50 and the rotating body 200.

The wheel button 50 may include the first wheel button 50*a* indicating rightward. The wheel button 50 may include the second wheel button 50*b* indicating upward. The wheel button 50 may include the third wheel button 50*c* indicating leftward. The wheel button 50 may include the fourth wheel button 50*d* indicating downward. The wheel button 50 may include the central wheel button 50*e* indicating center. The first wheel button 50*a* to the fourth wheel button 50*d* or the central wheel button 50*e* may include different switches that are operated by the button cap 330. According to the position pressed by a user, at least one of the central wheel button 50*e*, the first wheel button 50*a*, the second wheel button 50*b*, the third wheel button 50*c*, and the fourth wheel button 50*d* may be operated.

A unique user input may be not assigned to the central wheel button 50*e* or the first wheel button 50*a* to the fourth wheel button 50*d*, and the user input may be dynamically assigned. Particularly, a user input that depends on an image displayed on the display (FIG. 1) of the display apparatus 2-100 (FIG. 1) may be assigned to the central wheel button 50*e* and the first wheel button 50*a* to the fourth wheel button 50*d*.

A user input that is to enter an edit mode for editing a layout of a content image may be assigned to the central wheel button 50*e* while the display apparatus 2-100 displays a content. In the edit mode, a user input for selecting or specifying a content image may be assigned to the central key.

In the edit mode, a user input for sequentially changing an activated content image among a plurality of content images may be assigned to the first wheel button 50*a* to the fourth wheel button 50*d*.

The central wheel button 50*e* or the first wheel button 50*a* to the fourth wheel button 50*d* may provide an electrical signal indicating that the button is pressed by a user, to the processor 41.

The rotating body 200 may be provided in a ring shape that surrounds the second fixed body part 320 forming the central wheel button 50*e* or the first wheel button 50*a* to the fourth wheel button 50*d* and may be physically rotatable relative to the main body 400.

The rotating body 200 may obtain a user input by rotation. For example, the rotating body 200 may rotate clockwise or counterclockwise, and may obtain a user input indicating an increase or decrease in a physical quantity to be controlled (e.g., display brightness or display contrast or display clarity, etc.) according to the rotation direction. When the rotating body 200 rotates clockwise, a user input indicating an increase in a physical quantity to be controlled may be obtained. In addition, when the rotating body 200 rotates counterclockwise, a user input indicating a decrease in a physical quantity to be controlled may be obtained.

A unique user input may not be assigned to the rotating body 200 and a user input may be dynamically assigned to the rotating body 200. Particularly, a user input that depends on an image displayed on the display of the display apparatus 2-100 may be assigned to the rotating body 200.

For example, in the edit mode, a user input to change the size of the activated content image may be assigned to the rotating body 200.

The rotating body 200 may provide an electrical signal corresponding to the rotation direction and rotational displacement of the rotating body 200 to the processor 41.

As mentioned above, the wheel button 50 may be formed by a single second fixed part 320, and the rotating body 200 may have a ring shape surrounding one key cap. Accordingly, the wheel button 50 and the rotating body 200 may be manufactured integrally.

In addition, the wheel button 50 and the rotating body 200 may be defined to protrude from the surface of the main body 400 or defined on the same plane as the surface of the main body 400. In addition, the wheel button 50 and the rotating body 200 may have a concave shape recessed on the surface of the main body 400.

The function button 61 may include the first function button 61*a*, the second function button 61*b*, the third function button 61*c*, and the fourth function button 61*d*.

However, a unique user input may be assigned to each of the first function buttons 61*a* to the fourth function button 61*d*. A user input for turning on or off the display apparatus 2-100 may be assigned to the second function button 61*b*. A user input for returning a state of the display apparatus 2-100 to a turn-on state and for displaying a home image on the display 2-150 may be assigned to the first function button 61*a*. A user input for returning a state of the display apparatus 2-100 to a previous state and for displaying a previous image on the display 2-150 may be assigned to the third function button 61*c*. A user input for accessing a screen that manipulates a special function set by a user may be assigned to the fourth function button 61*d*.

The first function button 61*a* to the fourth function button 61*d* may provide an electrical signal, which corresponds to a unique user input assigned to each key, to the processor 41.

The transmitter 30 (FIG. 18) may transmit an infrared signal or a wireless signal (hereinafter referred to as a "remote control signal") based on a control signal of the processor 41. For example, the transmitter 30 may include a light-emitting diode for transmitting an infrared signal or a transmission antenna for transmitting a wireless signal.

The transmitter 30 may modulate an infrared signal or a wireless signal based on a remote-control signal of the processor 41. The transmitter 30 may transmit a modulated infrared signal or wireless signal representing the remote-control signal.

The processor 41 may receive electrical signals from the wheel button 50, the rotating body 200, and the function button 61, and process the received electrical signals. In addition, the processor 41 may provide a remote-control signal to the transmitter 30 based on processing the received electrical signals.

The processor 41 may include one processor chip including a plurality of cores or a plurality of processor chips. In addition, the processor 41 may be provided separately from the memory or may be provided integrally with the memory. The processor 41 may include a microcomputer configured to control the operation of the object 2.

As mentioned above, the controller 1 may include the wheel button 50 and the rotating body 200 that are manufactured integrally, and a user input may be dynamically assigned to the wheel button 50 and the rotating body 200.

However, the rotating body 200 or wheel button 50 in the present embodiment may be replaced with a circular touch pad. The circular touch pad may detect a user's touch on the touch pad and provide an electrical signal representing the coordinates of the detected touch to the processor 41.

For example, the circular touch pad may detect a user's touch on the circular touch pad from a change in electrical resistance value or a change in electrostatic capacity, and output an electrical signal corresponding to the coordinates of the user's touch point to the processor 41. The processor 41 may identify the coordinates of the user's touch point based on the electrical signal received from the circular touch pad. In addition, the circular touch pad may identify a user input based on the coordinates of the user's touch point.

The circular touch pads may employ a resistive touch panel or a capacitive touch panel. However, the circular touch pad is not limited thereto, and the circular touch pad may include various touch pads capable of detecting a user's touch or approach of user and outputting an electrical signal corresponding to the coordinates of the detected touch point or the coordinates of the approach point.

A unique user input corresponding to a touch input to the circular touch pad may be not assigned and a user input may be dynamically assigned depending on the operating status of the display apparatus 2-100.

The above-mentioned user input for operating the central wheel button 50*e* may be replaced with a user's touch input to a central portion of the circular touch pad. The user input for operating the second wheel button 50*b* may be replaced with a user's touch input to an upper portion of the circular touch pad. The user input for operating the fourth wheel button 50*d* may be replaced with a user's touch input to a lower portion of the circular touch pad. The user input for operating the first wheel button 50*a* may be replaced with a user's touch input to a right portion of the circular touch pad. The user input for operating the third wheel button 50*c* may be replaced with a user's touch input to a left portion of the circular touch pad.

In addition, the above-mentioned user input rotating the rotating body 200 clockwise may be replaced with a touch input that moves clockwise along an inner side of an outer line of the circular touch pad. For example, the processor 41 may obtain a user input indicating an increase in a physical quantity to be controlled based on the touch input moving clockwise along the inner side of the outer line of the circular touch pad.

The above-mentioned user input rotating the rotating body 200 counterclockwise may be replaced with a touch input that moves counterclockwise along the inner side of the outer line of the circular touch pad. For example, the processor 41 may obtain a user input indicating a decrease in a physical quantity to be controlled based on the touch input moving counterclockwise along the inner side of the outer line of the circular touch pad.

The processor 41 may receive an electrical signal from the circular touch pad and process the received electrical signal. In addition, the processor 41 may provide a remote-control signal to the transmitter 30 based on processing the received electrical signal.

As mentioned above, the wheel button 50, the function button 61 or the rotating wheel 100 of the present disclosure may be operated by touch.

In this case, the controller 1 may further include a touch display or a communication interface.

The touch display may provide a user interface for interacting with an administrator or a user.

The touch display may include a display panel 2-152 that displays an image and a touch panel that receives a touch input. The display panel 2-152 may convert image data received from the processor 41 into an optical signal that a user can see. The touch panel may identify a touch input from an administrator or a user and provide an electrical signal corresponding to the received touch input to the processor 41.

The touch display may display an image for receiving a touch input from an administrator or a user, and may receive the touch input from the administrator or the user. The touch display may provide the received touch input to the processor 41, and the processor 41 may provide image data to the touch display in response to the touch input. The touch display may display an image in response to the touch input from the administrator or the user.

The processor 41 may be electrically connected to the touch display or the communication interface.

Particularly, FIG. 21 illustrates an example of a configuration that may be included in the display apparatus 2-100 corresponding to an example of an object 2.

The display apparatus 2-100 (FIG. 1) may include an input button 2-110, a remote signal receiver 2-120, a content interface 2-130, a speaker 2-140, a display 2-150, a communication module 2-160, and/or a display processor 2-182.

The input button 2-110 may receive a user input. The input button 2-110 may include a plurality of input buttons 2-110, and different input buttons 2-110 may obtain different user inputs. For example, the input button 2-110 may include a power button for turning on or off the display apparatus 2-100, a volume button for adjusting a volume of audio, a source button for selecting a content source, etc.

The input buttons 2-110 may each receive a user input and output an electrical signal (voltage or current) corresponding to the user input to the display processor 2-182. The display processor 2-182 may identify the user input based on the output signal of the input button 2-110.

The input button 2-110 may include at least one of a push switch, a touch switch, a slide switch, and a toggle switch.

The remote signal receiver 2-120 may receive an infrared signal or a wireless signal from the controller 1 (FIG. 22). For example, the controller 1 may include a photodiode for receiving an infrared signal or a receiving antenna for receiving a wireless signal.

The controller 1 may be provided separately from the main body 400 of the display apparatus 2-100 as described above. The external input device may obtain a user input and output a remote-control signal (e.g., an infrared signal or a wireless signal) corresponding to the obtained user input.

The remote signal receiver 2-120 may obtain a remote-control signal by demodulating an infrared signal or a wireless signal received from the controller 1 and may provide an electrical signal (e.g., a voltage signal or a current signal) corresponding to the remote-control signal to the display processor 2-182.

The content interface 2-130 may receive video data and/or audio data from content sources.

The content interface 2-130 may include a first receiving terminal 2-131, a second receiving terminal 2-132, and a third receiving terminal 2-133. The first receiving terminal 2-131 may include a component (YPbPr/RGB) terminal, a composite video blanking and sync (CVBS) terminal, an audio terminal, etc. which are configured to receive video/audio data from content sources.

The second receiving terminal 2-132 may include a High Definition Multimedia Interface (HDMI) terminal configured to receive video/audio data from a content source.

Third receiving terminal 2-133 may include a Universal Serial Bus (USB) terminal.

The content interface 2-130 is not limited to including three receiving terminals, and may include two or less or four or more receiving terminals.

The speaker 2-140 may output an audio signal audibly. The speaker 2-140 may convert an audio signal output from the processor 41 into sound. For example, the speaker 2-140 may include a thin film that vibrates according to an audio signal, and sound may be generated by the vibration of the thin film.

In order to output stereo sound, the speaker 2-140 may include a left surround speaker 2-140 disposed on the left side of a display body 2-101 and a right surround speaker 2-140 disposed on the right side of the display body 2-101.

The display 2-150 includes the display panel 2-152 provided to visually display an image, and a display driver 2-151 configured to drive the display panel 2-152.

The display apparatus 2-100 may restore a plurality of image frames 2-406 included in video data and display the plurality of image frames 2-406 sequentially.

The display driver 2-151 may convert each of the restored plurality of image frames 2-406 into an analog image signal (hereinafter referred to as a "driving signal") for displaying the restored plurality of image frames 2-406 on the display panel 2-152, and may transmit the driving signal to the display panel 2-152.

The display driver 2-151 may transmit a driving signal to each of the plurality of pixels P included in the display panel 2-152. Each of the plurality of pixels P of the display panel 2-152 may emit light according to the driving signal, and the light emitted from the plurality of pixels P may be combined to form a single image.

The display panel 2-152 may emit light and display an image according to a driving signal received from the display driver 2-151.

The display panel 2-152 may include pixels that are units for displaying an image. Each pixel may receive a driving signal for displaying an image from the display driver 2-151 and output an optical signal corresponding to the received driving signal. Accordingly, one image may be displayed on the display panel 2-152 by combining optical signals output by the plurality of pixels P.

The display apparatus 2-100 may include various types of display panels 2-152 for displaying images.

For example, the display apparatus 2-100 may include a non-luminous display panel 2-152 that displays an image by passing or blocking light emitted from a light source (backlight unit). A liquid crystal display (LCD) panel 2-152 is a representative non-luminous display panel 2-152.

The display panel 2-152 may include a liquid crystal panel and a backlight unit. The backlight unit may include a plurality of light sources configured to emit white light including red light, green light, and blue light. The liquid crystal panel may selectively transmit red light, green light, and blue light emitted from the backlight unit. For example, a red sub-pixel of the liquid crystal panel may selectively transmit red light and block green light and blue light. A green sub-pixel of the liquid crystal panel may selectively transmit green light and block blue light and red light. A blue sub-pixel of the liquid crystal panel may selectively transmit blue light and block red light and green light.

In addition, the display driver 2-151 may include a liquid crystal panel driver for driving the liquid crystal panel and a dimming driver for driving the backlight unit. The liquid crystal panel driver may output a driving signal for forming an image to the liquid crystal panel. An intensity (or light quantity) of light passing through each of the plurality of sub-pixels of the liquid crystal panel may be adjusted by the driving signal of the liquid crystal panel driver, and an image may be formed by the light passing through each of the plurality of sub-pixels. The dimming driver may output a dimming signal for locally adjusting the brightness of the backlight unit to the backlight unit. An intensity (or light quantity) of light emitted from the backlight unit may be locally adjusted by the dimming signal, and thus the contrast ratio of an image displayed on the liquid crystal panel may be improved.

As mentioned above, the dimming driver may drive the backlight unit to emit light, and the liquid crystal panel driver may drive the liquid crystal panel to pass or block light from the backlight unit.

Alternatively, the display apparatus 2-100 may include a self-luminous display panel 2-152 that displays images using elements that emit light on their own. An organic light emitting diode (OLED panel or a quantum dot display panel 2-152 is a representative self-luminous display panels 2-152.

The display panel 2-152 includes a light emitting diode panel. The light emitting diode panel may include a red light emitting diode configured to emit red light, a green light emitting diode configured to emit green light, and a blue light emitting diode configured to emit blue light. Each of the light emitting diodes may function as a sub-pixel. The red light emitting diode, the green light emitting diode, and the blue light emitting diode may function as a red sub-pixel, a green sub-pixel, and a blue sub-pixel, respectively. The quantum dot display panel 2-152 may include red quantum dots, green quantum dots, and blue quantum dots, and each of the quantum dots may function as a sub-pixel.

The display driver 2-151 includes a light emitting diode driver. The light emitting diode driver may output a driving signal for forming an image to the light emitting diode panel. A driving current is supplied to the red light emitting diode, the green light emitting diode, and the blue light emitting diode by the driving signal, and an intensity (or light amount) of light emitted from each of the red light emitting diode, the green light emitting diode, and the blue light emitting diode may be adjusted. An image may be formed by the light emitted from the light emitting diodes.

The light emitting diode driver may drive the display panel 2-152. For example, the light emitting diode driver may drive the display panel 2-152 to display an image on the display panel 2-152.

The communication module 2-160 may receive video/audio data from a content source connected to the network.

The communication module 2-160 may include a wired communication module 2-161 configured to receive video/audio data from a content source via wire, and a wireless communication module 2-162 configured to receive video/audio data wirelessly from the content source.

The wired communication module 2-161 may also receive data streams from a content source using various communication standards. For example, the wired communication module 2-161 may receive video/audio data from a content source using Ethernet (IEEE 802.3 standard).

The wired communication module 2-161 may include a wired communication terminal for wired connection to a network and/or a communication circuit (e.g., a wired communication interface controller 1) including a processor 41 for modulating and/or demodulating data for wired communication and/or a memory.

The wireless communication module 2-162 may exchange wireless signals with an audio device using various wireless communications. In addition, the wireless communication module 2-162 may receive a data stream from a content source via the audio device.

For example, the wireless communication module 2-162 may connect to a wireless repeater using Wi-Fi® (IEEE 802.11 standard) wireless communication and receive video/audio data from a content source via the wireless repeater.

The WiFi wireless communication may provide direct communication (peer to peer communication) between nodes (e.g., a display apparatus and an audio device) without passing through a wireless repeater. Accordingly, the direct communication using the WiFi wireless communication is called "WiFi P2P" or "WiFi direct." The wireless communication module 2-162 may exchange data with the audio device 200 using the WiFi P2P communication standard.

In addition, the wireless communication module 2-162 may exchange data with the audio device using Bluetooth® (IEEE 802.15.1 standard) or ZigBee® (IEEE 802.15.4 standard) wireless communication. Alternatively, the wireless communication module 2-162 may exchange data with the audio device using near field communication (NFC).

The wireless communication module 2-162 may include an antenna for transmitting and receiving wireless signals and/or a communication circuit (e.g., a wireless communication interface controller 1) including a processor 41 decoding/encoding data for wireless communication and/or a memory.

A display control unit 2-180 may include the display processor 2-182 and a display memory 2-181.

The display processor 2-182 may process video/audio data and control the display apparatus 2-100. The procesosr 41 may include the display memory 2-181 memorizing/storing programs and data for processing video/audio data. The display processor 2-182 may include hardware as well as software such as an operating system, a video player, and an audio player.

The display memory 2-181 may store programs and data for processing video/audio data, and may temporarily store temporary data issued during processing of video/audio data.

The display memory 2-181 may include a non-volatile memory such a Read Only Memory (ROM) and a flash memory for long-term storage of data, and a volatile memory such as a Static Random Access Memory (S-RAM) and a Dynamic Random Access Memory (D-RAM) for temporary storage of data.

The display memory 2-181 may include one memory chip including a plurality of memory cores or a plurality of memory chips.

The display processor 2-182 may restore a plurality of image frames 2-406 and an audio signal from the video/audio data by decoding the video/audio data received through the content interface 2-130 and/or the communication module 2-160. The plurality of image frames 2-406 may be displayed on the display 2-150. Sound according to the audio signal may be output through the speaker 2-140.

The display processor 2-182 may receive a plurality of content data from a plurality of content sources through the content interface 2-130 and/or the communication module 2-160. The display processor 2-182 may generate one image frame 2-406 including a plurality of content images each associated with the plurality of content data. The image frame 2-406 may be composed of one content image received from one content source or may include a plurality of content images each received from the plurality of content sources.

The display processor 2-182 may receive a remote-control signal corresponding to a user input from the controller 1 through the remote signal receiver 2-120. The display processor 2-182 may change the size of a content image, change the position of a content image, or change the arrangement of content images based on the user input received from the controller 1.

The display processor 2-182 may include one processor 41 chip including a plurality of cores, or may include a plurality of processor 41 chips. For example, the display processor 2-182 may include an image processor 41 processing video/audio data, or a microcontroller processing a user's touch input and controlling the operation of the display apparatus 2-100, etc. In addition, the display processor 2-182 may be provided separately from the display memory 2-181 or may be provided integrally with the display memory 2-181.

As mentioned above, the display apparatus 2-100 may display a plurality of content images received from a plurality of content sources on a single display 2-150. In addition, the display apparatus 2-100 may obtain a user input through the controller 1, and change the size of each of the plurality of content images and the arrangement of the plurality of content images based on the user input.

Figure 23:
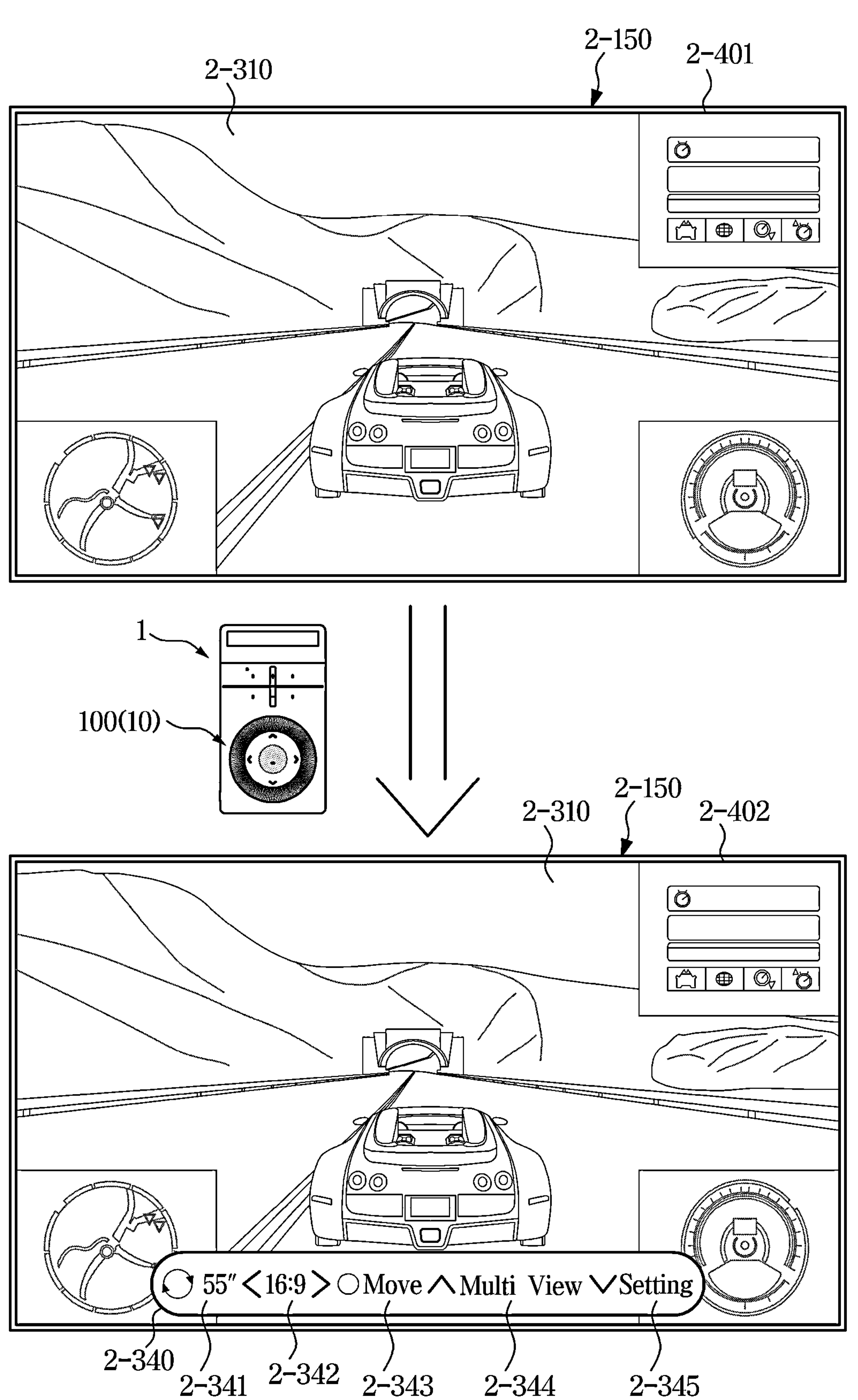
FIG. 23 is a schematic view illustrating an example of an object being controlled by a button included in the controller of FIG. 1 according to an embodiment.

FIG. 23 is a schematic view illustrating an example of the object 2 being controlled by a button included in the controller 1 of FIG. 1

The interaction of the central wheel button 50*e* included in the controller 1 will be described with reference to FIG. 23.

The display apparatus 2-100 may receive a remote-control signal corresponding to a user input from the controller 1 and control the display 2-150 in response to the received remote control signal.

The display apparatus 2-100 may receive a content from a content source. The display processor 2-182 of the display apparatus 2-100 may process video data included in the content and control the display 2-150 to display a first content image 2-310 based on the processing of the video data. In other words, the display processor 2-182 may provide the display 2-150 with an image frame 2-406 that includes only the first content image 2-310.

At this time, the display processor 2-182 may operate in a display mode.

While the display apparatus 2-100 displays a series of images, the controller 1 may obtain a user input from a user to modify settings associated with the display 2-150.

For example, a user can press the central wheel button 50*e* of the controller 1. The controller 1 may transmit a remote-control signal corresponding to the operation of the central wheel button 50*e*.

The display processor 2-182 may receive a remote-control signal through the remote signal receiver 2-120 (FIG. 21) and may switch the display mode to the edit mode in response to the remote-control signal of the controller 1.

In the edit mode, the display processor 2-182 may control the display 2-150 to display a key guide 2-340 on the first content image 2-310. In other words, the display processor 2-182 may provide the display 2-150 with an image frame 2-406 in which the key guide 2-340 is superimposed on the first content image 2-310.

The key guide 2-340 may include control commands mapped to the wheel button 50 and the rotating body 200 of the controller 1. For example, the key guide 2-340 may include a first guide image 2-341 indicating a user input mapped to the rotation of the rotating body 200, a second guide image 2-342 indicating a user input mapped to the first wheel button 50*a* and the third wheel button 50*c*, a third guide image 2-343 indicating a user input mapped to the central wheel button 50*e*, a fourth guide image 2-344 indicating a user input mapped to the fourth wheel button 50*d*, and a fifth guide image 2-345 indicating a user input mapped to the second wheel button 50*b*.

For example, a user input for changing or adjusting the size of the content image may be mapped to the rotation of the rotating body 200. The first guide image 2-341 may include a guide image indicating the rotation of the rotating body 200 and a guide image indicating the size of the selected content image.

A user input for changing or adjusting an aspect ratio of a screen of a content image may be mapped to the first wheel button 50*a* and the third wheel button 50*c*. The aspect ratio may represent a ratio between a horizontal width (or horizontal resolution) of the image and a vertical height (or vertical resolution) of the image. The second guide image 2-342 may include a guide image indicating the first wheel button 50*a* and the third wheel button 50*c* and a guide image indicating the aspect ratio of a selected content image.

As mentioned above, a user input for immediately changing a content image by inputting may be mapped to the rotating body 200 and the first wheel button 50*a*/third wheel button 50*c*. Accordingly, while looking at the content image, a user can change or adjust the size and/or aspect ratio of the content image by using the rotating body 200 and the first wheel button 50*a*/third wheel button 50*c*. In addition, a user can immediately check the size and/or aspect ratio of the content image through the key guide 2-340.

In addition, a user input for moving a selected content image may be mapped to the central wheel button 50*e*. A user input for displaying a plurality of content images on the display 2-150 may be mapped to the second wheel button 50*b*. In addition, a user input for changing or adjusting an image parameter of a content image may be mapped to the fourth wheel button 50*d*.

In the edit mode, the display processor 2-182 may map control commands to remote control signals via the wheel button 50 and remote-control signals via the rotating body 200, which is the same as indicated in the key guide 2-340.

Figure 24:
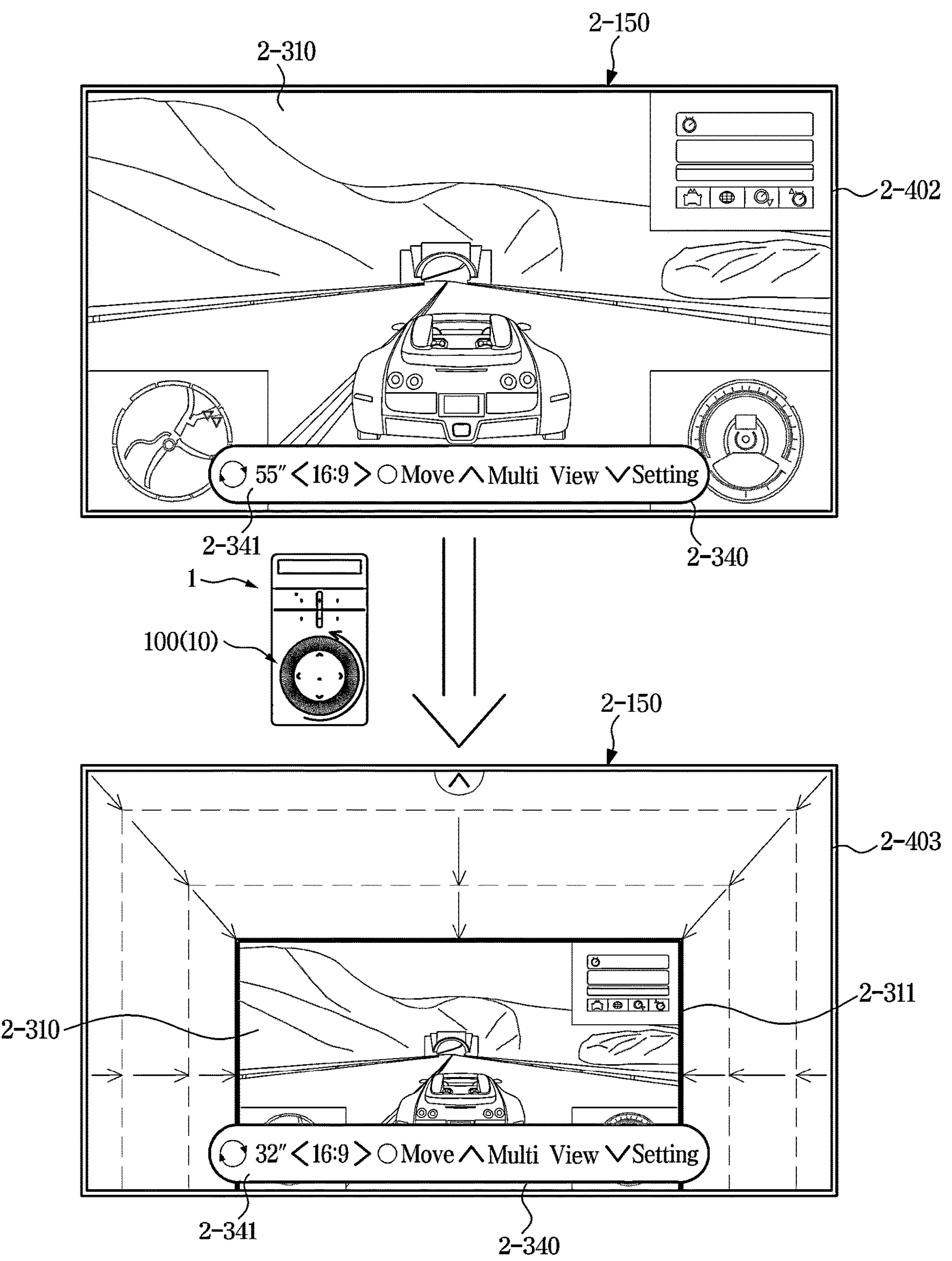
FIG. 24 is a schematic view illustrating an example in which an object is controlled by the rotating wheel included in the controller of FIG. 1 according to an embodiment.

FIG. 24 is a schematic view illustrating an example in which the object 2 is controlled by the rotating wheel 100 included in the controller 1 of FIG. 1.

The control of the controller 1 using the first wheel button 50*a* to the fourth wheel button 50*d* will be described with reference to FIG. 24.

The display processor 2-182 may control the display 2-150 to display the key guide 2-340 on the first content image 2-310.

The controller 1 may obtain a user input from a user to reduce or enlarge the first content image 2-310 displayed on the display 2-150.

For example, the controller 1 may obtain a user input for rotating the rotating body 200 counterclockwise.

The display processor 2-182 may control the display 2-150 to reduce the first content image 2-310 in response to the user input that the rotating body 200 of the controller 1 rotates counterclockwise. In other words, the display processor 2-182 may provide an image frame 2-406, in which the first content image 2-310 is reduced, to the display 2-150.

While reducing the first content image 2-310, the display processor 2-182 may display a change in the size of the first content image 2-310 on the key guide 2-340. For example, the display processor 2-182 may control the display 2-150 to display the size (55 inches) of the first content image 2-310 on the first guide image 2-341 of the key guide 2-340. The display processor 2-182 may control the display 2-150 to display the changed size (32 inches) of the first content image 2-310 on the first guide image 2-341 in response to a user input that the rotating body 200 rotates counterclockwise.

At this time, the first content image 2-310 may be designated as an activated content image selected by a user. In order to indicate that the first content image 2-310 is an activated content image, a border may be displayed around the first content image 2-310. The user can easily distinguish the content image selected by the user through the border.

The display processor 2-182 may control the display 2-150 to reduce the first content image 2-310 discontinuously or stepwise. The display processor 2-182 may control the display 2-150 to reduce the first content image 2-310 stepwise according to the size of monitor that is widely used commercially. For example, the display processor 2-182 may control the display 2-150 to reduce the first content image 2-310 stepwise in the order of 55 inches, 47 inches, 42 inches, 32 inches, 27 inches, and 24 inches.

Further, the display processor 2-182 may control the display 2-150 to continuously or linearly reduce the first content image 2-310. The display processor 2-182 may control the display 2-150 to linearly reduce the first content image 2-310 according to the rotational displacement of the rotating body 200.

As another example, the controller 1 may obtain a user input for rotating the rotating body 200 clockwise.

The display processor 2-182 may control the display 2-150 to enlarge the first content image 2-310 in response to the user input that the rotating body 200 of the controller 1 rotates clockwise. In other words, the display processor 2-182 may provide an image frame 2-406, in which the first content image 2-310 is enlarged, to the display 2-150.

While enlarging the first content image 2-310, the display processor 2-182 may display a change in the size of the first content image 2-310 on the key guide 2-340. For example, the display processor 2-182 may control the display 2-150 to display the size (32 inches) of the first content image 2-310 on the first guide image 2-341 of the key guide 2-340. The display processor 2-182 may control the display 2-150 to display the changed size (50 inches) of the first content image 2-310 on the first guide image 2-341 in response to the user input that the rotating body 200 rotates clockwise.

The display processor 2-182 may control the display 2-150 to enlarge the first content image 2-310 discontinuously or stepwise according to the size of monitor that is widely used commercially. In addition, the display processor 2-182 may control the display 2-150 to enlarge the first content image 2-310 continuously or linearly according to the rotational displacement of the rotating body 200.

In response to the rotation of the rotating body 200 in a clockwise or counterclockwise direction, the content image may be reduced or enlarged. However, the present disclosure is not limited thereto. For example, the content image may be reduced or enlarged in response to the operation of the second wheel button 50*b* or the operation of the fourth wheel button 50*d*. In addition, the content image may be reduced or enlarged in response to the operation of the first wheel button 50*a* or the operation of the left key 215.

The content image may be reduced toward a bottom center of the image frame 2-406 and enlarged from the bottom center of the image frame 2-406. Accordingly, the content image may be disposed at the bottom of the image frame 2-406 while the content image is reduced or enlarged.

However, the present disclosure is not limited thereto. For example, the content image may be reduced toward a top center of the image frame 2-406 and enlarged from the top center of the image frame 2-406. Accordingly, the content image may be disposed at the top of the image frame 2-406 while the content image is reduced or enlarged. Alternatively, the content image may be reduced toward a left center or right center of the image frame 2-406 and enlarged from the left center or right center of the image frame 2-406.

Meanwhile, embodiments related to the disclosed processor 41 may be embodied in the form of a recording medium storing instructions executable by a computer. The instructions may be stored in the form of program code and, when executed by the processor 41, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Storage medium readable by machine, may be provided in the form of a non-transitory storage medium. "Non-transitory" means that the storage medium is a tangible device and does not contain a signal (e.g., electromagnetic wave), and this term includes a case in which data is semi-permanently stored in a storage medium and a case in which data is temporarily stored in a storage medium. The non-transitory storage medium may include a buffer in which data is temporarily stored.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

Hereinafter other examples in which the present disclosure is implemented will be described. In describing other embodiments, the same configurations as those illustrated in FIGS. 1 to 24 may be given the same drawing reference numerals and a description thereof may be omitted.

In addition, each embodiment may be implemented in combination within a range that is not mutually conflicting. It is considered that the present disclosure also includes an embodiment regarding a combination of each embodiment.

Figure 25:
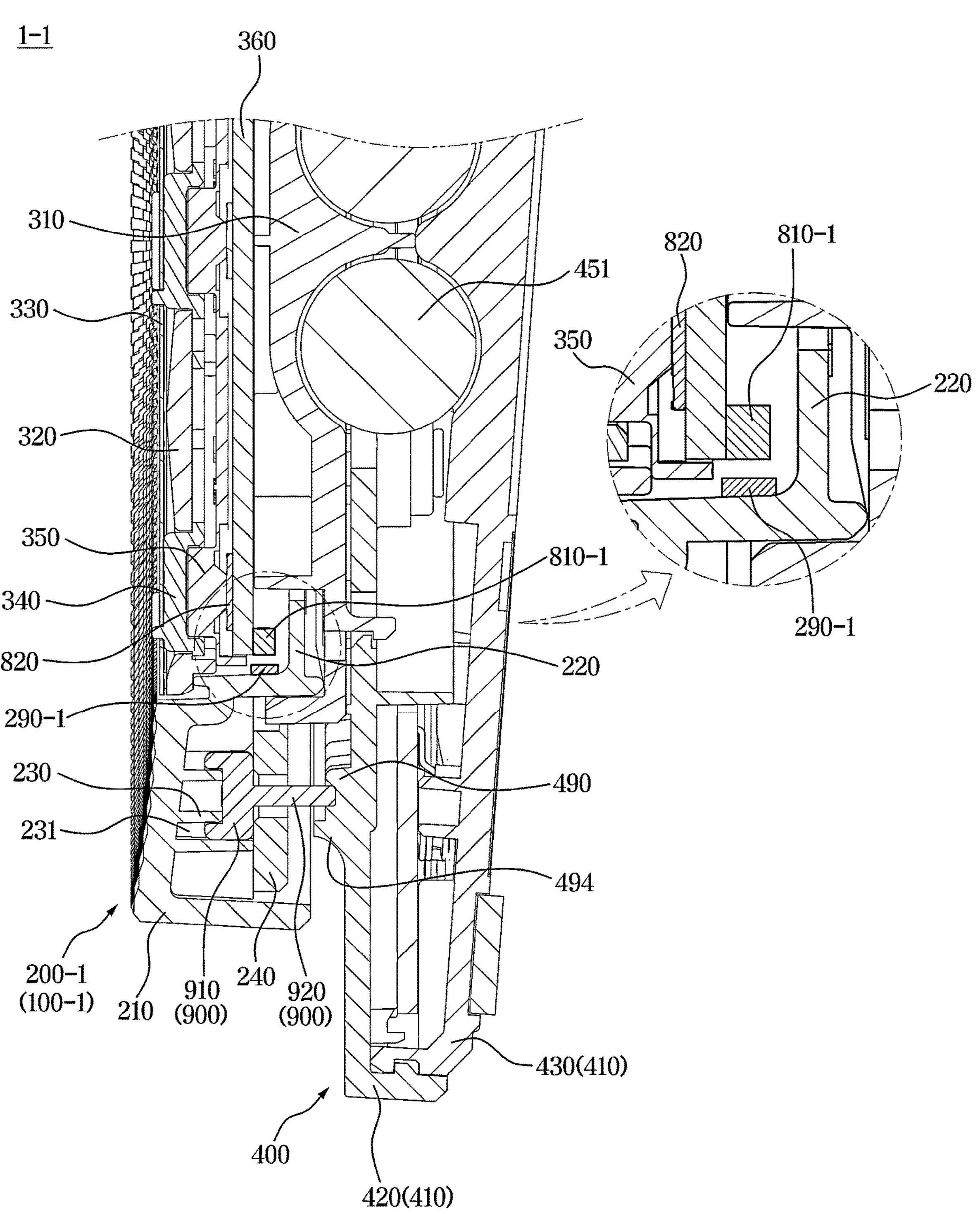
FIG. 25 is a cross-sectional view of a controller according to an embodiment of the present disclosure.

FIG. 25 is a cross-sectional view of a controller 1-1 according to one embodiment of the present disclosure.

The controller 1-1 including a wheel sensor 810-1 or a coating layer 290-1 disposed at a different position from the embodiments described in FIGS. 1 to 24 will be described with reference to FIG. 25.

The controller 1-1 includes the wheel sensor 810-1 disposed on the wheel board 360 and provided to face the wheel cover 210.

The wheel sensor 810-1 may be disposed to face the wheel inner wall 213. The wheel sensor 810-1 may detect movement of the wheel inner wall 213 according to rotation of a rotating body 200-1, thereby outputting a signal corresponding to the rotation of the rotating body 200-1.

In order that the wheel sensor 810-1 outputs an accurate signal, the wheel cover 210 may include the wheel inner wall 213 including a uniform surface detected by the wheel sensor 810-1.

In order that the wheel sensor 810-1 outputs an accurate signal, the wheel cover 210 may include the coating layer 290-1 disposed on the wheel inner wall 213 so as to face the wheel sensor 810-1.

A description of the coating layer 290-1 is the same as in the embodiment described with reference to the drawings illustrated in FIGS. 1 to 24.

Figure 26:
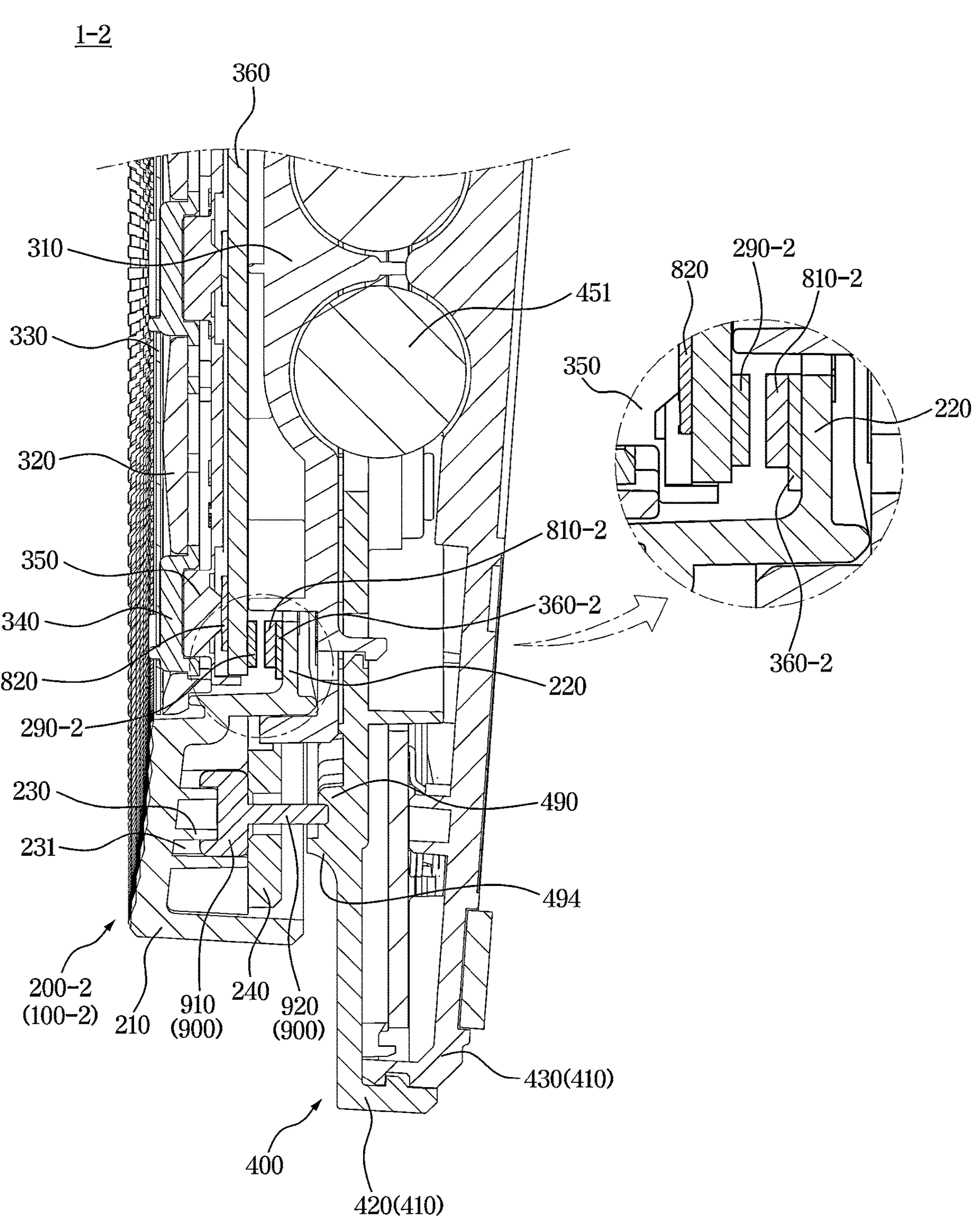
FIG. 26 is a cross-sectional view of a controller according to an embodiment of the present disclosure.

FIG. 26 is a cross-sectional view of a controller 1-2 according to one embodiment of the present disclosure.

The controller 1-2 including a wheel sensor 810-2 or a coating layer 290-2 disposed at a different position from the embodiments described in FIGS. 1 to 24 will be described with reference to FIG. 26.

The wheel sensor 810-2 may be disposed on the wheel cover 210. The wheel sensor 810-2 may be disposed on the reaction flange 220 of the wheel cover 210. The wheel sensor 810-2 may be disposed to face a wheel board 360-2.

A rotating wheel 100-2 may include a wheel sensor board 360-2 disposed between the wheel cover 210 and the wheel board 360-2. The wheel sensor board 360-2 may be installed on a side, which faces the board, of the wheel cover 210. The wheel sensor board 360-2 may be provided on the reaction flange 220.

The wheel button sensor 820 may be rotatable together with the wheel cover 210. The wheel button sensor 820 may be coupled to the wheel cover 210.

The wheel sensor board 360-2 may be electrically connected to the main board 450.

The wheel sensor 810-2 may be disposed on the wheel sensor board 360-2. The wheel sensor 810-2 may be electrically connected to the wheel button sensor 820. The wheel sensor 810-2 may be disposed to face the wheel board 360-2.

The rotating wheel 100-2 may include the coating layer 290-2 on the wheel board 360-2. The coating layer 290-2 may be disposed to face the wheel sensor 810-2.

Figure 27:
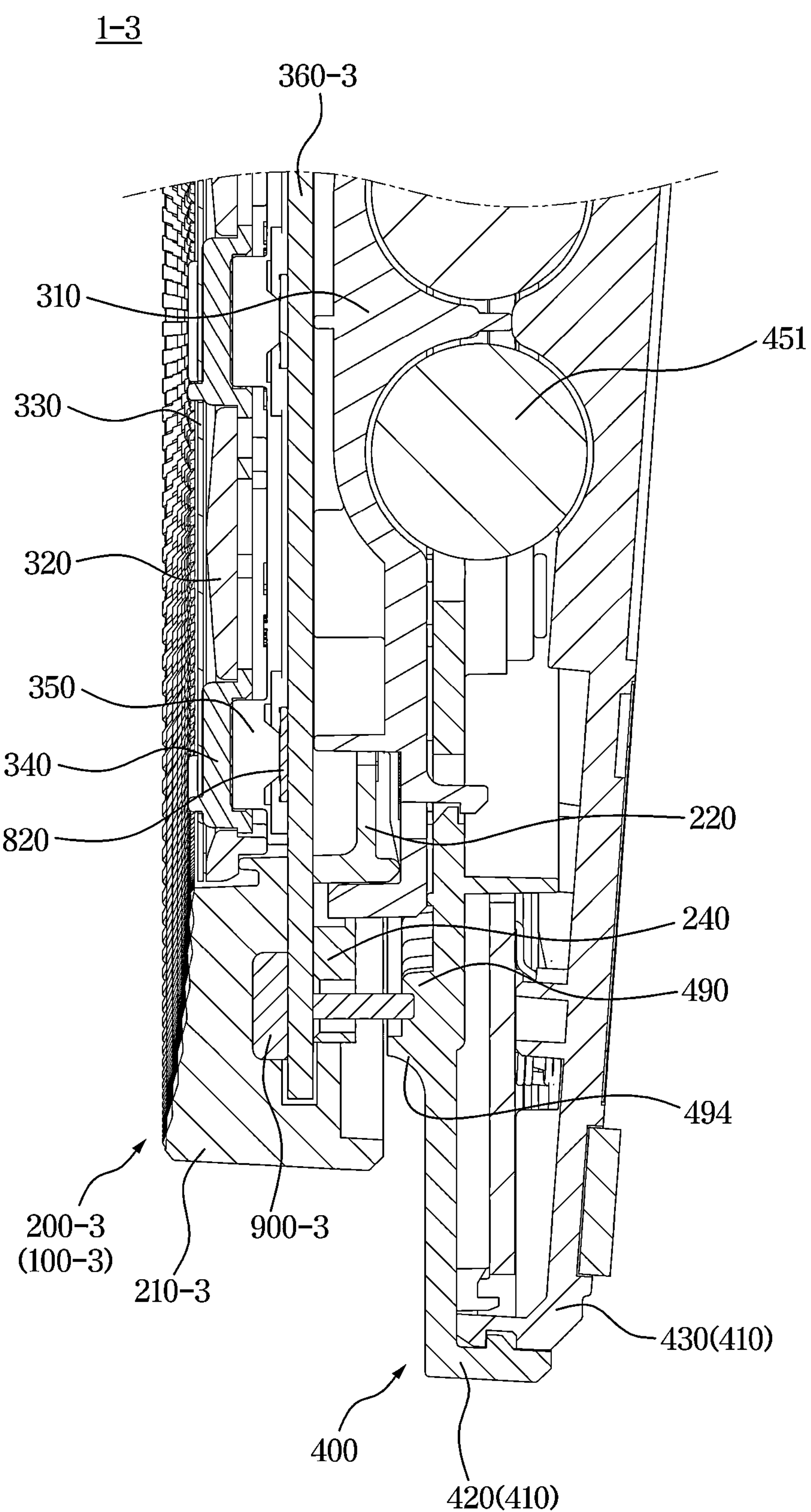
FIG. 27 is a cross-sectional view of a controller according to an embodiment of the present disclosure.

FIG. 27 is a cross-sectional view of a controller 1-3 according to one embodiment of the present disclosure.

The controller 1-3 including a clicker 900-3 different from the embodiments described in FIGS. 1 to 24 will be described with reference to FIG. 27.

The clicker 900-3 may be configured to output a signal depending on contact or pressure. That is, the clicker 900-3 may be a sensor.

The clicker 900-3 may be stimulated by contact with the plurality of ribs 490 or being pressed by the plurality of ribs 490 according to the rotation of the rotating body 200-3, and may output a signal regarding the amount of rotation of a rotating body 200-3. Therefore, it is the same as the embodiment described in FIGS. 1 to 24 that at least a portion of the clicker 900-3 is arranged between the plurality of ribs 490.

The clicker 900-3 may be provided on a wheel board 360-3. The clicker 900-3 and the wheel board 360-3 may be electrically connected. The clicker 900-3 may be coupled to the wheel board 360-3.

The clicker 900-3 may protrude from the wheel board 360-3 toward the main body 400.

The wheel board 360-3 may be rotatable. The wheel board 360-3 may be coupled to a wheel cover 210-3. Accordingly, when the wheel cover 210-3 rotates, the wheel board 360-3 may rotate together. When the wheel board 360-3 rotates, the clicker 900-3 coupled thereto may rotate together with the wheel board 360-3.

The wheel board 360-3 may rotate relative to the second fixed body part 320. The second fixed body part 320 may have a shape that penetrates the rotation center of the wheel board 360-3, and the shape penetrating the wheel board 360-3 may be coupled to the first fixed body part 310.

A component that prevents the rotation of the wheel board 360-3 among components for coupling the first fixed body part 310 and the second fixed body part 320 may not be included in the embodiment.

Figure 28:
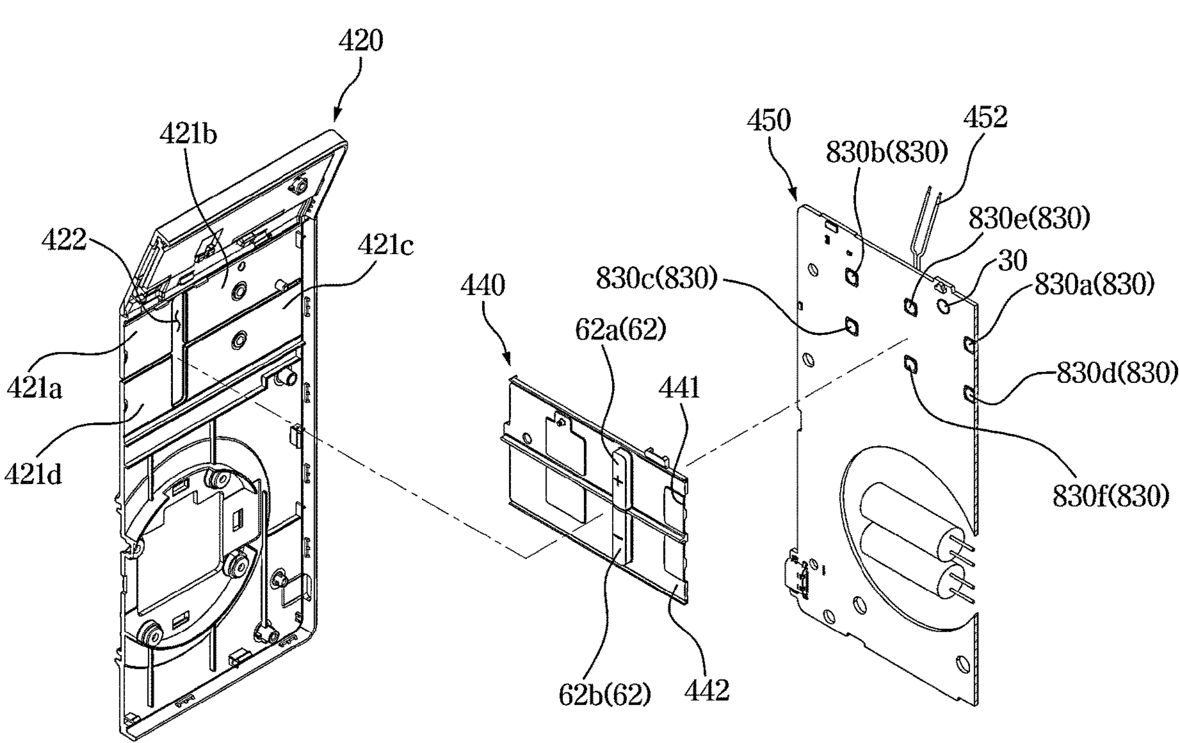
FIG. 28 is a cross-sectional view of a controller according to an embodiment of the present disclosure.

FIG. 28 is a cross-sectional view of a controller 1-4 according to one embodiment of the present disclosure.

The controller 1-4 including a wheel cover 210-4, a first fixed body part 310-4, or a wheel bracket 240-4, which are different from the embodiments described in FIGS. 1 to 24, will be described with reference to FIG. 28.

The wheel cover 210-4 may be disposed between the first fixed body part 310-4 and a second fixed body part 320-4.

The wheel cover 210-4 may not be exposed upward. The second fixed part 320-4 may be disposed on an upper side of the wheel cover 210-4 to cover the wheel cover 210-4.

The wheel cover 210-4 may include a guide protrusion 225-4 that protrudes toward the second fixed body part 320-4 so as to be accommodated in the second fixed body part 320-4. Accordingly, the wheel cover 210-4 may rotate at a predetermined position.

The wheel cover 210-4 may include a wheel outer wall 212-4 exposed laterally from the second fixed body part 320-4 and the first fixed body part 310-4. A user can control the controller 1-4 by manipulating the wheel outer wall 212-4. The wheel outer wall 212-4 may prevent the clicker 900-4 from being exposed to the outside.

The wheel cover 210-4 may include a wheel inner wall 213-4 disposed on the inner side of the wheel outer wall 212-4. A mounting space 226-4 may be defined on an inner side of the wheel inner wall 213-4.

The wheel inner wall 213-4 may include a first wheel inner wall 213*a*-4 connected to the wheel outer wall 212-4. The first wheel inner wall 213*a*-4 may extend toward a main body 400-4.

The wheel cover 210-4 may include a reaction flange 220-4 extending from the first wheel inner wall 213*a*-4 toward a rotation center of a rotating body 200-4.

The wheel inner wall 213-4 may include a second wheel inner wall 213*b*-4 extending from an end of the reaction flange 220-4 toward the main body 400-4.

An accommodation space 232-4 surrounded by the second wheel inner wall 213*b*-4, the reaction flange 220-4, and the wheel outer wall 212-4 may be defined. The accommodation space 232-4 may be a space in which the clicker 900-4 is accommodated.

The first fixed body part 310-4 may include a second anti-separation rib 223*b*-4 arranged closer to the rotation center of the rotating body 200-4 than the second wheel inner wall 213*b*-4 with respect to the rotation center. The second anti-separation rib 223*b*-4 may be bent and extended toward the main body 400-4. The second anti-separation rib 223*b*-4 may be arranged to face the second wheel inner wall 213*b*-4.

The first fixed body part 310-4 may include a first anti-separation rib 223*a*-4 that is arranged further from the rotation center of the rotating body 200-4 than the second wheel inner wall 213*b*-4 with respect to the rotation center. The first anti-separation rib 223*a*-4 may be bent and extended in a direction away from the main body 400-4. The first anti-separation rib 223*a*-4 may be arranged to face the second wheel inner wall 213*b*-4.

The first fixed body part 310-4 may include an inner wall accommodating portion 224-4 connecting the first anti-separation rib 223*a*-4 and the second anti-separation rib 223*b*-4.

The second wheel inner wall 213*b*-4 may be accommodated in a space formed by the first anti-separation rib 223*a*-4, the second anti-separation rib 223*b*-4, and the inner wall accommodating portion 224-4. Accordingly, the rotating body 200-4 may rotate without deviating from a predetermined path.

The wheel bracket 240-4 may include a space recessed toward at least one rib 490-4 to allow the clicker 900-4 to be received. This may prevent the clicker 900-4 from being separated from the rotating body 200-4 when the rotating body 200-4 rotates.

Figure 29:
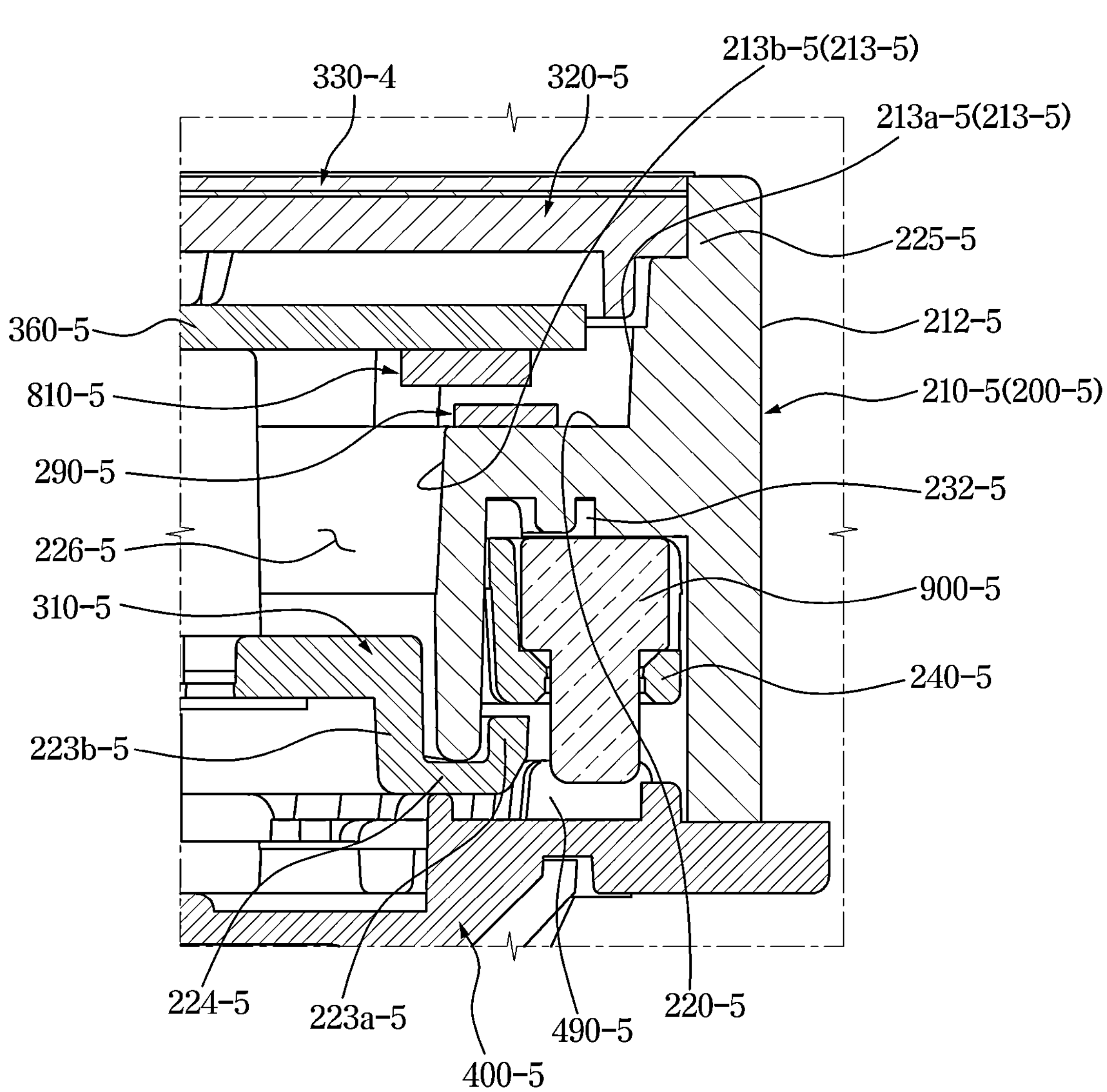
FIG. 29 is a cross-sectional view of a controller according to an embodiment of the present disclosure.

FIG. 29 is a cross-sectional view of a controller 1-5 according to one embodiment of the present disclosure.

The controller 1-5 including a wheel outer wall 212-5 different from the embodiment described in FIG. 28 will be described with reference to FIG. 29.

The wheel outer wall 212-5 may protrude toward an upper side of the controller 1-5. Accordingly, a user can operate a rotating wheel 100-5 not only from a lateral side but also from an upper side of the rotating wheel 100-5.

Figure 30:
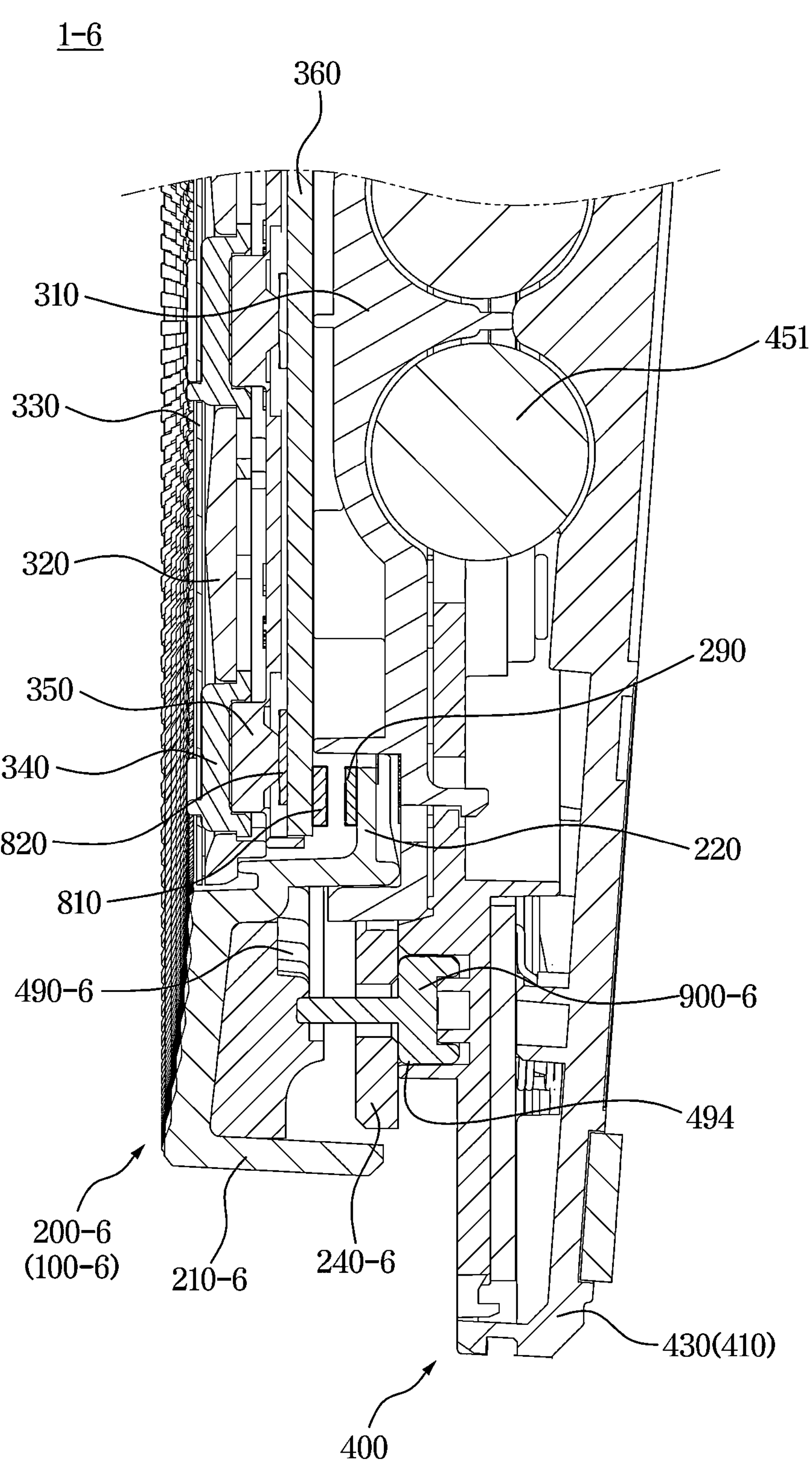
FIG. 30 is a cross-sectional view of a controller according to an embodiment of the present disclosure.

FIG. 30 is a cross-sectional view of a controller 1-6 according to one embodiment of the present disclosure.

The controller 1-6, in which a clicker 900-6, at least one rib 490-6 or a bracket have a positional relationship different from the embodiments described in FIGS. 1 to 24, will be described with reference to FIG. 30.

The clicker 900-6 may be coupled to the main body 400. The clicker 900-6 may extend toward a rotating wheel 100-6.

A wheel bracket 240-6 may support the clicker 900-6 on a side opposite to a side on which the clicker 900-6 is coupled to the main body 400.

The rotating wheel 100-6 may include a plurality of ribs 490-6 arranged to be in contact with the clicker 900-6. The plurality of ribs 490-6 may be arranged to correspond to a movement path of the clicker 900-6. The plurality of ribs 490-6 may be provided on a wheel cover 210-6.

Figure 31:
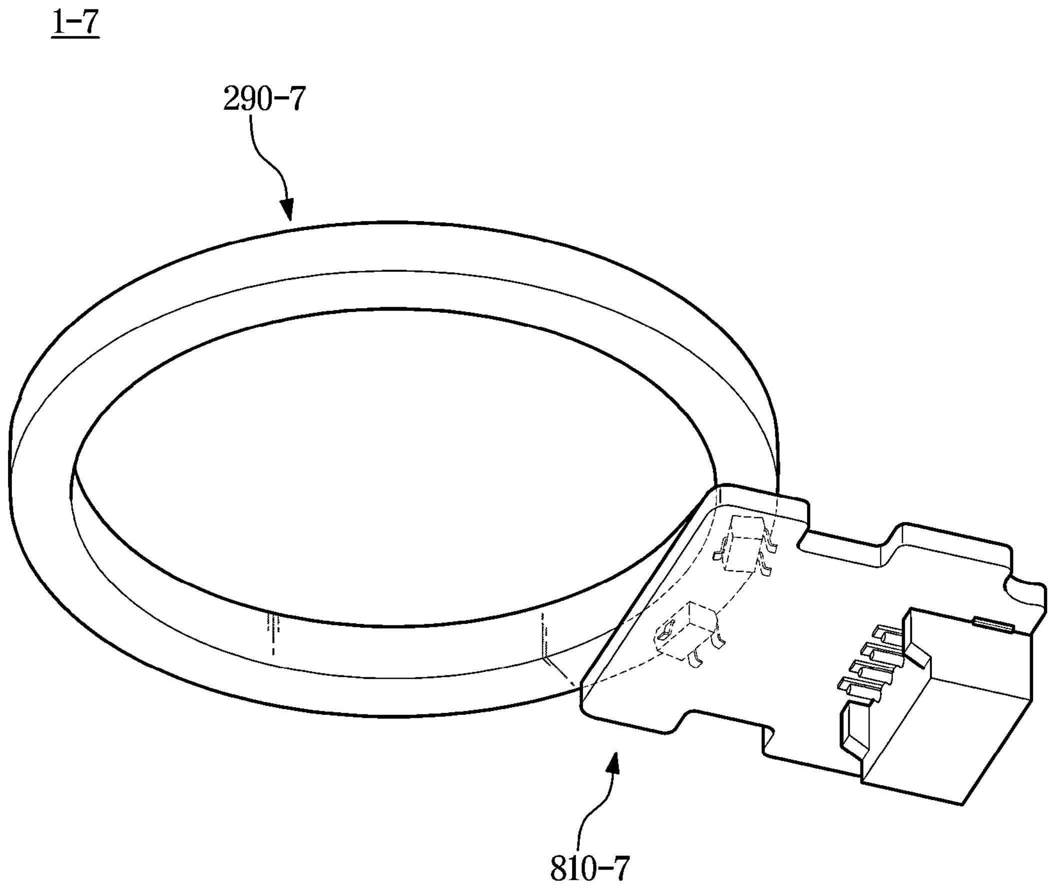
FIG. 31 is a perspective view of a rotating wheel sensor and a coating layer of a controller according to one embodiment of the present disclosure.
Figure 32:
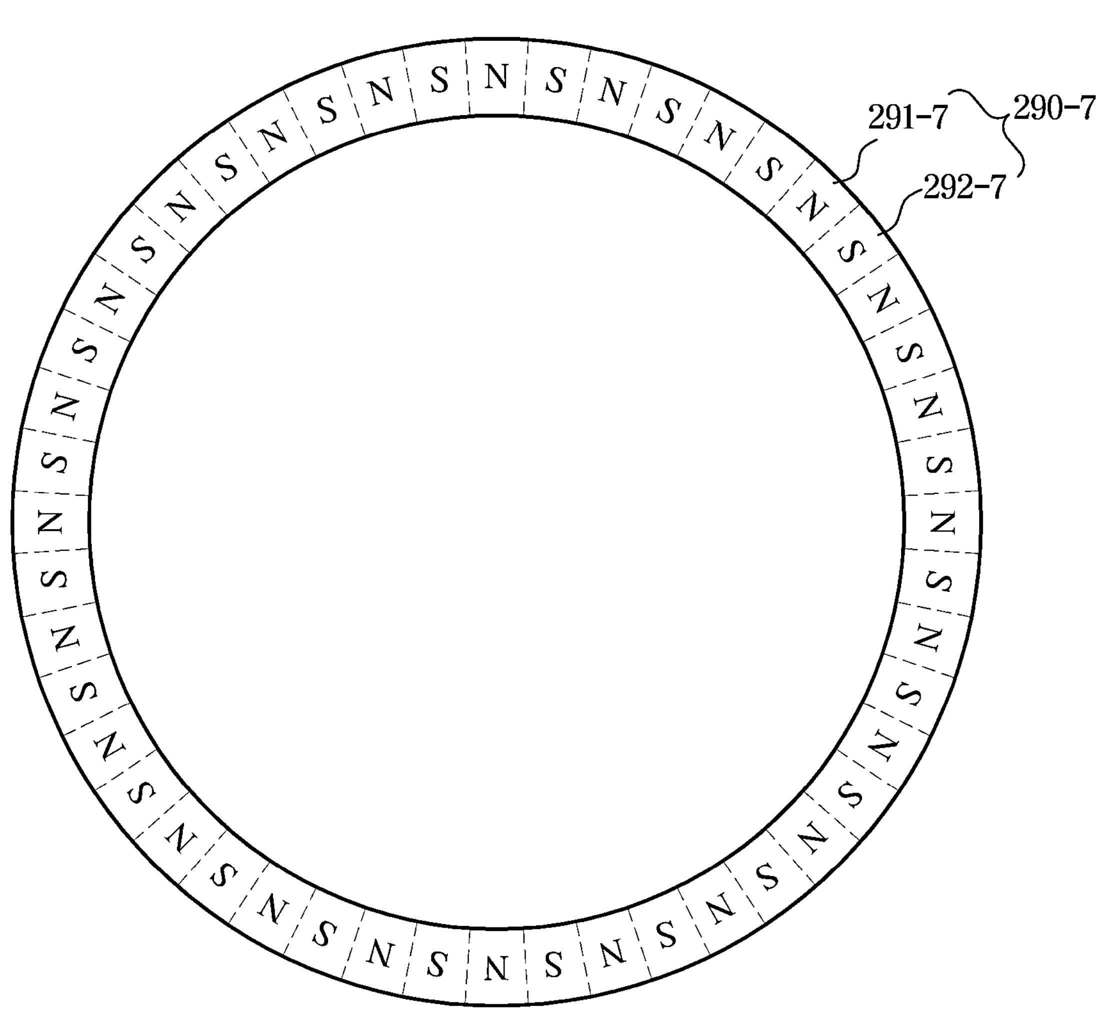
FIG. 32 is a plan view of the coating layer of the controller of FIG. 31.

FIG. 31 is a perspective view of a wheel sensor 810-7 and a coating layer 290-7 of a controller 1-7 according to one embodiment of the present disclosure. FIG. 32 is a plan view of the coating layer 290-7 of the controller 1-7 of FIG. 31.

The controller 1-7 including the wheel sensor 810-7 and the coating layer 290-7 having a different relationship from the embodiments described in FIGS. 1 to 24 will be described with reference to FIGS. 31 and 32.

The coating layer 290-7 may include an N pole 291-7 and a S pole 292-7. In the coating layer 290-7, the N pole 291-7 and the S pole 292-7 may be provided alternately.

The wheel sensor 810-7 may be disposed adjacent to the coating layer 290-7.

The wheel sensor 810-7 may detect changes in the N pole 291-7 and S pole 292-7 of the coating layer 290-7, and may detect a rotation angle of the coating layer 290-7 based on the detected changes.

The wheel sensor 810-7 may further include a connector. The connector may be coupled to the wheel board 360. The connector may be electrically connected to the wheel board 360. For example, the connector may be electrically connected to the wheel board 360 via a terminal.

That is, the controller 1 according to the present disclosure may be implemented as follows.

The controller 1 may include the main body 400 including the at least one rib 490, the rotating wheel 100 including the fixed body 300 supported by the main body 400, and the rotating body 200 disposed to face the at least one rib 490 and coupled to the fixed body 300 to be rotatable with respect to the fixed body 300, and the clicker 900 protruding from the rotating body 200 toward the main body 400 to allow the end portion to be disposed between the at least one rib 490. The rotating body 200 may include the wheel cover 210 in which the accommodation space 232 recessed in a direction away from the at least one rib 490 is defined to allow at least a portion of the clicker 900 to be disposed inside.

The at least one rib 490 may include the first rib 490*a*, the second rib 490*b* arranged adjacent to one side of the first rib 490*a*, and the third rib 490*c* arranged adjacent to the other side different from the one side of the first rib 490*a*. In response to the clicker 900 moving in a direction from the second rib 490*b* toward the first rib 490*a*, the clicker 900 may be movable from the stationary position located between the second rib 490*b* and the first rib 490*a* to the elastic position in which the clicker is elastically supported and deformed by the first rib 490*a*, and the clicker 900 may be movable from the elastic position to the contact position in which the clicker is arranged to come into contact with the third rib 490*c*.

The clicker 900 may include the head 910 coupled to the rotating body 200 and the neck 920 extending from the head 910 toward the main body 400. The neck 920 may include the inclined portion 921 provided to be inclined toward the end portion thereof so as to reduce a resistance generated by the first rib 490*a* in response to the clicker 900 being in the elastic position.

The at least one rib 490 may protrude toward the rotating body 200 and extend toward the rotation axis of the rotating body 200, and be disposed along the movement position of the clicker 900. The at least one rib 490 may include the rib edge 493 provided to be in contact with the clicker 900, and rounded and chamfered to reduce a resistance caused by the first rib 490*a* in response to the clicker 900 being in the elastic position.

The clicker 900 may include the extension 922 extending from the inclined portion 921 toward the head 910, and the reinforcing portion 923 connected to the extension 922 and the head 910 and having the cross-sectional area greater than that of the extension 922 to reinforce the connection between the neck 920 and the head 910.

The wheel cover 210 may be disposed to face one end of the head 910 of the clicker 900. The rotating body 200 may include the wheel bracket 240 positioned to face the other end located opposite to the one end of the head 910 of the clicker 900, and coupled to the wheel cover 210 to fix the clicker 900 to the rotating body 200.

The fixing groove 911 that is recessed in a direction opposite to a direction facing the wheel cover 210 may be defined in the head 910 of the clicker 900. The wheel cover 210 may include the fixing protrusion 230 protruding toward the fixing groove 911 to correspond to the fixing groove 911 so as to be accommodated and fixed in the fixing groove 911, and the head 910 groove 231 recessed in a direction away from the head 910 to correspond to the head 910 so as to allow the head 910 of the clicker 900 to be accommodated and fixed.

The fixed body 300 may include the first fixed body part 310 coupled to the main body 400 and the second fixed body part 320 coupled to the first fixed body part 310 with the wheel cover 210 interposed therebetween so as to prevent the wheel cover 210 from being separated from the fixed body 300. The wheel cover 210 may further include the first protruding rib 222*a* protruding toward the first fixed body part 310 so as to be rotatable by being in contact with the first fixed body part 310, and the second protruding rib 222*b* protruding in a direction opposite to the direction, in which the first protruding rib 222*a* protrudes, toward the second fixed body part 320 so as to be rotatable by being in contact with the second fixed body part 320.

The controller 1 may further include the wheel sensor 810 configured to detect an amount of rotation of the rotating body with respect to the fixed body 300, the transmitter 30 configured to transmit a signal toward the object 2 controlled by the controller 1, and the processor 41 electrically connected to the wheel sensor and the transmitter. The processor 41 may be configured to control the transmitter 30 based on the amount of rotation measured by the wheel sensor 810.

The fixed body 300 may further include the wheel board 360 disposed between the first fixed body part 310 and the second fixed body part 320. The wheel sensor 810 may be supported by the wheel board 360. The wheel cover 210 may include the reaction flange 220 extending toward the rotation axis of the rotating body 200 so as to face the wheel board 360 with the wheel sensor 810 interposed therebetween.

The wheel sensor 810 may include an optical sensor. The wheel cover 210 may include the coating layer 290 provided on the reaction flange 220 so as to provide a uniform surface facing the optical sensor. The processor 41 may be configured to recognize the amount of rotation of the rotating body 200 and control the transmitter 30 based on a signal output by the optical sensor recognizing light reflected by the coating layer 290.

The main body 400 may further include the main body housing 410 coupled to the rotating wheel 100, and including the function button cover 421 including at least two edges that are fixed ends and configured to be pressed, the main board 450 disposed to face the main body housing 410, and the function button damper 440 disposed between the function button cover 421 and the main board 450. The controller 1 may further include the function button sensor 830 disposed between the function button damper 440 and the main board 450 to detect that the function button cover 421 is pressed. The function button damper 440 may include the support portion 442 disposed to be spaced apart from the function button sensor 830, and the pressing portion 441 disposed to correspond to the function button sensor 830 and formed to be thinner than the support portion 442 so as to be deformable to protrude toward the function button sensor 830.

The wheel cover 210 may be configured to be rotatable with respect to the wheel board 360. The controller 1 may further include the connection cable 500 formed of a flexible material to connect the main board 450 and the wheel board 360.

The controller 1 may further include the wheel button sensor 820 configured to output a signal to the processor 41 in response to the second fixed body part 320 being pressed. The wheel cover 210 may include the contact surface 211 provided to be exposed toward the outside of the second fixed body part 320, disposed adjacent to an outer surface of the second fixed body part 320 and extending radially from the second fixed body part 320 with respect to the rotation axis of the rotating body 200.

The main body 400 may include the first surface P to which the rotating wheel 100 is coupled, the first surface provided to have the first angle n with respect to the bottom surface of the main body 400. The controller 1 may further include the solar cell 29 disposed on the main body 400 to have the second angle m, which is different from the first angle n, with respect to the bottom surface of the main body 400, and configured to generate electric energy from external light. The main body 400 may further include the capacitor 451 electrically connected to the solar cell 29 to store electric energy generated from the solar cell 29.

The controller 1 configured to control the object 2 may include the main body 400 including the at least one rib 490; the rotating wheel 100 including the fixed body 300 supported by the main body 400, and the rotating body 200 disposed to face the at least one rib 490 and coupled to the fixed body 300 to be rotatable with respect to the fixed body 300; and the clicker 900 protruding from the rotating body 200 toward the main body 400 to allow an end portion to be disposed between the at least one rib 490. The rotating body 200 may include the wheel cover 210 in which the accommodation space 232 recessed in a direction away from the at least one rib 490 is defined to allow at least a portion of the clicker 900 to be disposed inside. The wheel cover 210 may include the contact surface 211 provided to be exposed toward an outside of the fixed body 300, disposed adjacent to an outer surface of the fixed body 300 and extending radially with respect to the rotation axis of the rotating body 200.

The main body 400 may further include the function button cover 421 configured to be pressed, and the main board 450 disposed to face the function button cover 421. The controller 1 may further include the wheel sensor 810 configured to detect an amount of rotation of the rotating body 200 with respect to the main body 400, the function button sensor 830 configured to detect pressure of the function button cover 421 and electrically connected to the main board 450 and supported by the main board 450, the transmitter 30 configured to transmit a signal toward the object 2 controlled by the controller 1, and the processor 41 electrically connected to the wheel sensor 810, the function button sensor 830, and the transmitter 30, and configured to control the transmitter based on the amount of rotation measured by the wheel sensor 810, and a signal related to the pressure of the function button cover 421 measured by the function button sensor 830. The fixed body 300 may further include the wheel board 360 electrically connected to the wheel sensor 810 and the main board 450, and provided to support the wheel sensor 810.

The clicker 900 may include the head 910 coupled to the rotating body 200, and the neck 920 extending from the head 910 toward the main body 400. The neck 920 may include the inclined portion 921 provided to be inclined toward an end portion thereof so as to reduce a resistance generated by the at least one rib 490 in response to the clicker 900 being in contact with the at least one rib 490.

The fixing groove 911 that is recessed in a direction opposite to a direction facing the wheel cover 210 may be defined in the head 910 of the clicker 900. The wheel cover 210 may include the fixing protrusion 230 protruding toward the fixing groove 911 to correspond to the fixing groove 911 so as to be accommodated and fixed in the fixing groove 911, and the head 910 groove 231 recessed in a direction away from the head 910 to correspond to the head 910 so as to allow the head 910 of the clicker 900 to be accommodated and fixed.

The controller 1 configured to control the object 2 may include the main body 400 including the at least one rib 490, the rotating wheel 100 including the fixed body 300 supported by the main body 400, and the rotating body 200 disposed to face the at least one rib 490 and coupled to the fixed body 300 to be rotatable with respect to the fixed body 300; the wheel sensor 810 configured to detect an amount of rotation of the rotating body 200 with respect to the fixed body 300; the transmitter 30 configured to transmit a signal toward the object 2 controlled by the controller 1; the processor 41 electrically connected to the wheel sensor 810 and the transmitter 30; and the clicker 900 protruding from the rotating body 200 toward the main body 400 to allow an end portion to be disposed between the at least one rib 490. The processor 41 may be configured to control the transmitter 30 based on the amount of rotation measured by the wheel sensor 810.

One aspect of the present disclosure seeks to solve the problem of allowing a controller providing an inputter capable of allowing a user to feel that a motion in which the user moves the controller matches a motion in which an object moves.

One aspect of the present disclosure seeks to solve the problem of being stably installed on a controller while at least a portion of a rotating wheel rotates when an inputter of the controller includes the rotating wheel.

One aspect of the present disclosure seeks to solve the problem ofallowing a user to feel a rotational sensation when an inputter of a controller includes a rotating wheel.

One aspect of the present disclosure seeks to solve the problem of allowing the clicker to be stably accommodated in a rotating wheel when the rotating body of a controller includes the clicker so that a user feels a rotational sensation.

One aspect of the present disclosure seeks to solve the problem of accurately detecting rotation of a rotating wheel of a controller.

One aspect of the present disclosure seeks to solve the problem needing a separate button for convenience of a user when the controller includes a rotating wheel.

One aspect of the present disclosure seeks to solve the problem of a controller being stably supplied with power while the controller controlling an object in powering the controller.

The above-described embodiments are merely specific examples to describe technical content according to the embodiments of the disclosure and help the understanding of the embodiments of the disclosure, not intended to limit the scope of the embodiments of the disclosure. Therefore, while the present disclosure has been particularly described with reference to exemplary embodiments, it should be understood by those of skilled in the art that various changes in form and details may be made without departing from the spirit and scope of the present disclosure.

What is claimed is:

1. A controller comprising:

a main body comprising at least one rib;

a rotating wheel comprising:

a fixed body supported by the main body, the fixed body comprising a first fixed body part coupled to the main body, and a second fixed body part coupled to an outer side of the first fixed body part by one or more screws, and a rotating body facing the at least one rib, coupled to the fixed body and disposed between the first fixed body part and the second fixed body part, the rotating body being rotatable with respect to the fixed body; and a clicker protruding toward the main body from the rotating body to allow an end portion to be provided between the at least one rib, wherein the rotating body comprises a wheel cover comprising an accommodation space recessed in a direction away from the at least one rib to allow at least a portion of the clicker to be provided therein.

2. The controller of claim 1, wherein the at least one rib comprises:

a first rib, a second rib adjacent to one side of the first rib, and a third rib adjacent to a second side different from the one side of the first rib, wherein, based on the clicker moving in a direction from the second rib toward the first rib, the clicker is movable from a stationary position between the second rib and the first rib to an elastic position in which the clicker is elastically supported and deformed by the first rib, and wherein the clicker is movable from the elastic position to a contact position in which the clicker is configured to contact the third rib.

3. The controller of claim 2, wherein the at least one rib protrudes toward the rotating body and extends toward a rotation axis of the rotating body, and is provided along a movement position of the clicker, and wherein the at least one rib respectively comprises a rib edge configured to contact the clicker and is rounded and chamfered so as to be capable of reducing a resistance caused by the first rib based on the clicker being in the elastic position.

4. The controller of claim 1, wherein the main body comprises a first surface to which the rotating wheel is coupled, the first surface having a first angle with respect to a bottom surface of the main body, wherein the controller further comprises a solar cell on the main body and having a second angle different from the first angle with respect to the bottom surface of the main body and configured to generate electric energy from external light, and wherein the main body further comprises a capacitor electrically connected to the solar cell and configured to store electric energy generated from the solar cell.

5. The controller of claim 1, wherein the clicker comprises:

a head coupled to the rotating body; and a neck extending from the head toward the main body, and wherein the neck comprises an inclined portion that is inclined toward an end portion thereof and capable of reducing a resistance generated by the at least one rib based on the clicker being in the elastic position.

6. A controller comprising:

a main body comprising at least one rib;

a rotating wheel comprising:

a fixed body supported by the main body, and a rotating body facing the at least one rib, coupled to the fixed body and rotatable with respect to the fixed body; and a clicker protruding toward the main body from the rotating body to allow an end portion to be provided between the at least one rib, wherein the rotating body comprises a wheel cover comprising an accommodation space recessed in a direction away from the at least one rib to allow at least a portion of the clicker to be provided therein, wherein the at least one rib comprises:

a first rib, a second rib adjacent to one side of the first rib, and a third rib adjacent to a second side different from the one side of the first rib, wherein, based on the clicker moving in a direction from the second rib toward the first rib, the clicker is movable from a stationary position between the second rib and the first rib to an elastic position in which the clicker is elastically supported and deformed by the first rib, wherein the clicker is movable from the elastic position to a contact position in which the clicker is configured to contact the third rib, wherein the clicker comprises:

a head coupled to the rotating body; and a neck extending from the head toward the main body, and wherein the neck comprises an inclined portion that is inclined toward an end portion thereof and capable of reducing a resistance generated by the first rib based on the clicker being in the elastic position.

7. The controller of claim 6, wherein the clicker comprises:

an extension extending from the inclined portion toward the head; and a reinforcing portion connected to the extension and the head, and having a cross-sectional area greater than a cross-sectional area of the extension to provide the connection between the neck and the head.

8. The controller of claim 6, wherein the wheel cover faces one end of the head of the clicker, and wherein the rotating body faces a second end opposite to the one end of the head of the clicker, and comprises a wheel bracket coupled to the wheel cover and configured to fix the clicker to the rotating body.

9. The controller of claim 6, wherein the head of the clicker comprises a fixing groove that is recessed in a direction away from the wheel cover, wherein the wheel cover comprises:

a fixing protrusion protruding toward the fixing groove and configured to be accommodated and fixed in the fixing groove; and a head groove recessed in a direction away from the head and configured to accommodate and fix the head of the clicker.

10. The controller of claim 9, wherein the fixed body comprises:

a first fixed body part coupled to the main body; and a second fixed body part coupled to the first fixed body part with the wheel cover interposed therebetween, and wherein the wheel cover further comprises:

a first protruding rib protruding toward the first fixed body part so as to be rotatable by being in contact with the first fixed body part; and a second protruding rib protruding in a direction opposite to the direction, in which the first protruding rib protrudes, toward the second fixed body part so as to be rotatable by being in contact with the second fixed body part.

11. The controller of claim 10, further comprising:

a wheel sensor configured to detect an amount of rotation of the rotating body with respect to the fixed body;

a transmitter configured to transmit a signal to an object controlled by the controller; and at least one processor electrically connected to the wheel sensor and the transmitter, wherein the at least one processor is configured to control the transmitter based on the amount of rotation detected by the wheel sensor.

12. The controller of claim 11, wherein the fixed body further comprises a wheel board between the first fixed body part and the second fixed body part, wherein the wheel sensor is supported by the wheel board, and wherein the wheel cover further comprises a reaction flange extending toward the rotation axis of the rotating body and facing the wheel board with the wheel sensor interposed therebetween.

13. The controller of claim 12, wherein the wheel sensor comprises an optical sensor, wherein the wheel cover comprises a coating layer on the reaction flange that provides a uniform surface facing the optical sensor, and wherein the at least one processor is configured to obtain the amount of rotation of the rotating body and control the transmitter based on light reflected by the coating layer and detected by the optical sensor.

14. The controller of claim 12, wherein the main body further comprises:

a main body housing coupled to the rotating wheel, and comprising a function button cover comprising at least two fixed edges, the function button cover being configured to be pressed;

a main board facing the main body housing; and a function button damper between the function button cover and the main board, wherein the controller further comprises a function button sensor between the function button damper and the main board configured to detect whether the function button cover is pressed, and wherein the function button damper comprises:

a support portion spaced apart from the function button sensor; and a pressing portion corresponding to the function button sensor, thinner than the support portion and configured to be deformable to protrude toward the function button sensor.

15. The controller of the controller of claim 14, wherein the wheel cover is configured to be rotatable with respect to the wheel board, and wherein the controller further comprises a connecting board comprising a flexible material connecting the main board and the wheel board.

16. The controller of claim 14, further comprising:

a wheel button sensor configured to output a signal to the at least one processor based on the second fixed body part being pressed, wherein the wheel cover comprises a contact surface exposed toward an outside of the second fixed body part, adjacent to an outer surface of the second fixed body part and extending radially from the second fixed body part with respect to the rotation axis of the rotating body.

* * * * *